United States Patent [19]

Yanai et al.

[11] Patent Number: 5,742,792
[45] Date of Patent: Apr. 21, 1998

[54] REMOTE DATA MIRRORING

[75] Inventors: Moshe Yanai; Natan Vishlitzky, both of Brookline; Bruno Alterescu, Newton; Daniel D. C. Castel, Framingham; Gadi G. Shklarsky, Brookline; Yuval Y. O. Ofek, Hopkinton, all of Mass.

[73] Assignee: EMC Corporation, Hopkinton, Mass.

[21] Appl. No.: 654,511

[22] Filed: May 28, 1996

Related U.S. Application Data

[63] Continuation-in-part of Ser. No. 52,039, Apr. 23, 1993, Pat. No. 5,544,347.

[51] Int. Cl.$^6$ .................................................. G06F 12/16
[52] U.S. Cl. ............... 395/489; 395/182.03; 395/182.04; 395/488; 395/492; 395/821; 371/10.1; 371/21.1; 371/40.1; 364/DIG. 1
[58] Field of Search ................. 395/182.03, 182.04, 395/488, 489, 492, 821; 371/10.1, 21.1, 40.1

[56] References Cited

U.S. PATENT DOCUMENTS

| 3,588,839 | 6/1971 | Belady et al. ............... 395/469 |
| 3,835,260 | 9/1974 | Prescher et al. ............. 379/237 |
| 3,866,182 | 2/1975 | Yamada et al. ............. 340/172.5 |

(List continued on next page.)

FOREIGN PATENT DOCUMENTS

| 0239323 | 9/1987 | European Pat. Off. . |
| 0323123 | 12/1988 | European Pat. Off. . |
| 57-111900 | 7/1982 | Japan . |
| 1-19437 | 1/1989 | Japan . |
| 1-19438 | 1/1989 | Japan . |
| 1-120650 | 5/1989 | Japan . |
| 2-32418 | 2/1990 | Japan . |
| 2-32419 | 2/1990 | Japan . |
| 2-32420 | 2/1990 | Japan . |
| 2-91716 | 3/1990 | Japan . |
| 2-91717 | 3/1990 | Japan . |
| 2-93721 | 4/1990 | Japan . |
| 2086625 | 5/1992 | United Kingdom . |
| PCT/US/93/ 05853 | 1/1994 | WIPO . |
| WO94/25919 | 11/1994 | WIPO ........................... G06F 12/16 |
| PCT/US/84/ 01678 | 7/1995 | WIPO . |

OTHER PUBLICATIONS

SFT Netware 286 Maintenance, #100-313-001, 100/Rev1.00, Novel Incorporated, Provo, Utah, Nov. 1987.

(List continued on next page.)

*Primary Examiner*—Frank J. Asta
*Attorney, Agent, or Firm*—Arnold, White & Durkee

[57] ABSTRACT

Two data storage systems are interconnected by a data link for remote mirroring of data. Each volume of data is configured as local, primary in a remotely mirrored volume pair, or secondary in a remotely mirrored volume pair. Normally, a host computer directly accesses either a local or a primary volume, and data written to a primary volume is automatically sent over the link to a corresponding secondary volume. Each remotely mirrored volume pair can operate in a selected synchronization mode including synchronous, semi-synchronous, adaptive copy - remote write pending, and adaptive copy - disk. Direct write access to a secondary volume is denied if a "sync required" attribute is set for the volume and the volume is not synchronized. If a "volume domino" mode is enabled for a remotely mirrored volume pair, access to a volume of the pair is denied when the other volume is inaccessible. In a "links domino" mode, access to all remotely mirrored volumes is denied when remote mirroring is disrupted by an all-links failure. The domino modes can be used to initiate application-based recovery, for example, recovering a secondary data file using a secondary log file. In an active migration mode, host processing of a primary volume is concurrent with migration to a secondary volume. In an overwrite cache mode, remote write-pending data in cache can be overwritten. Write data for an entire host channel command word chain is bundled in one link transmission.

38 Claims, 21 Drawing Sheets

U.S. PATENT DOCUMENTS

| | | | |
|---|---|---|---|
| 4,020,466 | 4/1977 | Cordi et al. | 395/600 |
| 4,057,849 | 11/1977 | Ying et al. | 345/193 |
| 4,084,231 | 4/1978 | Capozzi et al. | 395/444 |
| 4,094,000 | 6/1978 | Brudevold | 345/200 |
| 4,124,843 | 11/1978 | Bramson et al. | 340/337 |
| 4,150,429 | 4/1979 | Ying | 395/293 |
| 4,161,777 | 7/1979 | Behnase et al. | 395/481 |
| 4,204,251 | 5/1980 | Brudevold | 395/309 |
| 4,342,079 | 7/1982 | Stewart et al. | 395/405 |
| 4,396,984 | 8/1983 | Videki, II | 395/858 |
| 4,430,727 | 2/1984 | Moore et al. | 395/442 |
| 4,453,215 | 6/1984 | Reid | 395/182.09 |
| 4,464,713 | 8/1984 | Benhase et al. | 395/415 |
| 4,577,272 | 3/1986 | Ballew et al. | 395/650 |
| 4,608,688 | 8/1986 | Hanson et al. | 371/11 |
| 4,634,100 | 1/1987 | Julich et al. | 371/11 |
| 4,698,808 | 10/1987 | Ishii | 371/21.5 |
| 4,710,870 | 12/1987 | Blackwell et al. | 395/182.04 |
| 4,755,928 | 7/1988 | Johnson et al. | 395/182.04 |
| 4,769,764 | 9/1988 | Levanon | 361/680 |
| 4,779,189 | 10/1988 | Legvold et al. | 395/493 |
| 4,783,834 | 11/1988 | Anderson et al. | 382/245 |
| 4,785,472 | 11/1988 | Shapiro | 379/96 |
| 4,797,750 | 1/1989 | Karweit | 358/335 |
| 4,805,106 | 2/1989 | Pfeifer | 395/650 |
| 4,814,592 | 3/1989 | Bradt et al. | 235/381 |
| 4,837,680 | 6/1989 | Crockett et al. | 395/284 |
| 4,849,978 | 7/1989 | Dishon et al. | 395/182.04 |
| 4,862,411 | 8/1989 | Dishon et al. | 395/494 |
| 4,916,605 | 4/1990 | Beardsley et al. | 395/489 |
| 4,949,187 | 8/1990 | Cohen | 358/335 |
| 4,985,695 | 1/1991 | Wilkinson et al. | 340/825 |
| 5,007,053 | 4/1991 | Iyer et al. | 371/21.1 |
| 5,029,199 | 7/1991 | Jones et al. | 379/89 |
| 5,051,887 | 9/1991 | Berger et al. | 395/489 |
| 5,060,185 | 10/1991 | Naito et al. | 395/600 |
| 5,089,958 | 2/1992 | Horton et al. | 395/182.03 |
| 5,097,439 | 3/1992 | Partriquin et al. | 395/402 |
| 5,099,485 | 3/1992 | Bruckert et al. | 395/182.09 |
| 5,123,099 | 6/1992 | Shibata et al. | 395/447 |
| 5,127,048 | 6/1992 | Press et al. | 379/100 |
| 5,132,787 | 7/1992 | Omi et al. | 358/524 |
| 5,134,711 | 7/1992 | Asthana et al. | 395/800 |
| 5,146,576 | 9/1992 | Beardsley et al. | 395/440 |
| 5,146,605 | 9/1992 | Beukema et al. | 395/821 |
| 5,155,814 | 10/1992 | Beardsley et al. | 395/872 |
| 5,155,835 | 10/1992 | Belsan | 395/441 |
| 5,155,845 | 10/1992 | Beal et al. | 395/182.04 |
| 5,157,770 | 10/1992 | Beardsley et al. | 395/439 |
| 5,159,671 | 10/1992 | Iwami | 395/250 |
| 5,170,471 | 12/1992 | Bonevento et al. | 395/837 |
| 5,175,837 | 12/1992 | Arnold et al. | 395/425 |
| 5,175,839 | 12/1992 | Ikeda et al. | 395/410 |
| 5,185,864 | 2/1993 | Bonevento et al. | 395/868 |
| 5,201,053 | 4/1993 | Benhase et al. | 395/289 |
| 5,202,887 | 4/1993 | Ueno et al. | 371/10.1 |
| 5,206,939 | 4/1993 | Yanai et al. | 395/400 |
| 5,210,865 | 5/1993 | Davis et al. | 395/575 |
| 5,235,690 | 8/1993 | Beardsley et al. | 395/440 |
| 5,235,692 | 8/1993 | Ayres et al. | 395/849 |
| 5,239,659 | 8/1993 | Rudeseal et al. | 395/800 |
| 5,263,154 | 11/1993 | Eastridge et al. | 395/575 |
| 5,269,011 | 12/1993 | Yanai et al. | 395/425 |
| 5,274,645 | 12/1993 | Idelman et al. | 395/182.04 |
| 5,276,867 | 1/1994 | Kenley et al. | 395/600 |
| 5,285,451 | 2/1994 | Henson et al. | 371/11.1 |
| 5,313,664 | 5/1994 | Sugiyama et al. | 364/405 |
| 5,335,352 | 8/1994 | Yanai et al. | 395/800 |
| 5,343,477 | 8/1994 | Yamada | 395/182.02 |
| 5,375,232 | 12/1994 | Legvold et al. | 395/575 |
| 5,377,342 | 12/1994 | Sakai et al. | 395/425 |
| 5,379,412 | 1/1995 | Eastridge et al. | 395/575 |
| 5,381,539 | 1/1995 | Yanai et al. | 395/425 |
| 5,428,796 | 6/1995 | Iskiyan et al. | 395/728 |
| 5,446,872 | 8/1995 | Ayres et al. | 395/180 |
| 5,459,857 | 10/1995 | Ludlam et al. | 395/182.04 |
| 5,463,752 | 10/1995 | Benhase et al. | 395/481 |
| 5,544,345 | 8/1996 | Carpenter et al. | 395/477 |
| 5,544,347 | 8/1996 | Yanai et al. | 395/489 |

OTHER PUBLICATIONS

SFT Netware 286 Installation, #100–312–001, 100/Rev1.00, Novel Incorporated, Provo, Utah, Nov. 1987.

SFT Netware 286 Installation Supplement, #100–000225–001, 26/Rev1.02, Novel Incorporated, Provo, Utah, June 1986.

SFT Netware 68 Maintenance, #100–000289–001, 64/Rev1.00, Novel Incorporated, Provo, Utah, Nov. 1986.

SFT Netware 68 Installation, #100–000317–001, 103/Rev1.00, Novel Incorporated, Provo, Utah, Feb. 1988.

SFT Netware 868 Installation Supplement, #100–000286–001, 61/Rev1.00, Novel Incorporated, Provo, Utah, Dec. 1986.

D.L. Burkes & R.K. Treiber, "Design Approaches for Real–Time Transaction Processing Remote Site Recovery," Computer Society International Conference (COMPCON), Spring Meeting, Los Alamitos, Feb. 26–Mar. 2, 1990, No., CONF. 35, 23 Feb. 1990, Institute of Electrical and Electronics Engineers, New York, N.Y., pp. 568–572.

Supplementary European Search Report for EP 94 91 4223, Jul. 1, 1997.

International Search Report for PCT/US/94/04326, Jul. 20, 1994.

PCT Written Opinion for PCT/US94/04326, 28 Feb. 1995.

PCT International Preliminary Examination Report for PCT/US94/04326, Jul. 18, 1995.

Hank Cote–New Horizons in Accessing Large Amounts of On–Line Data, pp. 71–75, 1982.

Matt Kramer–Fault-Tolerant LANs Guard Against Malfunction, Data Loss, pp. C26–C35, Sep. 1987.

Carol Grossman–Planning for 3990 Extended Functions, pp. 245–258, 1989, 30th Annual GUIDE Conference.

Bob Buchanan–Administrative Error Causes Most Major System Failures (3 pgs.), Feb. 1988, Goverment Computer News, V. 17, N. 4, p. 340.

Virginia Dudek–Planning for Network Disasters (4 pgs.), Jun. 12, 1989, MIS Week, vol. 10, N. 24.

Jean Bozman–Escon An Aid To Remote Disks (3 pgs.), V. 25, N. 1, p. 29, Jan. 7, 1991.

Gary A. Boles–A RAID Stack: Micropolis RAIDION, Network Computer, Jun. 1992.

Blaine Homer–RAID Level 5 Protects Your Data With Interleaved Parity, LAN Times, May 25, 1992, vol. 9.

Michael Caton–Micropolis Array Secures Data, PC Week, 1992.

RAIDON Fault–Tolerant Disk Arrays Brochure, 1993.

Storagetek 2Q Earnings Down, Iceberg Ready for Testing by Jim Mallory, Newsbytes, Jul. 15, 1993.

Network Backup Evolves, by Michael Peterson et al., PC Magazine, vol. 12, No. 16, Sep. 28, 1993, p. 277(18).

Your Next LAN Storage Could Be a Mainframe, Jeff Moad, Datamination, vol. 39, No. 6, Mar. 15, 1993, p. 71.

Heard Any Good Rumors Lately? (Network Management), By Jill Huntington–Lee, LAN Computing, vol. 5, No. 2, Feb. 1994, p. 22.

Special Report: The AT&T Worldwide Intelligent Network-–Scope, Nature and Management, Edge, vol. 7, No. 224, Nov. 6, 1992, p. 9.

Protect Your Data! (Database Report), by Michael Liczbanski, Data Based Advisor, vol. 10, No. 5, May 1992, p. 114.

Network Planning to the Rescue; Network Managers Should Design and Test a Network Recovery Plan That Lets Business Continue Uninterrupted Even If Disaster Strikes, by Ramond W. Rudnitskas et al., Networking Management, vol. 9, No. 11, Oct. 1991, p. 46.

If LANS Eye Host Status, Quality Today Falls Short, by Barbara Bochenski, Software Magazine, vol. 11, No. 12, Oct. 1991, p. 66.

Safe and Secure, by Peter Stephenson, LAN Magazine, vol. 6, No. 9, Sep. 1991, p. 34.

Firing Up Fault Tolerance by Brian O'Connell, DEC Professional, vol. 10, No. 6, Jun. 1991, p. 118.

A Which Computer? Guide to Backup Systems, by Chris Bidmead, Which Computer?, Sep. 1989, p. 62.

Optical Disks Compete With Videotape and Magnetic Storage Media, by Henry Urrows et al., Optical Information Systems, vol. 8, No. 3, May–Jun. 1988, p. 101.

Preventing Disasters: Whipping Up an Emergency Response Plan, Network Computing, Feb. 1992, p. 81.

Abbey Banking on FDDI, Communications Week International, Mar. 4, 1991, p. 22.

X.25 Data Networks and IBM: A Troublesome Connection, by Jan Johnson, Computer Decisions, vol. 19, Jan. 12, 1987, p. 16.

DSC Communications Corp. Debuts NEXOS LAN Product Line at Interface, Demos Enhanced Performance, Fault Tolerance and WAN Connectivity, News Release, Mar. 28, 1988.

Analysis of Scanning Policies For Reducing Disk Seek Times, by E. G. Coffman, L. A. Klimko and Barbara Ryan–Siam, Journal on Computing, Sep. 1972, vol. 1, No. 3, pp. 269–280.

Configuring Tandem Disk Subsystems, by Scott Sitler, Tandem Systems Review, Dec. 1986, pp. 80–91.

Technical Report Investigation of Selected Disk Systems, Oct. 1976, Teledyne Brown Engineering, Huntsville, Alabama (18 pages).

Software Extends Unix Distributed Computing, by Evan O. Grossman, PC Week, Jun. 5, 1989, p. 35 and p. 40.

IBM Funds Pack Firm, Electronic News, May 22, 1989, p. 12.

IBM Plans U.S. Test of File–Transfer, Network World, Sep. 5, 1988, pp. 15, 17.

IBM Invests In Firm That Offers Unix File–Sharing, Network World, May 22, 1989, p. 4.

IBM Plans Speedy Nationwide File System, Computer Systems News, Sep. 5, 1988, p. 56.

Design Alternatives for Disk Duplexing, by Spencer W. Ng, IBM Research Report, Jan. 30,1987.

Disk Arm Movement In Anticipation of Future Requests, by Richard P. King, IBM Research Report, Dec. 16, 1987.

Ubik: Replicated Servers Made Easy, by Michael Leon Kazar, pp. 60–67, 1989.

Carnegie–Mellon Forges Standard Look For Multivendor Net, Computerworld, Jan. 30, 1989, pp. SR/8–SR/9.

A Multi–Media Message System For Andrew, USENIX Winter Conference, Feb. 9–12, 1988, pp. 37–42.

Synchronization and Caching Issues in the Andrew File System, USENIX Winter Conference, Feb. 9–12, 1988, pp. 27–36.

Comparative Study of Some UNIX Distributed File Systems, EUUG, Sep. 22–24, 1986, pp. 73–82.

VOLUMES–The Andrew File System Data Structuring Primitive, EUUG Autumn 1986, Sep. 22–24, 1986, pp. 473–480.

Unix Plays Role in Corporate Networking, MIS Week, vol. 10, No. 28, Jul. 17, 1989, pp. 22–23.

Sun's Open System Made by Marketplace, "Unlike Minis, Unix Machines, Pcs and Even VMS Can Be Glued" by NFS, Software Magazine, vol. 9, No. 12, Oct. 1989, pp. 72–75, Cashin, Jerry.

Universal Server Under Development, MacWEEK, vol. 3, No. 39, Oct. 31, 1989, p. 5.

Unix Plays Role In Corporate Networking–Vendors Look Unix–Based Network Management Tools as Networking Standards Slowly Evolve, MIS Week, Jul. 17, 1989, pp. 22–23, vol. 10, No. 28.

The 28 Runners Declared for Open Software Foundations, Distributed Computing Stakes, Computergram International, No. 1301, CGI11909912, Nov. 9, 1989.

Some Platforms (Theory of Self–Organizing Systems), Release 1.0, vol. 89, No. 6, Jun. 27, 1989, pp. 12–16.

Self–Organizing Systems (Overview of Detailed Examples of Self–Organizing Systems, Includes related article About the Importance of Self–Organizing Systems), Release 1.0, vol. 89, No. 6, Jun. 27, 1989, pp. 1–9.

IBM–Funded Startup Developing Unix Add–On, PC Week, vol. 6, No. 22, Jun. 5, 1989, p. 40.

Uniting File Systems; Experimental Large Scale, Distributed File Systems Are Now Being Created (included related article on the History of the AFS Project), UNIX Review, vol. 7, No. 3, Mar. 1989, pp. 61–70.

IBM Backs Transarc, Formed to Offer Andrew File System Distributed Unix Database, Computergram International, No. 1180, CGI05190001, May 19, 1989.

A Comparative Analysis of Disk Scheduling Policies, by Toby J. Reorey and Tad B. Pinerton, Communications of the ACM, Mar. 1972, vol. 15, No. 3, pp. 177–184.

Disk Scheduling: FCFS vs. SSTF Revisited, by Micha Hofri, Communications of the ACM, Nov. 1980, vol. 23, No. 11, pp. 645–653.

Using Multiple Replica Classes to Improve Performance in Distributed System, by Peter Triantafillou and David Tayloer, The 11th International Conference on Distributed Computing Systems, May 20–24, 1991, pp. 420–428.

Government Computer News, Oct. 9, 1987, Richard A. Damca, *Microcomputing* "Patch Fault Tolerance: A Strong Second Team," vol. 7, Issue 149 P27(2), Dec. 17, 1990.

Computer Reseller, Feb. 19, 1990, Joel Shore, *Mirrored Servers' a reality*, pp. 51, 52, 62.

Infoworld Articles, Mar. 12, 1990, *Vendors Offer Mirroring Solutions* P(31).

Wilkinson, *Compact and Novell team for fault tolerance: mirrored servers to cut down on costly downtime*, Article MIS Week, vol. 11, Issue 7, Feb. 12, 1990.

Article PC Week, vol. 4, Issue 37, Sep. 15, 1987, Matt Kramer, *Fault–Tolerant LANS Guard Against Malfunction, Data Loss.*

"The DASD Time Bomb," Datamation, vol. 32, Mar. 1, 1986, P63(4), Alper, Alan.

Symmetrix Remote Data Facility (SRDF) Product Guide, P/N 200–999–554 Rev A, EMC Corporation, Hopkinton, Mass., Sep. 1994, 105 pages [EMCP 00003686–379].

"Symmetrix Remote Data Facility Data Sheet, Symmetrix-resident Software Feature to extend mirroring capabilities," EMC Corporation, Hopkinton, Mass., Apr. 1995, 4 pages [EMCP 00010741–10741].

"When Data is Lost in Minutes, its an Act of God. When Data is Recovered in Minutes, its an Act of EMC." EMC Corporation, Hopkinton, Mass., 1994, one page [EMCP 00003903].

"EMC Ships Mainframe Disaster Recovery Solution that Restores Data in Minutes," News from EMC Corporation, EMC Corporation, Hopkinton, Mass., Oct. 3, 1994, two pages [EMCP 00003921–3922].

"Asset Protection: Disk–Based Approach Makes Disaster Recovery More Efficient, Ensures Business Continuity," EMC Corporate Information, EMC Corporation, Hopkinton, Mass., 5 pages [EMCP 00003916–3920].

"EMC Ships Continuously–Available Disk–Based Disaster Recovery Solution," News from EMC Corporation, EMC Corporation, Hopkinton, Mass., Oct. 3, 1994, 4 pages [EMCP 00003923– 8926].

"Symmetrix Remote Data Facility: Taking the disaster out of disaster recovery," Brochure, EMC Corporation, Hopkinton, Mass., Sep. 1994, 8 pages [EMCP 00003908–3915].

"Symmetrix Remote Data Facility: EMC redefines disaster recovery," Brochure, EMC Corporation, Hopkinton, Mass., Sep. 1994, 4 pages [EMCP 00003904–3907].

"EMC Introduces Symmetrix 5500 Continuous Operation Disk Storage for Mission Critical IBM Mainframe Market," News from EMC Corporation, Hopkinton, Mass., Nov. 10, 1992, 3 pages.

"MCI Deploys New Fast Data Transfer Technology from EMC," News from EMC Corporation, Hopkinton, Mass., May 22, 1995, 2 pages [EMCP 00007520–7521].

"EMC Agreement with Data Switch to Promote Long Distance Disaster Recovery," News from EMC Corporation, EMC Corporation, Hopkinton, Mass., Nov. 30, 1994, 2 pages [EMCP 00007516–7517].

"EMC and Comdisco to Benchmark Data Mirroring Capability," News from EMC Corporation, EMC Corporation, Hopkinton, Mass., Jan. 24, 1995, 2 pages [EMCP 00007518–7519].

"EMC Ships Mainframe Disaster Recovery Solution that Restores Data in Minutes," News from EMC Corporation, EMC Corporation, Hopkinton, Mass., Oct. 3, 1994, 2 pages [EMCP 00007514–7515].

N. S. Prasad, "IBM Mainframes: Architecture and Design," McGraw–Hill Book Company, New York, N.Y., 1989, pp. 58–73 and 182–196.

"The IBM 3390 Storage Control Reference," No. GA32–0099–04, International Business Machines Corporation, Tucson, Arizona, 1991, pp. 1–304.

Patterson et al., "A Case for Redundant Arrays of Inexpensive Disks (RAID)," Report No. UCB/CSD 87/391, Computer Science Division (EECS), University of California, Berkeley, California, Dec. 1987, pp. 1–24.

Patterson et al., "Introduction to Redundant Arrays of Inexpensive Disks (RAID)," COMPCON 89 Proceedings, Feb. 27–Mar. 3, 1989, IEEE Computer Society, pp 112–117.

Ousterhout et al., "Beating the I/O Bottleneck: A Case for Log–Structured File Systems," Operating Systems Review, vol. 23, No. 1, ACM Press, Jan., 1989, pp. 11–28.

Douglis et al., "Log Structured File Systems," COMPCON 89 Proceedings, Feb. 27–Mar. 3, 1989, IEEE Computer Society, pp. 124–129.

Rosemblum et al., "The Design and Implementation of a Log–Structured File System," ACM Transactions on Computer Systems, vol. 1, Feb. 1992, pp. 26–52.

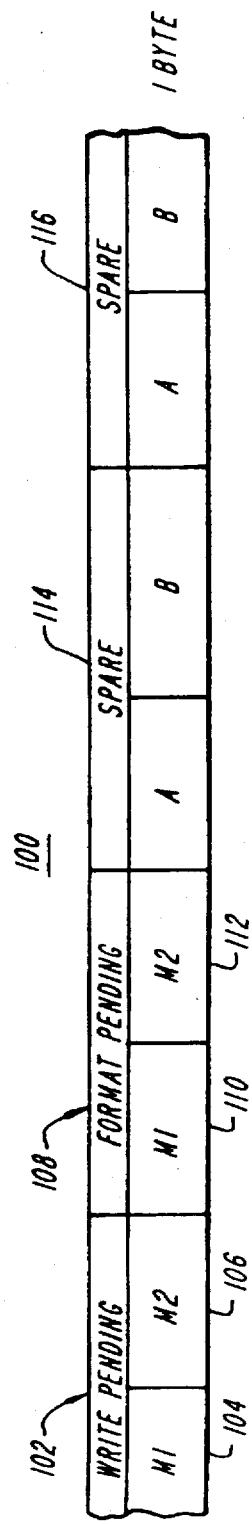
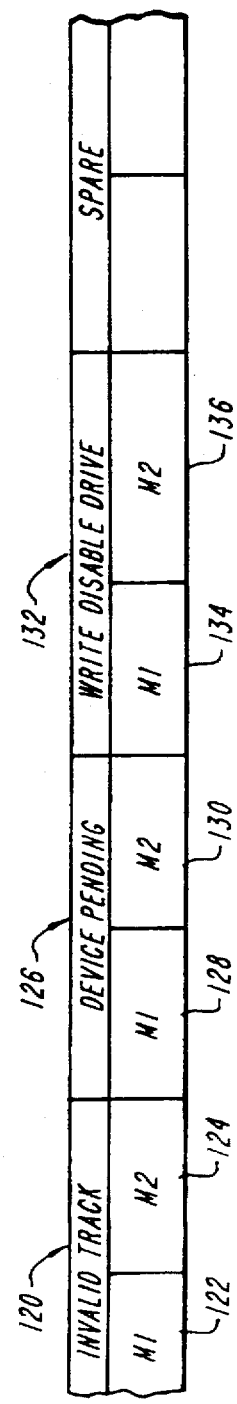

REMOTE DATA MIRRORING

RELATED APPLICATION

This application is a continuation-in-part of U.S. patent application Ser. No. 08/052,039 filed Apr. 23, 1993, entitled REMOTE DATA MIRRORING (U.S. Pat. No. 5,544,347 issued Aug. 6, 1996), which is fully incorporated herein by reference.

AUTHORIZATION PURSUANT TO 37 C.F.R § 1.17(e)

A portion of the disclosure of this patent document contains command formats and other computer language listings all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to data storage, and more particularly, to a system and method for automatically providing and maintaining a copy or mirror of data stored at a location geographically remote from the main or primary data storage device.

BACKGROUND OF THE INVENTION

Nearly all data processing system users are concerned with maintaining back-up data in order to insure continued data processing operations should their data become lost, damaged, or otherwise unavailable.

Large institutional users of data processing systems which maintain large volumes of data such as banks, insurance companies, and stock market traders must and do take tremendous steps to insure back up data availability in case of a major disaster. These institutions recently have developed a heightened awareness of the importance of data recovery and back-up in view of the many natural disasters and other world events including the bombing of the World Trade Center in New York City.

Currently, data processing system users often maintain copies of their valuable data on site on either removable storage media, or in a secondary "mirrored" storage device located on or within the same physical confines of the main storage device. Should a disaster such as fire, flood, or inaccessibility to a building occur, however, both the primary as well as the secondary or backed up data will be unavailable to the user. Accordingly, more data processing system users are requiring the remote storage of back up data.

One prior art approach at data back-up involves taking the processor out of service while back-up tapes are made. These tapes are then carried off premises for storage purposes. Should access to the backed up data be required, the proper tape must be located, loaded onto a tape drive, and restored to the host system requiring access to the data. This process is very time consuming and cost intensive, both in maintaining an accurate catalog of the data stored on each individual tape, as well as storing the large number of tapes required to store the large amounts of data required by these institutions. Additionally and most importantly, it often takes twenty-four hours before a back-up tape reaches its storage destination during which time the back-up data is unavailable to the user.

Additionally, today's systems require a significant amount of planning and testing in order to design a data recovery procedure and assign data recovery responsibilities. Typically, a disaster recovery team must travel to the test site carrying a large number of data tapes. The team then loads the data onto disks, makes the required network connections, and then restores the data to the "test" point of failure so processing can begin. Such testing may take days or even weeks and always involves significant human resources in a disaster recovery center or back-up site.

Some providers of prior art data storage systems have proposed a method of data mirroring whereby one host Central Processing Unit (CPU) or processor writes data to both a primary, as well as a secondary, data storage device or system. Such a proposed method, however, overly burdens the host CPU with the task of writing the data to a secondary storage system and thus dramatically impacts and reduces system performance.

Accordingly, what is required is a data processing system which automatically and asynchronously, with respect to a first host system, generates and maintains a back-up or "mirrored" copy of a primary storage device at a location physically remote from the primary storage device, without intervention from the host which seriously degrades the performance of the data transfer link between the primary host computer and the primary storage device.

SUMMARY OF THE INVENTION

This invention features a system which controls storing of primary data received from a primary host computer on a primary data storage system, and additionally controls the copying of the primary data to a secondary data storage system controller which forms part of a secondary data storage system, for providing a back-up copy of the primary data on the secondary data storage system which is located in a geographically remote location from the primary data storage system. For remote copying of data from one storage system to the other without host involvement, the primary and secondary data storage system controllers are coupled via at least one high speed communication link such as a fiber optic link driven by LED's or laser. The high speed communication link also permits one data storage system to read or write data to or from the other data storage system.

At least one of the primary and secondary data storage system controllers coordinates the copying of primary data to the secondary data storage system and at least one of the primary and secondary data storage system controllers maintains at least a list of primary data which is to be copied to the secondary data storage device.

Additionally, the secondary data storage system controller provides an indication or acknowledgement to the primary data storage system controller that the primary data to be copied to the secondary data storage system in identical form as secondary data has been received or, in another embodiment, has actually been written to a secondary data storage device.

Accordingly, data may be transferred between the primary and secondary data storage system controllers synchronously, when a primary host computer requests writing of data to a primary data storage device, or asynchronously with the primary host computer requesting the writing of data to the primary data storage system, in which case the remote data copying or mirroring is completely independent of and transparent to the host computer system.

At least one of the primary data storage system controller and the secondary data storage system controller maintains a list of primary data which is to be written to the secondary data storage system. Once the primary data has been at least received or optionally stored on the secondary data storage system, the secondary data storage system controller provides an indication or acknowledgement of receipt or completed write operation to the primary data storage system.

At such time, the primary and/or secondary data storage system controller maintaining the list of primary data to be copied updates this list to reflect that the given primary data has been received by and/or copied to the secondary data storage system. The primary or secondary data storage system controllers and/or the primary and secondary data storage devices may also maintain additional lists for use in concluding which individual storage locations, such as tracks on a disk drive, are invalid on any given data storage device, which data storage locations are pending a format operation, which data storage device is ready to receive data, and whether or not any of the primary or secondary data storage devices are disabled for write operations.

In accordance with one aspect of the invention, the remote mirroring facility can operate in a specified one of a number of different remote mirroring operating modes for each volume. The operating modes include a synchronous mode, a semi-synchronous mode, an adaptive copy - write pending mode, and an adaptive copy-disk mode. The operating mode for each logical volume can be specified to best suit the purposes of the desired remote mirroring, the particular application using the volume, and the particular use of the data stored on the volume.

In the synchronous mode, data on the primary (R1) and secondary (R2) volumes are always fully synchronized at the completion of an I/O sequence. The data storage system containing the primary (R1) volume informs the host that an I/O sequence has successfully completed only after the data storage system containing the secondary (R2) volume acknowledges that it has received and checked the data. All accesses (reads and writes) to the remotely mirrored volume to which a write has been performed are suspended until the write to the secondary (R2) volume has been acknowledged.

In the semi-synchronous mode, the remotely mirrored volumes (R1, R2) are always synchronized between the primary (R1) and the secondary (R2) prior to initiating the next write operation to these volumes. The data storage system containing the primary (R1) volume informs the host that an I/O sequence has successfully completed without waiting for the data storage system containing the secondary (R2) volume to acknowledge that it has received and checked the data. Thus, a single secondary (R2) volume may lag its respective primary volume (R1) by only one write. Read access to the volume to which a write has been performed is allowed while the write is in transit to the data storage system containing the secondary (R2) volume.

The adaptive copy modes transfer data from the primary (R1) volume to the secondary (R2) volume and do not wait for receipt acknowledgment or synchronization to occur. The adaptive copy modes are responsive to a user-configurable skew parameter specifying a maximum allowable write pending tracks. When the maximum allowable write pending tracks is reached, then write operations are suspended, and in a preferred arrangement, write operations are suspended by defaulting to a predetermined one of the synchronous or asynchronous modes. In the adaptive copy - write pending mode, the write pending tracks accumulate in cache. In the adaptive copy - disk mode, the write pending tracks accumulate in disk memory.

In accordance with another aspect of the invention, there are provided a number of automatic and non-automatic recovery mechanisms. The recovery mechanism can be also selected on a logical volume basis for a desired level of data integrity and degree of operator or application program involvement. The invention also provides various options that provide a tradeoff between the degree of data integrity, cache loading, processing speed, and link traffic.

In one embodiment, cache loading and processing speed is enhanced by queuing pointers to data in cache for transmission to the link, and permitting pending write data to be overwritten in cache. Link traffic can also be reduced in this case, since obsolete write pending data need not be transmitted over the link. However, unless the remote mirroring is operated in the synchronous mode, data integrity is subject to the possibility of a "rolling disaster." In the rolling disaster, a remote mirroring relationship exists between the two data storage systems. All links break between the sites, and application processing continues using the primary (R1) volumes. The links are restored, and resynchronization commences by copying data from the primary (R1) volumes to the secondary (R2) volumes. Before resynchronization is finished, however, the primary volumes are destroyed, and the attempt at resynchronization has further corrupted the secondary volumes, due to the cache overwrite option.

The invention provides options other than the synchronous and semi-synchronous operating modes to avoid the "rolling disaster" possibility when performing automatic recovery. One option is to suspend processing whenever the host requests a write to write-pending data in cache. Another option is to log multiple versions of tracks containing remote pending data.

Another aspect of the present invention provides mechanisms for selectively inhibiting automatic or manual recovery when automatic or manual recovery would be inappropriate. In one embodiment, each write request transmitted over the link between the data storage systems includes not only the data for at least one track in the secondary (R2) volume to be updated but also the current "invalid track" count for the secondary (R2) volume as computed by the data storage system containing the corresponding primary (R1) volume. Therefore, once a disaster occurs that destroys the data storage system containing the primary (R1) volume, the data storage system containing the secondary (R2) volume has an indication of the degree of consistency of the secondary (R2) volume. The "invalid tracks" count can be used to determine an appropriate recovery operation for the volume, and can be used to selectively restrict read/write access to the volume when the user decides that synchronization should be required for a write access.

In a preferred embodiment, direct write access to a secondary (R2) volume is denied if remote mirroring is not suspended. When remote mirroring is suspended, direct write access to the secondary volume is still denied if a "sync required" attribute is set for the volume and the volume is not synchronized.

In accordance with another aspect of the invention, automatic recovery is selectively inhibited by domino modes. If a "volume domino mode" is enabled for a remotely mirrored volume pair, access to a volume of the remotely mirrored volume pair is denied when the other volume is inaccessible. In a "links domino mode," access to all remotely mirrored volumes is denied when remote mirroring is disrupted by an all-links failure.

The domino modes can be used to initiate application-based recovery in lieu of automatic recovery. In one application-based recovery scheme, an application program maintains a log file of all writes ("before" or "after" images)

to a data file. To ensure recovery, the application program always writes data to the primary (R1) copy of the log file before it is written to the primary (R1) copy of the data file. The degree of synchronization between the secondary (R2) and primary (R1) copies is selected so that the remote mirroring facility always writes data to the secondary (R2) copy of the log file before it is written to the secondary (R2) copy of the data file. Therefore, in the case of an all-links failure where host processing continues so far beyond the failure that all versions of the following updates are not retained, the secondary (R2) copy of the data file can be recovered if the primary (R1) copies are destroyed. In this case, if the secondary (R2) copy of the data file is corrupted, it is recovered using the changes recorded in the secondary (R2) copy of the log file.

In accordance with another aspect of the invention, the remote mirroring facility is provided with a migration mode which is active during host processing of a primary (R1) volume and iteratively copies updates from the primary (R1) volume to a secondary (R2) volume. Initially all data elements (tracks or records) of the secondary (R2) volume are marked as invalid. During each iteration, the data elements of the volume, such as tracks or records, are scanned for data elements that are invalid on the secondary (R2) volume. The next iteration copies from the primary (R1) volume to the secondary (R2) volume data elements having been invalidated by writes from the host during the previous iteration. A count of the number of data elements transferred during each iteration, or a count of the invalid data elements in the secondary volume, is kept in order to monitor convergence toward synchronization of the primary (R1) and secondary (R2) volumes. Host processing of the primary volume is suspended for a last iteration to obtain complete synchronization.

In accordance with another aspect of the invention, the host processor sends chains of channel commands to the data storage system containing a primary (R1) volume of a remotely mirrored volume pair. The data storage system containing the primary (R1) volume bundles the write data for all write commands in the chain into a single write command for transmission over a link to the secondary data storage system containing the secondary (R2) volume. The data storage system containing the primary (R1) volume decodes the channel commands to determine when it has received the last channel command in the chain, and once the last channel command in the chain is received, it transmits the bundle of write data for the chain over the link to the data storage system containing the secondary (R2) volume.

In accordance with yet another aspect of the invention, there is provided host remote mirroring software for permitting a system operator or host application program to monitor and control remote mirroring, migration, and recovery operations. The host remote mirroring software provides the capability of changing the configuration of the remotely mirrored volumes in the data processing system, suspending and resuming remote mirroring for specified remotely mirrored volume pairs, synchronizing specified remotely mirrored volume pairs and notifying the system operator or host application program when synchronization is achieved, invalidating or validating specified remotely mirrored volume pairs, and controlling or limiting the direction of data transfer between the volumes in a specified remotely mirrored pair.

The present invention therefore provides a data storage system which achieves nearly 100 percent data integrity by assuring that all data is copied to a geographically remote site, and in those cases when a back-up copy is not made due to an error of any sort, an indication is stored that the data has not been copied, but instead must be updated at a future time. The system operator or application programmer is free to choose a variety of remote mirroring and recovery operations best suited for a desired processing speed and level of data integrity.

Such a system is provided which is generally lower in cost and requires substantially less manpower and facilities to achieve than the prior art devices.

BRIEF DESCRIPTION OF THE DRAWINGS

These and other features and advantages of the present invention will be better understood when read together with the following drawings wherein:

FIG. 2 is a schematic representation of a portion of an index or list maintained by the system of the present invention to determine various features including which primary data has been copied to a secondary disk;

FIG. 3 is a schematic representation of an additional list or index maintained by the system of the present invention to keep track of additional items including an invalid data storage device track, device ready status and write disable device status;

Figure 1:
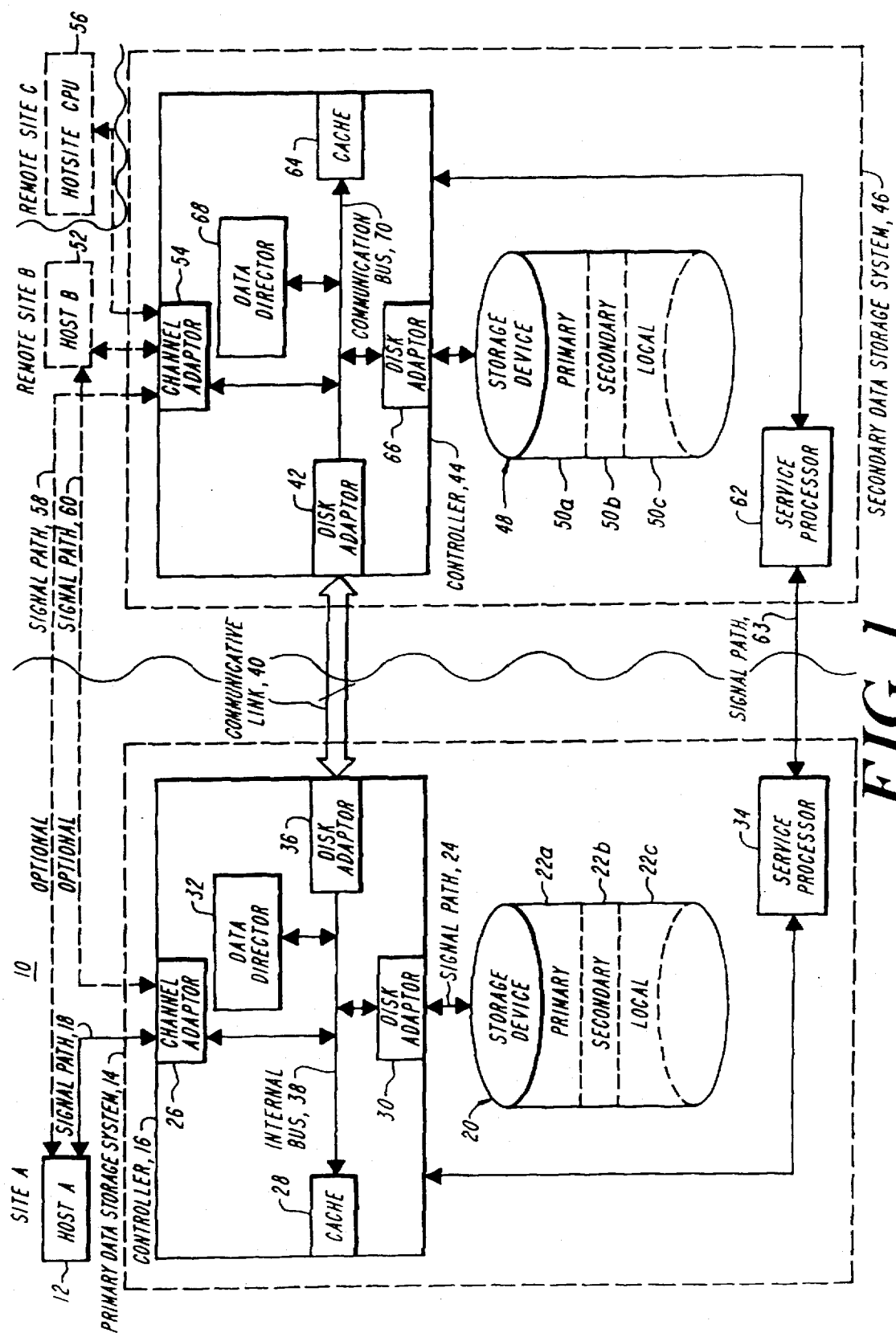
FIG. 1 is a block diagram illustrating the system with remote data mirroring according to the present invention.

While the invention is susceptible to various modifications and alternative forms, specific embodiments thereof have been shown by way of example in the drawings and will be described in detail herein. It should be understood, however, that it is not intended to limit the invention to the particular forms disclosed, but to the contrary, the intention is to cover all modifications, equivalents, and alternatives falling within the scope of the invention as defined by the appended claims.

DETAILED DESCRIPTION OF THE INVENTION

A. Overview

The present invention features a system which provides a geographically remote mirrored data storage system which contains generally identical information to that stored on a primary data storage system. Utilizing such a system, data recovery after a disaster can be nearly instantaneous and may require little, if any, human intervention. Using the present system, the data is retrieved from a remote device through the host data processing system.

A system in accordance with the present invention is shown generally at 10, FIG. 1, and includes at site A, which is a first geographic location, a host computer system 12 as is well known to those skilled in the art. The host computer system 12 is coupled to a first and primary data storage system 14. The host 12 writes data to and reads data from the primary data storage system 14.

The primary data storage system 14 includes a primary data storage system controller 16 which receives data from the host 12 over data signal path 18. The primary data storage system controller 16 is also coupled to a storage device 20 which may include a plurality of data storage devices 22a–22c. The storage devices may include disk drives, optical disks, CD's or other data storage devices. The primary system controller 16 is coupled to the storage device 20 by means of data signal path 24.

The primary data storage system controller 16 includes at least one channel adapter (C.A.) 26 which is well known to those skilled in the art and interfaces with host processing system 12. Data received from the host is typically stored in cache 28 before being transferred through disk adapter (D.A.) 30 over data signal path 24 to the primary storage device 20. The primary data storage controller 16 also includes a data director 32 which executes one or more sets of predetermined micro-code to control data transfer between the host 12, cache memory 28, and the storage device 20. Although the data director 32 is shown as a separate unit, either one of a channel adapter 26 or disk adapter 30 may be operative as a data director, to control the operation of a given data storage system controller. Such a reconfigurable channel adapter and disk adapter is disclosed in Applicant's U.S. Pat. No. 5,335,352 entitled RECONFIGURABLE, MULTI-FUNCTION DATA STORAGE SYSTEM CONTROLLER SELECTIVELY OPERABLE AS AN INPUT CHANNEL ADAPTER AND A DATA STORAGE UNIT ADAPTER and which is fully incorporated herein by reference.

The primary data storage system 14 according to one embodiment of the present invention also includes a service processor 34 coupled to the primary data storage system controller 16, and which provides additional features such as monitoring, repair, service, or status access to the storage system controller 16.

The primary data storage system controller 16 of the present invention also features at least a second disk adapter 36 coupled to the internal bus 38 of the primary data processing system controller 16. The second disk adapter 36 is coupled, via a high speed communication link 40 to a disk adapter 42 on a secondary data storage system controller 44 of a secondary data storage system 46. Such high speed, point-to-point communication links between the primary and secondary data processing system controllers 16 and 44 include a fiber optic link driven by an LED driver, per IBM ESCON standard; a fiber optic link driven by a laser driver, and optionally T1 and T3 telecommunication links. Utilizing network connections, the primary and secondary data storage system controllers 16 and 44 may be connected to FDDI networks, T1 or T3 based networks and SONET networks.

The secondary data storage system 46 is located at a second site geographically removed from the first site. For this patent application, "geographically removed site" means not within the same building as the primary data storage system. There are presently known data processing systems which provide data mirroring to physically different data storage systems. The systems, however, are generally within the same building. The present invention is directed to providing complete data recovery in case of disaster, such as when a natural disaster such as a flood or a hurricane, or man made disasters such as fires or bombings destroy one physical location, such as one building.

As in the case of the primary data storage system, the secondary data storage system 46 includes, in addition to the secondary data storage system controller 44, a secondary data storage device 48 including a plurality of storage devices 50a–50c. The plurality of storage devices on the secondary data storage system 46, as well as the primary data storage system 14, may have various volumes and usages such as a primary data storage device 50a which is primary with respect to the attached storage controller 44 and host 52 in the case of the secondary data storage system 46, and the primary storage device 22a which is primary with respect to the first or primary host 12 in the case of the primary data storage system 14.

Additionally, each storage device, such as storage device 48, may include a secondary storage volume 50b which serves as the secondary storage for the primary data stored on the primary volume 22a of the primary data storage system 14. Similarly, the primary data storage system 14 may include a secondary storage volume 22b which stores primary data received and copied from the secondary site and data processing system 46 and host 52.

Additionally, each storage device 20, 48, may include one or more local volumes or storage devices 22c, 50c, which are accessed only by their locally connected data processing systems.

The secondary storage system controller 44 also includes at least a first channel adapter 54 which may receive data from an optionally connected secondary host 52 or an optionally connected hotsite host or CPU 56. Optionally, the primary host 12 may include a data signal path 58 directly into the channel adapter 54 of the secondary data storage system 46, while the optional secondary host 52 may include an optional data path 60 into the channel adapter 26 of the primary data storage system 14. Although the secondary host 52 illustrated in FIG. 1 is not required for remote data mirroring as described in the present patent application, such a host would be required for data retrieval if both the primary host 12 as well as the primary data storage system 14 would be rendered inoperative. Similarly, a hotsite host or CPU 56 may optionally be provided at a third geographically remote site to access the data stored in the secondary data storage system 46.

The high speed link 40 between the primary and secondary data storage systems 14 and 46 is designed such that multiple links between the primary and secondary storage system may be maintained for enhanced availability of data and increased system performance. The number of links is variable and may be field upgradeable. Additionally, the service processor 34 of the primary data storage system 14 and the service processor 62 of the secondary data storage system 46 may also be coupled to provide for remote system configuration, remote software programming, and a host base point of control of the secondary data storage system.

The secondary data storage system controller 44 also includes cache memory 64 which receives data from channel adapter 54 and disk adapter 42, as well as disk adapter 66 which controls writing data to and from secondary storage device 48. Also provided is a data director 68 which controls data transfer over communication bus 70 to which all the elements of the secondary data storage system controller are coupled.

An additional feature of the system of FIG. 1 is the ability to dynamically reconfigure channel adapters as disk adapters and disk adapters as channel adapters, as described in Applicant's U.S. Pat. No. 5,269,011 entitled DYNAMICALLY RECONFIGURABLE DATA STORAGE SYSTEM WITH STORAGE SYSTEM CONTROLLERS SELECTIVELY OPERABLE AS CHANNEL ADAPTERS OR STORAGE DEVICE ADAPTERS and which is fully incorporated herein by reference.

The primary and secondary data storage systems may optionally be connected by means of currently available, off-the-shelf channel extender equipment using bus and tag or ESCON interfaces.

B. Remote Mirroring Facility

The data storage system 10 of FIG. 1 is designed to provide the copying of data from a primary data storage system to a physically remote secondary data storage system transparent to the user, and external from any influence of the primary host which is coupled to the primary data storage system. The data storage system 10 is designed to operate in at least two modes, the first being a real-time or synchronous mode wherein the primary and secondary storage systems must guarantee that the data exists and is stored in two physically separate data storage units before input/output completion; that is, before channel end and device end is returned to the primary host. Alternatively, the data storage system 10 is designed to operate in a point-in-time or asynchronous mode wherein the data is copied to the remote or secondary data storage system asynchronously from the time when the primary or local data processing system returns the input/output completion signal (channel end and device end) to the primary host. This eliminates any performance penalty if the communication link between the primary and secondary data storage systems is too slow, but creates the additional needs to manage the situation where data is not identical or in "sync" between the primary and secondary data storage systems.

Thus, in the real time or synchronous mode, the primary data storage system automatically controls the duplication or copying of data to the secondary data storage system controller transparently to the primary host computer. Only after data is safely stored in both the primary and secondary data storage system, as detected by an acknowledgement from the secondary storage system to the primary storage system, does the primary data storage system acknowledge to the primary host computer that the data is synchronized. Should a disaster or facility outage occur at the primary data storage system site, the user will simply need to initialize the application program in the secondary data storage system utilizing a local host (52) or a commercial hotsite CPU or host 56.

The link between the primary and secondary storage system controllers 14 and 46 may be maintained in a unidirectional mode wherein the primary data storage system controller monitors and controls data copying or mirroring. Alternatively, a bi-directional implementation may be used wherein either controller can duplicate data to the other controller, transparently to the host computer. Should a disaster or facilities outage occur, recovery can be automatic with no human intervention since the operational host computer already has an active path (40, 58, 60) to the data through its local controller. While offering uninterrupted recovery, performance will be slower than in an unidirectional implementation due to the over head required to manage intercontroller tasks.

In the second, point-in-time or asynchronous mode of operation, the primary data storage system transparently duplicates data to the secondary data storage system after the primary data storage system acknowledges to the host computer, via channel end and device end, that the data has been written to the storage device and the input/output operation has been completed. This eliminates the performance impact of data mirroring over long distances. Since primary and secondary data are not synchronized, however, the primary data storage system must maintain a log file of pending data which has yet to be written to the secondary data storage device. Such data may be kept on removable, non-volatile media, in the cache memory of the primary or secondary data storage system controller as will be explained below, or in the service processor 34, 62 of the primary or secondary data storage system.

Accordingly, a feature of the data storage system 10 is the ability of a data storage system to control the transfer or copying of data from a primary data storage system to the secondary data storage system, independent of and without intervention from one or more host computers. Most importantly, in order to achieve optimum data mirroring performance, such data mirroring or copying should be performed asynchronously with input/output requests from a host computer. Accordingly, since data will not be immediately synchronized between the primary and secondary data storage systems, data integrity must be maintained by maintaining an index or list of various criteria including a list of data which has not been mirrored or copied, data storage locations for which a reformat operation is pending, a list of invalid data storage device locations or tracks, whether a given device is ready, or whether a device is write-disabled. Information must also be included as to the time of the last operation so that the data may later be synchronized should an error be detected.

A feature of the system of FIG. 1 is that both the primary or secondary data storage systems maintain a table of the validity of data in the other storage system. As disclosed in U.S. Pat. No. 5,206,939 entitled SYSTEM AND METHOD FOR DISK MAPPING AND DATA RETRIEVAL and which is fully incorporated herein by reference, the present system maintains a list or index, utilizing one or more flag bits, in a hierarchical structure, on each physical and logical data storage device.

In the system of FIG. 1, however, such information is kept on both devices for each individual system as well as the other data storage system. Thus, as illustrated in FIG. 2 in the partial list or table 100, each data storage system maintains an indication of write or copy pending 102 of both the primary data (M1) 104, and the secondary data (M2) 106. Similarly, an index is maintained of a pending format change since a disk format change may be accomplished. The format pending bits 108 including a first primary bit 110 and a second secondary bit 112 indicate that a format change has been requested and such change must be made on the disk.

Thus, when a host computer writes data to a primary data storage system, it sets both the primary and secondary bits 104, 106 of the write pending bits 102 when data is written to cache. For these examples, the M1 bit will refer to the primary data storage system and the M2 bit will refer to the secondary data storage system. When the primary data storage system controller's disk adapter writes the data to the primary data storage device, it will reset bit 104 of the write pending indicator bits 102. Similarly, once the secondary data storage system has written the data to the secondary data storage device, the secondary data storage write pending indicator bit 106 will be reset.

The service processors in one embodiment of the present invention will periodically scan the index table for write pending indicator bits and invoke a copy task which copies the data from the primary data storage device to the secondary data storage device. In addition, one or more of the spare index or table bits 114, 116 may be utilized to store other data such as time stamp, etc.

In addition to the write pending and format pending bits described above, the data storage system 10 also includes several additional general purpose flags to assist in error recovery. As shown in FIG. 3, invalid track flags 120 including primary bit 122 and secondary bit 124 are utilized and maintained on each data storage device to indicate that the data storage location such as a track, does not contain valid data. Another background task running on the data storage system such as in the service processor or storage system controller constantly checks invalid track bits on each data storage device, and if a bit is found to be set, the copy task is invoked to copy the data from the known good device to the device with the invalid flag track set. Additional flags may be provided such as the device ready flags 126 including bits 128 and 130 which serve to indicate that the device is ready. Similarly, write disable flags 132 may be provided which indicate that a particular primary device or drive 134 or secondary device or drive 136 can presently not be written to. Data can still be copied to the good or enabled drive and then later copied to the disabled drive. If one drive or device is bad, the present invention will set all tracks of that drive as not valid to later cause a copy of all the data.

Accordingly, each data storage device keeps data validity information about its mirrored device. If for some reason a device is not accessible, either the primary or the secondary device, every new write command goes to the accessible mirrored device along with information that the not accessible device has a track which is not valid. As soon as the non-accessible device becomes accessible, then automatically, as a background operation, the drives re-synchronize. In the case when a specific track is not shown on both the primary and secondary storage system, an indication of such will be assigned and the user will be alerted. A utility operating on the service processors will give the user a report of all the non-valid (out of sync) tracks. This report can be transferred from one site to another over the link 63, FIG. 1, that connects the two service processors 34, 62.

C. Communication Link Options

Figure 5:
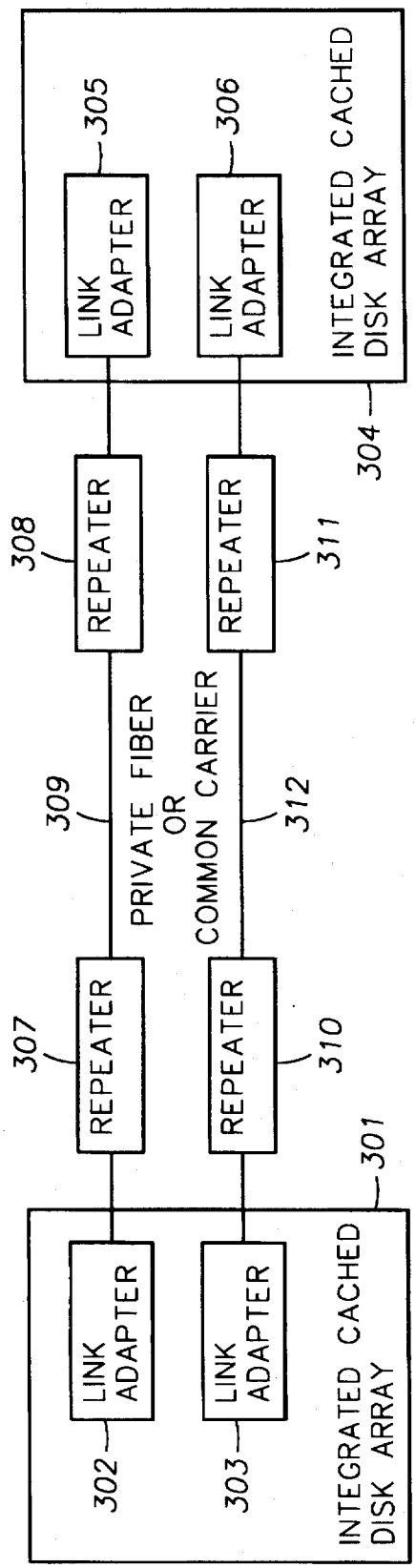
FIG. 5 is a block diagram of a short distance option for linking two geographically separated data storage systems.
Figure 6:
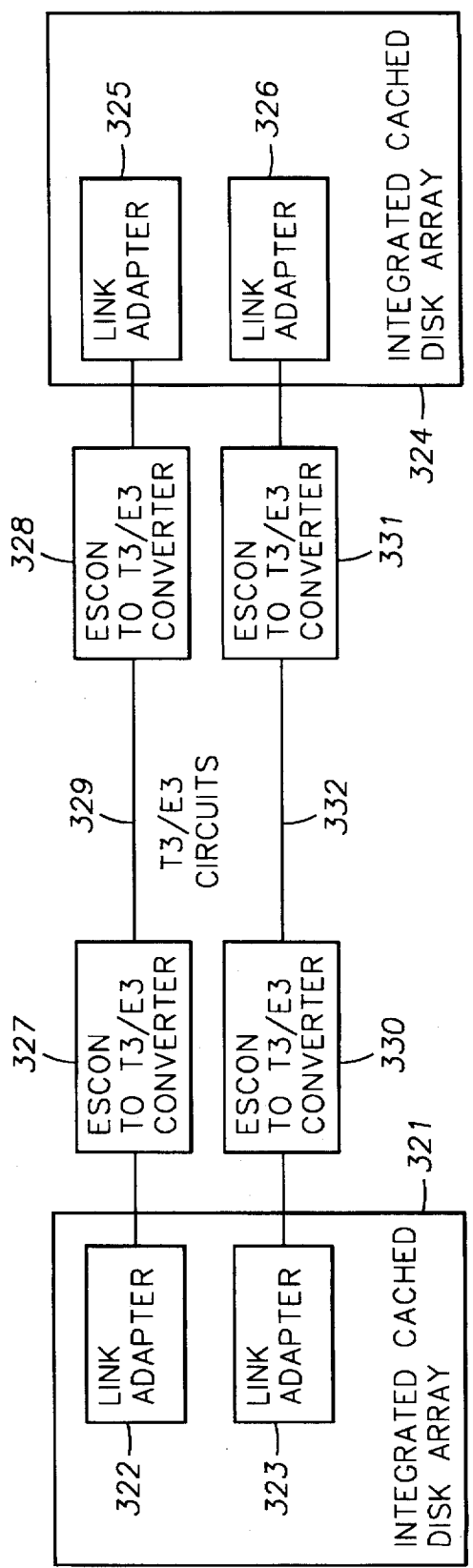
FIG. 6 is a block diagram of a long distance option for linking two geographically separated data storage systems.

As introduced above with respect to FIG. 1, the disk adapters 36 and 42 are configured for interconnecting the primary data storage system 14 to the secondary storage system via the high-speed link 40. Further details of various link options are shown in FIGS. 4 to 6.

Figure 4:
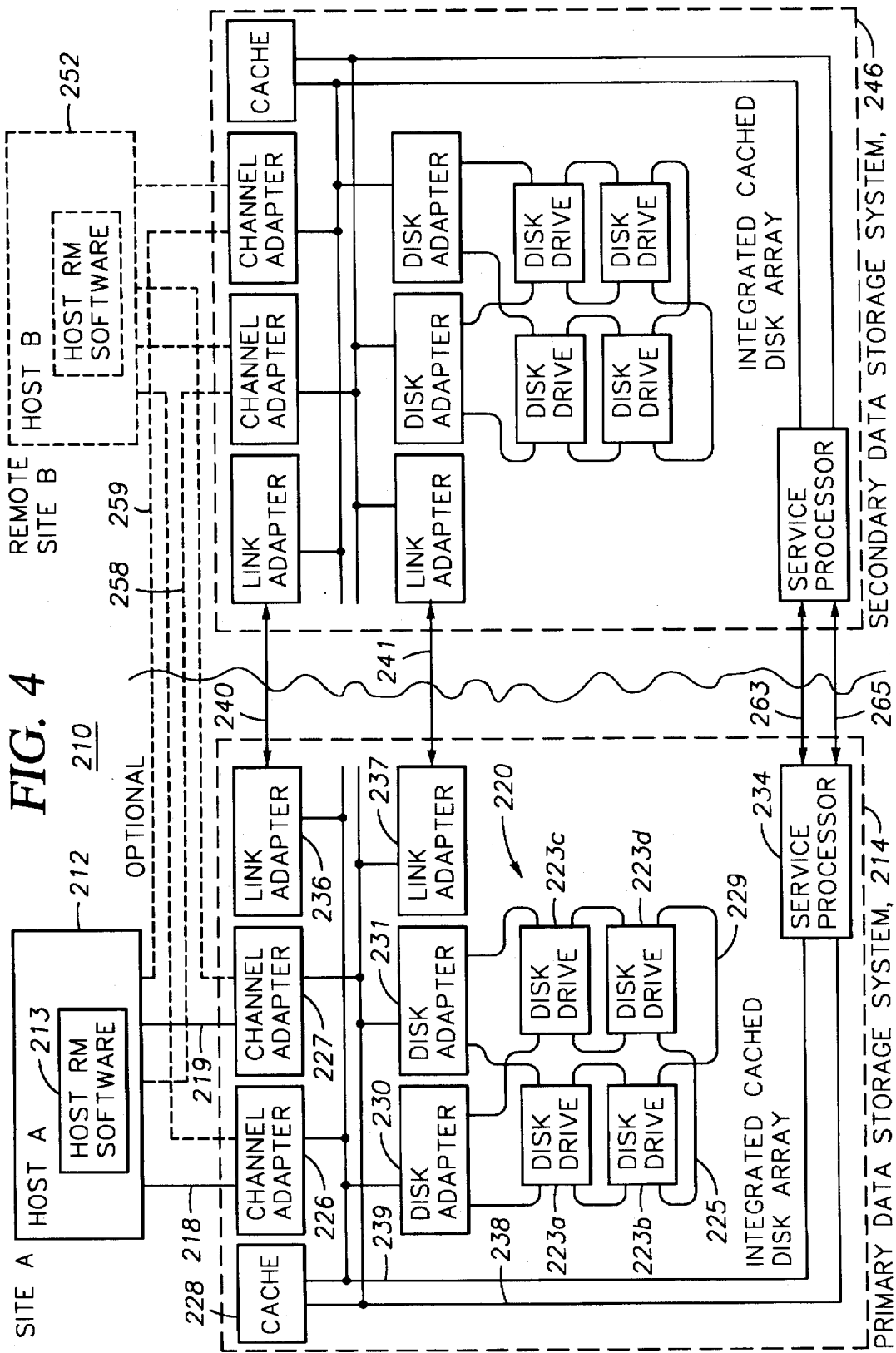
FIG. 4 is a block diagram showing a preferred construction for the remotely mirrored primary and secondary data storage systems and links.

FIG. 4 shows a data processing system 210 having a host central processing unit 212, a primary data storage system 214, and a secondary data storage system 246. In the preferred construction shown in FIG. 4, the primary and secondary data storage systems 214, 246 are integrated cached disk arrays having dual, redundant internal and external data links. In particular, the primary data storage system 214 has dual internal busses 238, 239 from a dual-port cache 228, dual channel adapters 226, 227, dual disk adapters 230, 231, and dual link adapters 236, 237. The host 212 at site A is connected to each of the dual channel adapters 226, 227 via respective channel links 218, 219. The secondary data storage system 246 is connected to the dual link adapters 236, 237 in the primary data storage system 214 via respective communicative links 240, 241. The secondary data storage system 246 is also connected to the primary data storage system via dual signal paths 263, 265 from a dual-port service processor 234.

Data storage 220 in the primary data storage system 214 is provided by an array of dual-port disk drives 223a, 223b, 223c, 223d. Each of the disk drives 223a, 223b, 223c, 223d, is connected to each of the disk adapters 230, 231 by a respective fiber channel loop 225, 229. For increased data storage capacity, additional disk drives could be inserted into the fiber channel loops 225, 229, and additional disk adapters could be included in the primary data storage system to accommodate additional fiber channel loops of additional disk drives.

As shown in FIG. 4, the secondary data storage system 246 preferably has the same construction as the primary data storage system 214, and could be linked to the host central processing unit 212 via redundant signal paths 258, 259. The data processing system 210 in FIG. 4 can be configured for remote mirroring from a user interface of the service processor 234 in the primary data storage system. The host central processing unit 212 can also be provided with optional host remote mirroring (RM) software 213 so that the data processing system can be configured and monitored from a user interface of the host central processing unit. Host application programs can also interface with the remote mirroring facility of the data storage systems 214, 246 via the optional host remote mirroring (RM) software 213. An optional host central processing unit 252 could be located at the remote site of the secondary data storage system 246, and linked to each of the primary and secondary data storage systems 214, 246 via redundant signal paths.

The communication links 240, 241 from the dual link adapters 236, 237 are preferably IBM ESCON standard fiber-optic links. An ESCON fiber-optic link, with continuous optical fiber, can link primary and secondary data storage systems spaced by up to 3 kilometers apart. ESCON links between primary and secondary storage units can be extended by repeaters or interfaces to T3 or E3 circuits. In practice, it is desirable to standardize link configurations to two options; namely, a relatively short distance option for distances up to about 60 kilometers (37.5 miles) between the primary and secondary storage units, and a relatively long distance option for distances greater than about 60 kilometers between the primary and secondary data storage systems. In each case, each link adapter has a standard two-port IBM specification LED multimode ESCON interface. It is desirable to provide a minimum of two and a maximum of at least eight link adapters in each data storage system.

Shown in FIG. 5 is the short distance option for interconnecting an integrated cached disk array 301 having link adapters 302, 303 to a remote integrated cached disk array 304 having link adapters 305, 306. Repeaters 307, 308 interface the ESCON channels from each of the link adapters 302, 305 to a private fiber or leased common carrier circuit 309 providing a static connection. In a similar fashion, repeaters 310, 311 interface the ESCON channels from each of the link adapters 303, 306 to a private fiber or leased common carrier circuit 312 providing a static connection. The repeaters 306, 307, 310, 311 are IBM 9032/9033 ESCON Directors or 9036 Remote Channel Extenders. These standard ESCON Directors or Remote Channel Extenders may be used in multiple 20 kilometer hops. In general, for the short distance option, the links can be any combination of multimode fiber, ESCON Directors, Remote Channel Extenders, and single-mode fiber to achieve the maximum link distance of 60 km.

Shown in FIG. 6 is the long distance option for interconnecting an integrated cached disk array 321 having link adapters 322, 323 to an integrated cached disk array 324 having link adapters 325, 326. ESCON to T3/E3 converters 327, 328 interface the ESCON channels from each of the link adapters 322, 325 to a T3 or E3 circuit 329. In a similar fashion, repeaters 330, 331 interface the ESCON channels from each of the link adapters 303, 306 to a T3 or E3 circuit 332. A suitable ESCON to T3/E3 converter may include Data Switch Corporation Model 9800 MAX (Multiple Architecture Extender). The 9000 MAX accepts up to four ESCON inputs, and multiplexes the data across 1 or 2 lines. T3 and E3 are copper or fiber-based telecommunications circuit. T3 is available in North America, and E3 is available in Europe. T3 has a bandwidth of 44.5 megabits per second, and E3 has a bandwidth of 34.5 megabits per second. A T3 or E3 circuit is sometimes referred to as "broad band". A T3/E3 circuit can be "fragmented", subdivided for multiple application or user access, or be dedicated point-to-point.

Data channels between a host and a storage system remote from the host can be constructed in a fashion similar to the links shown in FIG. 5 or 6.

D. Initial Synchronization

Once the physical links are established between the primary and secondary data storage systems, and the user specifies which logical storage devices or volumes are to be remotely mirrored, appropriate microcode is loaded into the data storage systems. It is also possible that the primary and secondary logical volumes could also be configured for local mirroring for enhanced redundancy. Alternatively, local redundancy could employ techniques for distributing the data bits of each byte or word of data in a logical device or volume across a multiplicity of physical disk drives in various ways known as levels of RAID (redundant arrays of inexpensive disks).

RAID techniques are described in the following publications: Patterson et al., "A Case for Redundant Arrays of Inexpensive Disks (RAID)," Report No. UCB/CSD 87/391, Computer Science Division (EECS), University of California, Berkeley, Calif., December 1987 (pages 1 to 24); Patterson et al., "Introduction to Redundant Arrays of Inexpensive Disks (RAID)," COMPCON 89 Proceedings, Feb. 27–Mar. 3, 1989, IEEE Computer Society, pp. 112–117; Ousterhout et al., "Beating the I/O Bottleneck: A Case for Log-Structured File Systems," Operating Systems Review, Vol. 23, No. 1, ACM Press, January, 1989, pp. 11–28; Douglis et al., "Log Structured File Systems," COMPCON 89 Proceedings, Feb. 27–Mar. 3, 1989, IEEE Computer Society, pp. 124–129; and Rosemblum et al., "The Design and Implementation of a Log-Structured File System," ACM Transactions on Computer Systems, Vol. 1, Feb. 1992, pp. 26–52; which are all incorporated herein by reference.

As soon at the communication links are established to interconnect the primary and secondary data storage systems, synchronization of the primary and secondary storage devices or logical volumes begins, and data is copied from the primary (R1) devices to the secondary (R2) devices. While this initial synchronization is occurring, host application input/output may be addressed to the primary (R1) devices. Typically, this application input/output is given precedence over the initial synchronization activity.

E. Multiple Simultaneous Operating Modes for the Remote Mirroring Facility

It is advantageous to provide the remote mirroring facility in the system 210 of FIG. 4 with multiple simultaneous operating modes best suited for the purposes of the desired remote mirroring. For example, remote mirroring may be used for data migration as well as for disaster recovery, and specific operating modes will be described that are best suited for data migration, and others will be described that are best suited for disaster recovery. Data migration, for example, typically occurs when a data center is moved from one geographic location to another, or when an old data storage system is replaced with a new data storage system.

Specific operating modes will also be described that are best suited for particular application programs. Different application programs, for example, may have different requirements for criticality of data integrity. Certain application programs may have specific procedures, such as transaction processing or journaling facilities, for ensuring data integrity relatively independent of the data integrity of the data storage systems.

The suitability of remote mirroring may also depend on the particular use or purpose of a dataset. Data bases, logs, catalogs, system residence volumes, and program libraries are excellent candidates for remote mirroring. Multiple logs when placed on separate logical volumes on different physical devices also aid business operations recovery in the event of a disaster. Page, spool, work, and sort datasets, however, are poor remote mirroring candidates as they are write-intensive often to only a small number of volumes.

To provide multiple simultaneous remote mirroring operating modes for specific applications, the remote mirroring facility defines an operating mode for each logical volume of data in the storage devices in the primary and secondary data storage systems 214, 246. Each logical volume may include a number of logical tracks of data and may reside on one or more disk drives in either the primary or secondary data storage system 214, 246.

Each logical volume has a logical volume type that is either primary, secondary, or local. A local logical volume does not participate in remote mirroring. A pair (R1, R2) of respective primary (R1) and secondary (R2) logical volumes participates in remote mirroring according to either a synchronous mode, a semi-synchronous mode, an adaptive copy - write pending mode, or an adaptive copy - disk mode, as will be further described below.

The operational modes are selectable at the logical volume level based on the performance, distance, and speed of recovery requirements. All primary (R1) volumes are configured for either the synchronous or semi-synchronous mode. These two modes are considered to be pre-determined remote mirroring modes. In addition, the primary (R1) volumes (all, individual, or a range) may also be configured for the adaptive copy - write pending or adaptive copy - disk mode. Each volume configured for adaptive copy also has an associated "skew" parameter. In the adaptive copy - write pending mode, this skew parameter is the maximum write pending threshold. In the adaptive copy - disk mode, this skew parameter is the maximum invalid tracks threshold. This skew value may be set to the same value for all adaptive copy volumes or be a different value for each adaptive copy volume. The adaptive copy mode and its skew value may be enabled (or disabled) for individual remotely mirrored pairs or all remotely mirrored pairs using remote mirroring commands.

(1) Synchronous Mode

In the synchronous mode, data on the primary (R1) and secondary (R2) volumes are always fully synchronized at the completion of an I/O sequence. The data storage system containing the primary (R1) volume informs the host that an I/O sequence has successfully completed only after the data storage system containing the secondary (R2) volume acknowledges that it has received and checked the data.

In particular, when the data storage system containing the primary (R1) volume has valid data in cache destined for a secondary (R2) volume, a link adapter transfers data over its link path to the cache in the data storage system housing the secondary (R2) volume. This data transfer occurs while the data storage system containing the primary (R1) volume continues to process input/output commands. If the data storage system containing the primary (R1) volume does not receive acknowledgment of a successful transfer from the other data storage system within a timeout period or another failure occurs that prevents the data transfer, the data storage system containing the primary (R1) volume sends a "unit check" with appropriate sense bytes to the host.

In a CKD environment, the data storage system containing the primary (R1) volume sends channel end (CE) and device end (DE) to the host after each write to the volume with the exception of the last write in the channel command word (CCW) chain. On the last write, the data storage system sends only CE to the host. When the data storage system containing the secondary (R2) volume acknowledges and checks receipt of the last write in the chain, the data storage system containing the primary (R1) volume sends DE to the host and the host considers the input/output complete and starts the next input/output operation.

In an open systems environment, the data storage system containing the primary (R1) volume handles each input/output command separately and informs the host of successful completion when the data storage system containing the secondary (R2) volume acknowledges and checks receipt of the data. That is, the data storage system containing the primary (R1) volume disconnects from the channel and informs the host of successful completion of the input/output operation only after confirming that the data resides in cache in both data storage systems. If a problem occurs with data synchronization, the data storage system containing the primary (R1) volume sends a "unit check" with appropriate sense bytes to the host. This causes the host to retry the input/output operation. These actions maintain data integrity and ensure that two copies of the data exist real-time in both systems before the input/output completes.

The synchronous mode is recommended primarily for the short distance option of FIG. 5. In normal operation, this mode will have an impact on write performance to primary (R1) volumes. This performance impact is due to overhead associated with remote data transfer, fiber latency, and acknowledgment of the synchronous operation.

(2) Semi-synchronous Mode

In the semi-synchronous mode, the remotely mirrored volumes (R1, R2) are always synchronized between the primary (R1) and the secondary (R2) prior to initiating the next write operation to these volumes. The data storage system containing the primary (R1) volume informs the host of successful completion after each write operation.

When the data storage system containing the primary (R1) volume has valid data in cache destined for a secondary (R2) volume, a link adapter transfers data via an available link path to the cache in the data storage system containing the secondary (R2) volume. This data transfer occurs while the data storage system containing the primary (R1) volume continues to perform additional channel commands. If the host issues a new write operation for a primary (R1) volume with a write pending status, the data storage system containing the primary (R1) volume disconnects from the host channel and returns a "non-immediate retry" message. The data storage system containing the primary (R1) volume then starts another input/output operation on another channel. When the write pending status is cleared (write completed and acknowledged and checked from the secondary (R2) volume), the data storage system containing the primary (R1) volume reconnects to the channel and continues processing the write operation on the channel from which it disconnected.

The semi-synchronous mode is recommended primarily for the long distance option of FIG. 6. The semi-synchronous mode is designed for situations needing high performance at the data storage system containing the primary (R1) volume and tolerating a gap of up to one input/output (worst case) in data synchronization. Although write operations can be held up due to synchronization between primary (R1) and secondary (R2) volumes, read operations continue uninterrupted.

The semi-synchronous mode is most suitable for page, spool, work, and sort datasets. In some cases, spreading these datasets across multiple physical devices may alleviate any performance impact due to a high number of writes.

(3) Channel Adapter Control Logic for the Pre-determined Modes

Figure 7:
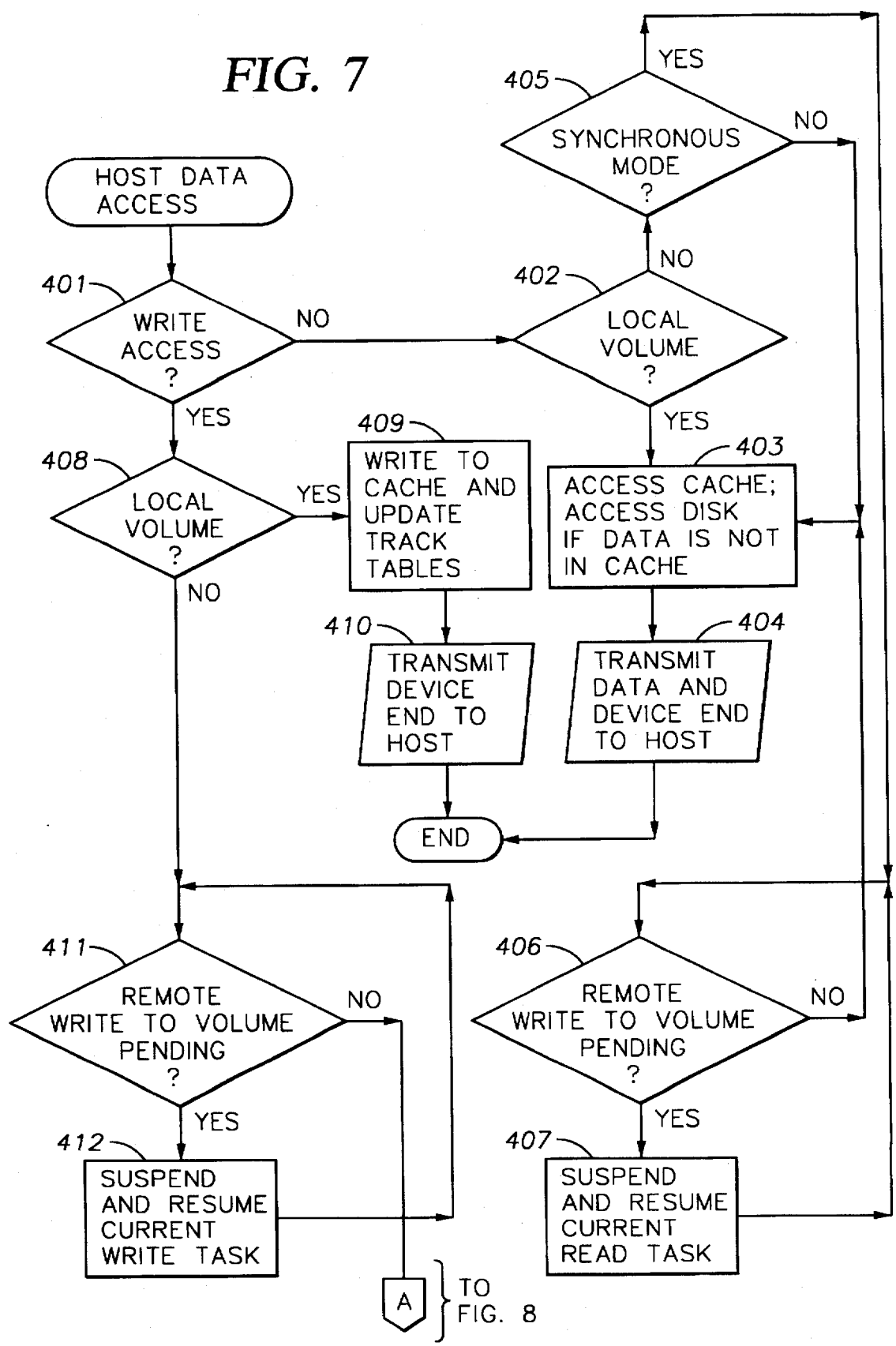
FIG. 7 is a first portion of a flowchart showing the operation of a channel adapter when providing data access in the synchronous and semi-synchronous remote mirroring modes.
Figure 8:
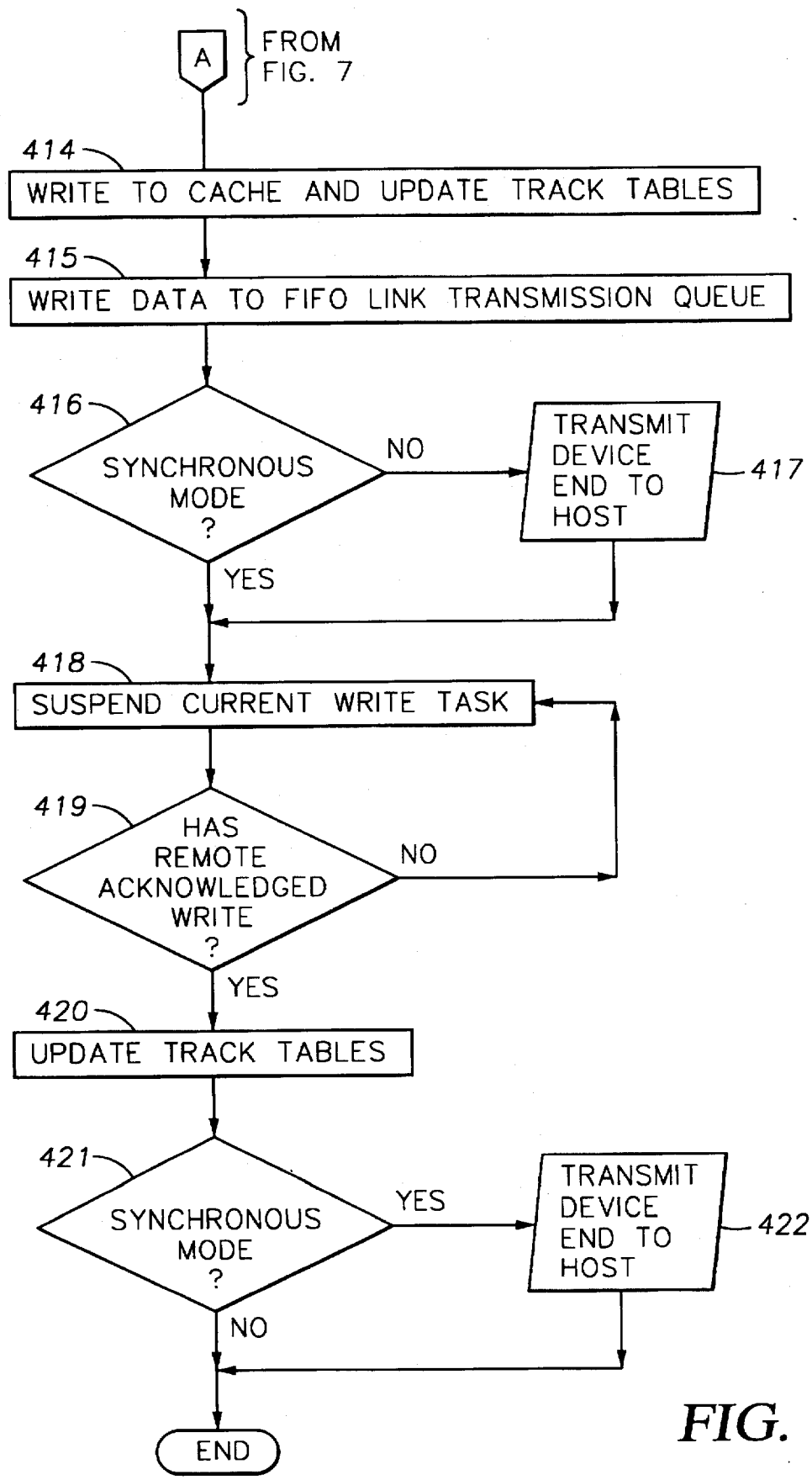
FIG. 8 is a second portion of the flowchart showing the operation of a channel adapter when providing data access in the synchronous and semi-synchronous remote mirroring modes.

Turning now to FIGS. 7 and 8, there is shown a flowchart of channel adapter control logic for the synchronous and semi-synchronous modes. In the preferred implementation, this control logic is specified by programming for microprocessors in the channel adapters.

In FIG. 7, a first step 401 is reached when the channel adapter receives a channel command from the host requesting data access to a volume. It is assumed that the host is not requesting direct access to a secondary (R2) volume in the data storage system containing the channel adapter. The host may request direct access to a secondary (R2) volume during recovery operations, which are described below. It is also assumed that the channel command is not in a chain of multiple channel commands. The chaining of multiple channel commands is described below with reference to FIG. 19.

In the first step 401 of FIG. 7, execution branches to step 402 for a read access. In step 402, the channel adapter accesses configuration information, and continues to step 403 if the host is requesting access to a local volume. Preferably, a separate copy of the configuration information is stored in local memory in each of the channel adapters and link adapters. This configuration information identifies whether a volume is local, primary, or secondary, and for each primary or secondary volume, identifies the other volume in the remotely mirrored volume pair.

In step 403, the channel adapter accesses the cache. If the data requested by the host is not in the cache, then the data is fetched by a disk adapter from disk storage in the data storage system, and loaded into the cache. Then, in step 404, the channel adapter transmits the data and a device end signal to the host, and the channel adapter has finished the task of servicing the channel command.

If the host channel command is requesting data in the primary (R1) volume of a remotely mirrored pair, then execution branches from step 402 to step 405. In step 405, execution branches to step 403 unless the data storage system is in the synchronous mode. For modes other than the synchronous mode, the reading of data from a primary (R1) volume is normally similar to the reading of data from a local volume; in either case, the requested data is fetched without delay from the cache or disk in step 403. Under the abnormal condition of the data being entirely absent from the data storage system due to a disk drive failure, however, a request for data access to a primary (R1) volume can be satisfied by obtaining the requested data from the secondary volume (R2) in the remote data storage system. The handling of such an abnormal condition is discussed below in connection with data recovery procedures.

In step 406, when a remote write is not pending to the secondary (R2) of the requested mirrored volume, execution also branches to step 403 to fetch the requested data from the cache or disk. When a remote write is pending to the secondary (R2) of the requested mirrored volume, however, execution continues to step 407 to suspend the current read task until the remote data storage system acknowledges completion of the pending remote write. Preferably, tasks suspended while waiting for completion of a pending remote write are placed on a first-in first-out (FIFO) queue of suspended tasks, and when the remote data storage system acknowledges completion of the pending remote write, any waiting tasks in queue of suspended tasks are serviced in the order in which the tasks were placed in the queue. Once the remote data storage system acknowledges completion of the pending remote write, and no remote write to the secondary (R2) of the mirrored volume is pending, as tested in step 406, execution branches to step 403 to fetch the requested data from the cache or disk.

When the host has requested a write access, execution continues from step 401 to step 408. In step 408, execution branches to step 409 when the host has requested a write access to a volume that is local. In step 409, data from the host is written to cache, and the track tables are updated to reflect that the old data on disk is invalid in view of the new data from the host, and that a write operation to disk is pending for the invalid track or tracks on disk.

Then in step 410, a device end (DE) signal is returned to the host to signal completion of the write operation. The signaling of the completion of a write operation before the data is actually written to disk is a well-known technique called "fast write." Semiconductor random-access memory containing the write data is backed-up by a battery sufficient to power the memory and some disk drives while the write data is transferred to the disk drives in the event of a power failure.

When the host has requested a write operation to a volume defined as a mirrored volume pair, execution continues from step 408 to step 411. In step 411, execution continues to step 412 when a remote write to the secondary (R2) of the remotely mirrored volume is pending. In step 412, the current write task is temporarily suspended, while awaiting receipt from the remote data storage system of acknowledgement of completion of the pending remote write, as tested in step 411. When no remote writes to the secondary (R2) of the remotely mirrored volume are pending, execution branches from step 411 to step 414 in FIG. 8.

In step 414 of FIG. 8, the data from the host is written to the cache, and the track tables are updated to indicate that the track or tracks for the new data in disk for the primary (R1) volume are invalid and have a pending write operation to disk, and that the track or tracks for the new data are invalid in the secondary (R2) of the remotely mirrored volume and have a pending write to the cache in the remote data storage system. Due to the incorporation of the "fast write" technique of acknowledging a write to a secondary (R2) volume when the update is written to cache of the data storage system containing the secondary volume, the remote "invalid" and "write pending" status for the secondary (R2) volume in the track tables of the data storage system containing the corresponding primary (R1) volume refers to the status of the secondary (R2) volume in cache or on disk; in particular, the remote "write pending" status indicates a pending write over the link to the cache in the data storage system containing the secondary (R2) volume. When the "fast write" technique is used, it is still necessary, for carrying out the local destage or write back operation, for each data storage system to record, for each track or data record, an indication of whether a local destage operation is pending, and such a local destage operation is pending when the track or record is valid and is in cache but the disk drives do not have valid data for the track or record.

Next, in step 415, the write data from the host is written to a first-in, first-out (FIFO) link transmission queue (504 in FIG. 18) for transmission by a link adapter to the remote data storage system. Preferably, the entries in the queue contain pointers to the data in cache. When a link adapter becomes available, it services this FIFO queue by transmitting the data identified by the entry at the head of the queue across the link to the remote data storage system.

Next, in step 416, execution branches to step 417 when the data storage system is not in the synchronous mode. In step 417, the channel adapter transmits a device end (DE) signal to the host, and execution continues to step 418. Execution also continues to step 418 from step 416 when the data storage system is in the synchronous mode.

In step 418, the current write task is suspended, until the remote data storage system has received the write data, written the data in its cache, and has acknowledged completion of the remote write operation. In the short distance option, the remote acknowledgement should be received just before a next remote write task sends data over the link, and therefore it may be feasible for the link adapter to poll for the remote acknowledgement. In the long distance option, the next remote write task may send data over the link well before the acknowledgement is received, so that receipt of the acknowledgement causes an interrupt re-activating the suspended write task. Once the data storage system receives the acknowledgement of completion of the remote write, as tested in step 419, execution continues to step 420. In step 420, the track tables are updated to indicate completion of the remote write to the cache of the secondary (R2) volume in the remotely mirrored volume pair, so that the track or tracks of the new write data are valid in the secondary (R2) volume.

From the control flow in FIGS. 7 and 8, it is clear that when a host writes data to a remotely mirrored volume, the following sequence of events takes place in the synchronous mode: data is written to the cache of the data storage system containing the primary (R1) volume (step 414); an entry is placed in the FIFO link queue for transmission of the data to the data storage system containing the secondary (R2) volume (step 415); the data storage system containing the secondary (R2) volume acknowledges receipt of the data (step 419); the track tables are maintained (step 420); and a device end (DE) signal is presented back to the host that initiated the write request (step 422). In the synchronous mode, all accesses (reads and writes) to the remotely mirrored volume to which a write has been performed are suspended (steps 407 and 412) until the write to the secondary (R2) volume has been acknowledged.

From the control flow in FIGS. 7 and 8, it is clear that when a host writes data to a remotely mirrored volume, the following sequence of events takes place in the semi-synchronous mode: data is written to the cache of the data storage system containing the primary (R1) volume (step 414); an entry is placed in the link FIFO queue for transmission of the data to the data storage system containing the secondary (R2) volume (step 415); a device end (DE) signal is presented back to the host that initiated the write request (step 417); the data storage system containing the secondary (R2) volume acknowledges receipt of the data (step 419); and the track tables are maintained (step 420). In the semi-synchronous mode, read access to the volume to which a write has been performed is allowed (steps 405, 403) while the write is in transit to the data storage system containing the secondary (R2) volume. A second write to the volume is not allowed (steps 411, 412) until the first has been safely committed to the secondary (R2) volume. Thus, a single secondary (R2) volume may lag its respective primary volume (R1) by only one write.

In the semi-synchronous mode, by presenting an earlier device end (DE) signal to the host (in step 417 instead of step 422), it is possible that a write operation to a different volume, logically dependent on the write to the first volume, will be issued by a host operating system and data base management system. This presents no threat of data inconsistency in the data storage system, because the link transmission queue (step 415) is managed on a FIFO basis; the data is transmitted over the link and processed by the remote data storage system in the order in which the data is loaded into the link transmission queue. By inhibiting the link transmission queue from receiving any new entries (or switching all logically dependent volumes to synchronous mode), the remote data storage system will have a consistent set of data in its secondary (R1) volumes when all entries in the queue have been transmitted and written to the secondary (R2) volumes.

(4) Adaptive Copy - Write Pending

The adaptive copy - write pending mode transfers data from the primary (R1) volume to the secondary (R2) volume and does not wait for receipt acknowledgment or synchronization to occur. This mode keeps the data in the secondary (R2) volume as current to the data in the primary (R1) volume as possible.

In the adaptive copy - write pending mode, the data storage system containing the primary (R1) volume informs the host of successful completion after each write. When the data storage system containing the primary (R1) volume has valid data in cache for a remotely mirrored pair, it destages that data to the primary (R1) volume, and a link adapter transfers the data over an available link path to the cache in the data storage system containing the secondary (R2) volume. This data transfer occurs while the data storage system containing the primary (R1) volume continues to process input/output commands. All writes for remotely mirrored pairs accumulate in the cache of the data storage system containing the primary (R1) volume as write pendings until the data can be successfully written to the secondary (R2) volume and the disk storage of the primary (R1) volume.

Should a problem arise with data transfer to the data storage system containing the secondary (R2) volume or the data storage system is unable to write the data to the disk storage of the primary (R1) volume, the data storage system containing the primary (R1) volume retains that data in its cache until the problem can be corrected and the data is successfully written to the secondary (R2) volume and the disk storage of the primary (R1) volume.

The adaptive copy - write pending mode is responsive to the user-configurable skew parameter (maximum allowable write pending tracks) for each primary (R1) volume configured for this mode. When the skew parameter is reached, the remote mirroring operational mode switches to the pre-determined synchronous or semi-synchronous mode for the remotely mirrored (R1, R2) pair. When the number of write pending tracks for the secondary (R2) volume drops below the skew value, the remote mirroring operational mode switches back to the adaptive copy - write pending mode for the remotely mirrored pair. The skew value may range from 1 to 65,535, and has a default value of 65,535.

The adaptive copy - write pending mode can be enabled or disabled for one remotely mirrored volume pair, all remotely mirrored pairs, or a range of remotely mirrored pairs during configuration from a user interface at the service processor, or during operation of the optional host remote mirroring software. When the adaptive copy - write pending mode is disabled, the remotely mirrored pairs operate in the pre-determined synchronous or semi-synchronous operational mode for the remotely mirrored (R1, R2) logical volume pair.

The adaptive copy - write pending mode is designed to have little or no impact on performance between the host and the data storage system containing the primary (R1) volume and to offer protection against loss of data in the unlikely event that a primary (R1) or secondary (R2) volume fails or all link paths are lost. The adaptive copy - write pending mode is ideal for situations when a large amount of data must be transferred to remote devices and performance must not be compromised at the local site; or, for situations where it is not necessary for remotely mirrored volumes to be synchronized at all times. The remotely mirrored volumes are allowed to drift out of synchronization for higher performance, but they stay within a pre-determined number of write pendings with protection against data loss.

The adaptive copy - write pending mode of operation is convenient in situations where the write activity caused by heavy batch loads or data reorganization can severely impact performance due to the data storage systems maintaining a full synchronous state. In these cases, the skew parameter should be set to its maximum, default value (65,535). Then the adaptive copy - write pending mode should be enabled for all remotely mirrored pairs, and data transfers begin between the primary and secondary logical volumes.

In many systems, it is not necessary that all primary and secondary logical volumes be fully synchronized. Logical volumes requiring full synchronization are configured for synchronous or semi-synchronous operation. Those logical volumes that do not require full synchronization are configured for the adaptive copy write pending mode and a low skew value (i.e., 100). When data transfers begin, such a remotely mirrored pair operates in the adaptive copy - write pending mode until "bursts" of high write activity cause the number of write pending operations to exceed the low skew value, and the remotely mirrored pair is forced to the pre-determined synchronous or semi-synchronous mode. When the number of write pending operations for the secondary (R2) volume drops below the skew value, the remotely mirrored pair returns to the adaptive copy - write pending mode. Any new writes for the pair accumulate in cache as write pendings. Synchronization will occur when the remotely mirrored pair switches to the pre-determined synchronous or semi-synchronous mode.

For some applications, it is desirable to disable the adaptive copy - write pending mode for specified volumes. When the data storage system containing the primary (R1) volume(s) receives a command to disable the adaptive copy - write pending mode, it does not achieve a synchronous or asynchronous state immediately. The remotely mirrored pairs with write pendings continue to be transferred to the secondary volumes (R2) in the adaptive copy - write pending mode until all writes prior to the disable command have been transferred to the respective secondary (R2) volumes. Then the remotely mirrored pairs achieve the synchronous or semi-synchronous state, and writes subsequent to the disable command are handled in the pre-determined remote mirroring mode (synchronous or semi-synchronous).

(5) Adaptive Copy - Disk Mode

The adaptive copy - disk mode transfers data from the primary (R1) volume to the secondary (R2) volume and does not wait for receipt acknowledgment or synchronization to occur. This mode is intended to be a temporary operating mode and has little impact on performance between the host and the data storage system containing the primary (R1) volume. This operational mode keeps the data in the secondary (R2) volume as current to the data in the primary (R1) volume as possible.

In this mode, the data storage system containing the primary (R1) volume acknowledges all writes to the primary (R1) volume as if they were to a local volume. The data storage system containing the primary volume accumulates the new data on the primary (R1) volume marking it as "invalid tracks" for the secondary (R2) volume. Synchronization of the primary (R1) and secondary (R2) volumes is reported to the data storage system containing the primary (R1) volume only. The data storage system does not issue a "service alert" message to the host to notify it of this event.

The adaptive copy - disk mode can be enabled or disabled for one remotely mirrored volume pair, all remotely mirrored volumes, or a range of remotely mirrored volumes, using commands entered at the service processor at the data storage system containing the primary (R1) volume, or using the host remote mirroring software. When the adaptive copy - disk mode is disabled, the data storage systems operate in the pre-determined synchronous or semi-synchronous mode for the mirrored volume pair (R1, R2).

The adaptive copy - disk mode uses the user-configurable skew parameter (maximum invalid tracks), that, when its value is exceeded for a remotely mirrored volume pair, causes the mode to switch to the pre-determined synchronous or semi-synchronous mode for the remotely volume mirrored pair. (Therefore, in any case, all write operations between the remotely mirrored volumes are fully synchronized.) When the number of invalid tracks for a secondary (R2) volume goes below the value specified by the skew parameter, the operating mode switches back to the adaptive copy - disk mode for that volume pair. The skew value, for example, may range from 1 to 999,999, and the default value is the maximum value of 999,999.

The adaptive copy - disk mode is designed for situations requiring the transfer of large amounts of data to remote devices without loss of performance. Because the mode cannot fully guard against data loss should a failure occur, this mode is recommended for temporarily transferring a bulk of data to secondary (R2) volumes and then switching to either synchronous or semi-synchronous mode without any adaptive copy, or with adaptive copy - write pending mode (if some lack of synchronization between the remotely mirrored volume pairs can be tolerated) to ensure full data protection.

The adaptive copy - disk mode is convenient in situations where it is necessary to either migrate a data center from one location to another or create a mirror image of the data in a separate location without a disruption in operation. Without the use of the adaptive copy - disk mode, the write activity caused by the movement of large amounts of data could severely impact performance, particularly in either the synchronous or semi-synchronous mode. In this example, the large data transfer is only a temporary condition. The skew parameter set to its maximum, default value, and the adaptive copy - disk mode should be enabled for all remotely mirrored pairs. When the data migration or data copy operation has completed (or is near completion), the mode should be switched to the synchronous, semi-synchronous, or adaptive copy - write pending mode, depending on the degree of synchronization needed between the remotely mirrored volume pairs.

(6) Channel Adapter Control Logic for the Adaptive Modes

Figure 9:
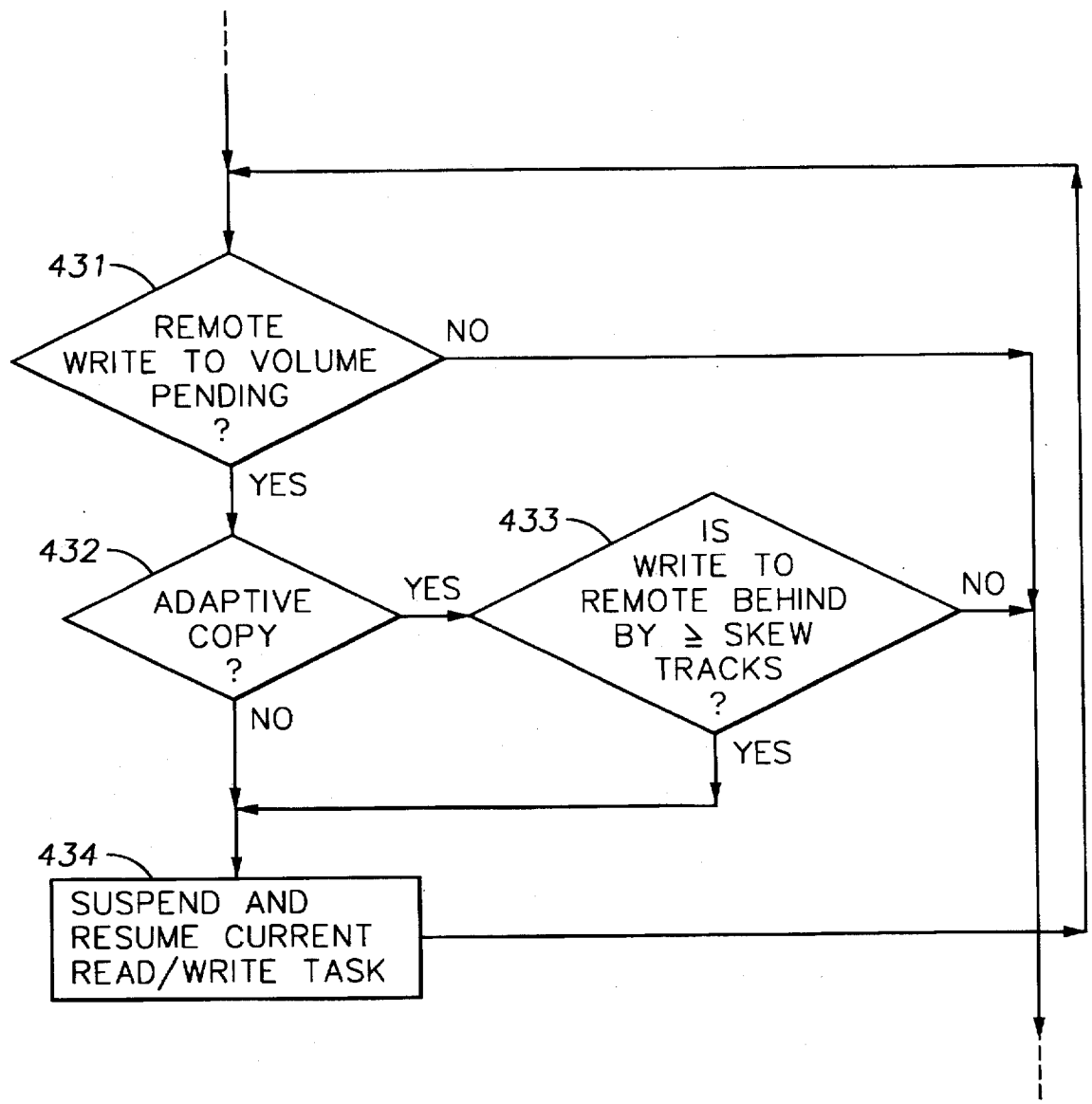
FIG. 9 is a flowchart showing a modification of FIG. 7 for adaptive copy remote mirroring modes.

To handle the adaptive modes, a few steps in the flowchart of FIG. 7 are modified. FIG. 9 shows the modifications. In particular, steps 431 to 434 of FIG. 9 are substituted for steps 406 to 407 of FIG. 7, and steps 431 to 434 of FIG. 9 are also substituted for steps 411 to 412 of FIG. 7. It should be apparent that steps 432 and 433 of FIG. 9 are inserted between steps 406 and 407 of FIG. 7 so that when the primary mode is the synchronous mode and a remote write to the volume is pending, the current read task is not suspended in the adaptive mode (step 432) until the number of remote write pending tracks reaches the value of the skew parameter. In a similar fashion, steps 432 and 433 of FIG. 9 are inserted between steps 411 and 412 of FIG. 7 so that when a remote write to the volume is pending, the current write task is not suspended in the adaptive mode (step 432) until the number of remote write pending tracks reaches the value of the skew parameter.

In order to determine whether or not any remote write is pending to a secondary (R2) volume and if so, to determine whether the number of remote write pending tracks has reached the value of the skew parameter, the data storage system maintains in cache an "invalid tracks" count associated with each logical volume. The "invalid tracks" counts for the volumes are set to zero during the initial configuration of the system, and an "invalid tracks" count of zero indicates that the secondary (R2) volume is fully synchronized with its respective primary (R1) volume. The data storage system containing the primary (R1) volume increments the "invalid tracks" count each time a write operation for the secondary (R2) volume is placed in the FIFO link transmission queue for transmission over the communication link to the data storage system containing the secondary (R2) volume (step 415 of FIG. 8), and decremented each time that the data storage system containing the primary (R1) volume receives an acknowledgement of completion of the write operation in the remote data storage system (steps 419 to 420 in FIG. 8). Therefore, in step 431 of FIG. 9, the "invalid tracks" count for the secondary (R2) volume is compared to zero, and a remote write to the volume is pending if the "invalid tracks" count is not zero. In step 433 of FIG. 9, the "invalid tracks" count for the secondary (R2) volume is compared to the skew value, and if the "invalid tracks" count is greater or equal to the skew value, then the number of remote write pending tracks is greater or equal to the skew value.

F. Data Consistency and Host Access to Secondary (R2) Volumes

Unless the secondary (R2) volumes are synchronized to the primary (R1) volumes, the data in the secondary volumes may not be consistent. If a local host processor is writing to the primary (R1) volumes at the same time that a remote host processor is reading the corresponding secondary (R2) volumes, the remote processor may read inconsistent data. For example, the local processor may be executing a transaction that transfers $10.00 of a client's funds between two of the client's accounts. The local processor executes a first write that debits the first account by $10.00, and executes a second write that credits the second account by $10.00. If the remote processor reads the secondary volume when only the first write has been written in the secondary volume, and then computes the client's total funds, it will find a loss of $10.00. It is a user responsibility to ensure that the use to which such read-only data is put is consistent with the possibility of data inconsistency. In general, the secondary (R2) volumes should be accessed only after synchronization is achieved by suspending remote mirroring, and waiting until all pending remote writes have been transferred to the secondary volumes.

If a remote host processor should perform a read/write access on an inconsistent dataset, not only is it possible that the host processor will obtain an inconsistent result, but also the dataset may become further corrupted and made worthless.

Unfortunately, in the situation of a disaster that interferes with the data storage system containing the primary (R1) volumes, the best copy of the dataset available may reside in the secondary volumes, and the user may be faced with the difficult decision of whether the dataset should be used for a read/write application, discarded, or in some way repaired with whatever information is available about the past history of the dataset.

It is also possible that an automatic recovery technique may further corrupt the dataset in the secondary (R2) volumes in the case of a "rolling disaster." In the rolling disaster, a remote mirroring relationship exists between the two data storage systems. All links break between the sites, and application processing continues using the primary (R1) volumes. The links are restored, and resynchronization commences by copying data from the primary (R1) volumes to the secondary (R2) volumes. Before resynchronization is finished, however, the primary volumes are destroyed, and the attempt at resynchronization has further corrupted the secondary volumes.

Although the probability of a rolling disaster is quite low, the extent of data loss can be severe where application processing continues for some time against the primary volumes. In this situation, it is not practical to record a log of every single write to the primary volume. Instead, as described above for the adaptive copy modes, only the data for the most recent write to each track is maintained in the primary volume, together with a record of the particular "invalid tracks" that need to be written to the secondary volumes to achieve synchronization. The resynchronization activity is not time-based, but rather is a process of copying those tracks that have changed during the outage of the link. Therefore, the process of attempting to bring the secondary volumes to the consistent state of the primary volumes existing when the link is re-established at first tends to further corrupt the secondary volumes, which were nearly in a consistent state at the time of the initial failure of the link.

The preferred embodiment of the invention addresses these problems in a number of ways. Each write request transmitted over the link between the data storage systems includes not only the data for the track in the secondary (R2) volume to be updated but also the current "invalid track" count for the secondary (R2) volume as computed by the data storage system containing the corresponding primary (R1) volume. Therefore, once a disaster occurs that destroys the data storage system containing the primary volume, the data storage system containing the secondary (R2) volume has an indication of the degree of consistency of the secondary (R2) volume. The "invalid tracks" count can be used to determine an appropriate recovery operation for the volume, and can be used to selectively restrict read/write access to the volume when the user decides that synchronization should be required for a write access.

The preferred embodiment of the invention also gives the user various features to avoid the rolling disaster by inhibiting automatic recovery. These features include a "volume domino mode" that inhibits automatic access to one volume of a mirrored volume pair when the other volume is inaccessible, and a "links domino mode" that prevents access to the two volumes in a mirrored volume pair when all links fail. Moreover, alternative recovery procedures are provided for responding to an all-links failure in order to minimize the extent of damage caused by the rolling disaster.

G. States of Remotely Mirrored Volumes

In the preferred implementation of remote mirroring, primary (R1) and secondary (R2) volumes have particular states that govern host access. A primary (R1) volume is in either a ready state or a not ready state. A secondary (R2) volume is in either a not ready state, a read-only state, or a read-write state. The state of the primary (R1) volume governs access to the primary volume by a host connected to a channel adapter of the data storage system containing the primary volume. The state of the secondary (R2) volume governs access to the secondary volume by a host connected to a channel adapter of the data storage system containing the secondary volume. In other words, the volume state is seen by the host connected to the storage system containing the volume.

The preferred embodiment of the invention defines a set of states for the primary (R1) and secondary (R2) volumes in order to control host access to the volumes. These states are set by flags in volume tables in the cache memory of the data storage system containing the respective primary (R1) or secondary (R2) volumes.

(1) Primary (R1) Volume States (a) Primary Volume Ready

In this state, the primary (R1) volume is online to the host and available for read/write operations. This is the default primary (R1) volume state.

(b) Primary Volume Not Ready

In this state, the primary (R1) volume responds "intervention required/unit not ready" to the host for all read and write operations to that volume. The host will also be unable to read from or write to the secondary (R2) volume associated with that volume.

(2) Secondary (R2) Volume States (a) Not Ready State

In this state, the secondary (R2) volume responds "intervention required/unit not ready" to the host for all read and write operations to that volume. This is the default secondary (R2) volume state.

(b) Read-Only State

In this state, the secondary (R2) volume is available for read-only operations.

(c) Read/Write State

In this state, the secondary (R2) volume is available for read/write operations.

H. "Sync Required" Attribute for Secondary Volumes

In the event of a disaster that renders all equipment at one site non-operational, secondary (R2) volumes on the mirrored data storage system at the remote site can be made available to a remote host for read-only or read/write operations by issuing commands at the service processor of the data storage system containing the secondary (R2) volumes, or by issuing commands to host remote mirroring software in the remote host. In its default configuration, all secondary (R2) volumes are not ready to the remote host. (These secondary (R2) volumes can also be configured for a read-only state.)

Each secondary (R2) volume has a configurable attribute, "sync required", for selectively preventing a secondary (R2) volume from becoming ready to the remote host if a state change is attempted while it is not synchronized with its primary (R1) volume. If the "sync required" attribute is not enabled, then all specified state changes to the secondary (R2) volume take effect when requested. If the "sync required" attribute is enabled, and if the secondary (R2) volume is not synchronized with the primary (R1) volume and not ready to the remote host at the time of the failure, then the non-synchronized secondary (R2) volume will remain not ready. Regardless of the state of the "sync required" attribute, if the secondary (R2) volume were synchronized with the primary (R1) volume and not ready to the remote host at the time of the failure, then the secondary (R2) volume will assume the specified change of state (read-only or read/write enabled).

Secondary (R2) volumes configured as read-only with the "sync required" attribute enabled can work in their read-only state with the remote host regardless of their synchronization state with the primary (R1) volumes. If an attempt is made to change the state of a secondary (R2) volume to read/write enabled and the secondary (R2) volume is synchronized with the primary (R1) volume at the time of the failure, the state change occurs. If the secondary (R2) volume was not synchronized with the primary (R1) volume, then the state change does not occur and the data storage system reports the non-synchronous state to the remote host.

Figure 10:
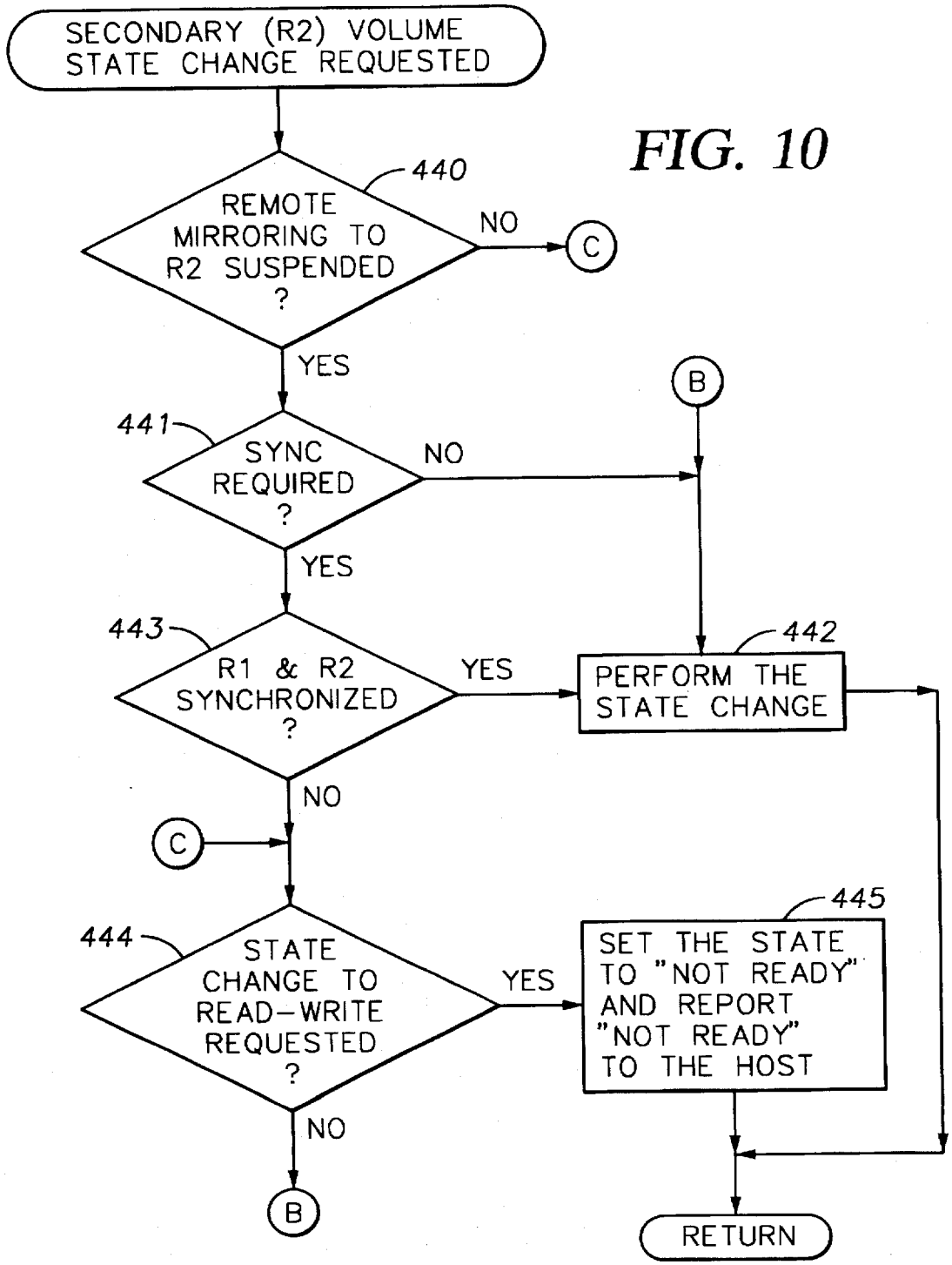
FIG. 10 is a flowchart showing operation of a data storage system when a host requests a state change to a secondary (R2) volume in the data storage system.

Turning now to FIG. 10, there is shown a flowchart of the control logic in a channel adapter for restricting the ability of a host to access a secondary (R2) volume in the fashion described immediately above. In a first step 440, execution continues to step 441 if remote mirroring to the secondary (R2) volume has been suspended. When remote mirroring to the secondary (R2) volume has been suspended, writes to the secondary (R2) volume are not accepted from the data storage system containing the corresponding primary (R1) volume. In step 441, execution branches to step 442 if the "sync required" attribute is set for the secondary (R2) volume. In step 442, the requested state change is performed. If the "sync required" attribute is not set for the secondary (R2) volume, then execution continues from step 441 to step 443. In step 443 execution branches to step 442 if the secondary volume (R2) is synchronized with its corresponding primary volume (R1). In other words, execution branches from step 443 to step 442 if the "invalid tracks" count for the secondary volume is zero. If the secondary (R2) volume is not synchronized with its corresponding primary volume (R1), then execution continues from step 443 to step 444. In step 444, execution branches to step 445 if the host is requesting a state change to a read-write state. If so, then in step 445 the state of the secondary (R2) volume is set to "not ready" and the channel adapter reports to the host that the secondary (R2) volume is "not ready." If in step 444 the host was not requesting a state change to read-write, then execution continues from step 444 to step 442 to perform the state change to either "not ready" or read-only, as requested by the host.

If in step 440 remote mirroring was not found to be suspended to the secondary (R2) volume, then execution branches to step 444 in order to prevent any state change to read-write. However, a state change to read-only or "not ready" is permitted when remote mirroring to the secondary (R2) volume is occurring.

After the state of the secondary volume is set in steps 442 or 445, execution returns.

I. Recovery

In the preferred implementation of remote mirroring, a number of different recovery procedures are available to respond to various device and system failures or outages. The recovery procedure that is used should depend on the kind of failure or outage, the degree of host or user involvement that is deemed necessary or appropriate, the type of datasets or applications that could be affected, and the desired degree of data integrity.

In general, a recovery operation is performed if either all links are inoperative, a primary volume is inaccessible, or a secondary volume is inaccessible. If only some of the link paths are inoperative, the remote mirroring operations may continue on the remaining link paths. If all of the links are inoperative, then either an application may continue without mirroring new write data, or an application may be interrupted until at least one link is restored. If a primary volume is inaccessible, its secondary volume can be accessed, and the primary volume can be recovered by copying from its respective secondary volume. If a secondary volume is inaccessible, it can be recovered by copying from its primary volume. However, these typical scenarios can become more complicated if a second failure affecting a mirrored volume pair occurs before the completion of recovery from the first failure. Therefore, in the preferred implementation of remote mirroring, a number of different recovery methods are provided, as will be described below.

When the user is involved in recovery, the user may access the data storage system service processor to obtain the status of remotely mirrored volumes and then move control between the data storage systems during the disaster recovery process. The host remote mirroring software may also be accessed by the user or a host application in order to obtain status and directly control disaster recovery.

(1) Data Loss

The remote mirroring mode at the time of a storage system failure or outage will determine the minimal amount of data loss when recovery is finished.

In the synchronous operational mode, no data need be lost in the event of a disaster. The data storage system aborts the input/output currently in progress, but does not acknowledge this action to the host. This data is not considered lost.

In the semi-synchronous mode, the minimal amount of data lost depends on the number of transactions enroute to the secondary volumes when a disaster occurs. If only the host central processing units or power attached to the data storage system containing primary (R1) volumes are lost, no data loss occurs. If the entire site is lost, including all link paths, all transactions enroute are lost. In a worst case scenario, one input/output per volume will be lost.

In the adaptive copy modes, the worst case scenario is loss of an entire data storage system containing primary (R1) volumes. All write data pending transmission to the remote data storage system is lost.

(2) Automatic Recovery from Disk Drive Failure

In most cases, an automatic recovery mode is suitable for recovering from a disk drive failure. A user or host application, however, may wish to ensure that an application is always interrupted immediately in case of a disk drive failure, for example, in order to maintain primary and secondary volumes that are always in synchronization. In this case, a volume domino mode should be used, as further described below.

In the automatic mode, if the data is not available in cache during a read operation, then the data storage system reads the data from the primary (R1) volume. If a data check occurs on this device, the data storage system automatically reads the data from the secondary volume. Should one volume in the remote mirrored pair fail, the data storage system automatically uses the other volume without interruption. The data storage system notifies the host with an "environmental data present" error, and notifies a customer support center of the data storage system manufacturer with an error code designating that the primary or secondary volume has failed. No user intervention is required. When the defective disk device is replaced, the data storage system re-synchronizes the mirrored pair, automatically copying data to the new disk. In a similar fashion, when an outage occurs, e.g., to perform maintenance activity on a remotely mirrored volume for an extended period of time, the primary (R1) volume tracks all updates to its secondary (R2) volume and copies the updated tracks to the other volume when the remotely mirrored pair is re-established. The time it takes to resynchronize the mirrored pair depends on the link path activity, input/output activity to the volume, and the disk capacity.

(3) Automatic Recovery for Adaptive Copy - Write Pending

Should disk storage containing the primary (R1) volume fail, the data storage system having the primary (R1) volume temporarily suspends the adaptive copy - write pending mode, destages all write pendings for the secondary (R2) volume at the highest priority, and continues input/output operations with the secondary (R2) volume. When the primary (R1) volume is replaced, the data storage system resynchronizes the remotely mirrored pair and re-enables the adaptive copy - write pending mode. No data is lost because the data storage system containing the primary (R1) volume always retains the data in its cache until it can destage the data to the disk storage for the primary (R1) volume.

Should a secondary (R2) volume fail, the data storage system containing the primary volume (R1) continues to mark new write data as write pendings to invalid tracks in the secondary (R1) volume until the secondary (R2) volume can be replaced. When the defective device is replaced, the data storage system resynchronizes the remotely mirrored pair and re-enables the adaptive copy - write pending mode.

(4) Automatic Recovery for Adaptive Copy - Disk

Should a primary (R1) volume fail, all data not already written to the secondary (R2) volume is lost. When the primary (R1) volume is replaced, the data storage system containing the primary volume (R1) resynchronizes the remotely mirrored volume pair and re-enables the adaptive copy - disk mode.

Should a secondary (R2) volume fail, the data storage system containing the primary (R1) volume marks all pending writes and any new data as invalid tracks until the secondary (R2) volume can be replaced. When the defective device is replaced, the data storage system resynchronizes the remotely mirrored pair and re-enables the adaptive copy - disk mode.

(5) Dynamic Sparing Option

A dynamic sparing option for remote mirroring reserves disk drives as standby spares for primary (R1) volumes, secondary (R2) volumes, or both types of volumes. These standby spares are not user-addressable. The dynamic sparing option, when enabled, determines when a primary (R1) or secondary (R2) volume is about to fail and copies the contents (all volumes) of the disk drive on which that volume resides to an available spare (designated for that type of volume) without any interruption in processing. The data storage system notifies the host of this event with an "environmental data present" error, and also notifies the customer support center of the storage system manufacturer so that physical replacement of the failing disk drive can be scheduled. The data storage system uses the spare until the disk drive on which the original logical volume resided can be replaced. The dynamic sparing option maintains data availability without impacting performance.

The dynamic sparing option is most easily implemented when it is restricted to physical disk drives that have all primary (R1) volumes or all secondary (R2) volumes. Also, for a physical disk drive having all secondary (R2) volumes, the implementation of dynamic sparing is most easily implemented if the corresponding primary (R1) volumes do not reside on multiple data storage systems in the data processing system.

When the dynamic sparing option has been enabled during configuration and the data storage system determines during operation from error statistics or reporting that a drive failure is possible or a drive has become totally unavailable, the data storage system looks for an available dynamic spare disk drive that can be substituted for the failing or failed disk drive. The storage system dynamically copies all data from the "good" disk drive in the remote pair across the links to the available spare. The data storage system continues to process host input/output requests at the highest priority while this copy operation takes place to minimize the effect on performance. When the copy operation completes, the data storage system notifies the host and the customer support center of the event.

When the failing or failed disk drive is physically replaced, the data storage system makes the volume(s) on the new disk drive ready, disables the spare, and dynamically copies the contents of the other volume in the remotely mirrored pair to the new disk drive. The data storage system returns the spare to its pool, making it available if another remotely mirrored volume (primary (R1) or secondary (R2)) fails in the future.

In summary, the dynamic sparing option increases protection of all remotely mirrored volumes from loss of data, automatically activates the spare volume without interruption prior to loss of access of a potentially failing volume, ensures that the contents of the spare are identical to the contents of the original, and resynchronizes a new disk drive with the dynamic spare after replacement or repair of the defective disk drive is complete. The dynamic sparing is transparent to the host and requires no user intervention.

(6) Link Failure

Normally at least two link paths exist between two remotely mirrored data storage systems. Should a link path fail, communication continues uninterrupted on the remaining link path. The data storage system sends an error message to the local host identifying the failed link path. The Data Switch Model 9800 MAX, when used in the link paths, has a configuration option that automatically switches link paths when it detects a T3 circuit failure. In order to report link path failures to the host, this configuration option should be disabled.

If all link paths fail between the data storage systems, no data can be written to the secondary (R2) volumes in either data storage system. In an automatic link recovery mode, which is a default configuration, writes from the local host continue to the primary (R1) volumes. All updated tracks are marked so that when the link paths are restored, the data storage system will begin transferring the marked data to the secondary (R2) volumes. In the adaptive copy - write pending mode, all data for the secondary (R2) volume(s) accumulates as invalid tracks in the cache of the data storage system containing the primary (R1) volume(s). In the adaptive copy - disk mode, all data for the secondary (R2) volume(s) accumulates as invalid tracks in disk storage of the data storage system containing the primary (R1) volume (s). In a domino recovery mode, however, the primary volumes become "not ready" to the local host whenever all links fail, in order to maintain synchronization between data storage systems.

(7) Domino Modes

There are two domino modes. The first is a volume domino mode, that can be defined for individual mirrored volume pairs, a range of mirrored volume pairs, or all mirrored volume pairs. The second is an "all links" domino mode, applicable to all mirrored volume pairs.

The default state for a primary volume is the ready state. If the primary (R1) volume fails, the host will continue to see that volume as "ready", and all reads and/or writes will continue uninterrupted with the secondary (R2) volume in that remotely mirrored pair. However, a domino mode can make the primary volume "not ready."

(8) Volume Domino Mode

When enabled for a mirrored volume pair, this mode causes the primary (R1) and secondary (R2) volumes to become not ready to a host if either one of the primary (R1) and secondary (R2) volumes become inaccessible for remote mirroring, for example, due to a disk drive failure or an "all links" failure preventing data transfer between the primary (R1) and secondary volumes (R2). The data storage system responds "intervention required/unit not ready" to a host on all accesses to the "not ready" volume.

To resume remote mirroring after the fault has been corrected, the primary (R1) volume must be made ready again by manual entry of commands to the service processor of the data storage system, or by commands to the host remote mirroring software. If, however, the primary (R1) or secondary (R2) volume or the links remain down, the primary (R1) volume will immediately become not ready again until the cause of the failure is resolved. If the cause of the failure is resolved and the primary (R1) volume is made ready again, the data storage system containing the primary (R1) volume renotifies its local host that the volume is again ready and brings it online.

The volume domino mode can be enabled together with the synchronous mode enabled and adaptive copy modes disabled to guarantee synchronization between primary (R1) and secondary (R2) volumes in a mirrored volume pair. This combination offers the greatest protection from the "rolling disaster" scenario described above.

(9) All-Links Domino Mode

When enabled, this mode causes all primary (R1) and secondary (R2) volumes to become not ready if all links fail. When at least one link is reestablished, the primary (R1) volumes must be made ready again by manual entry of commands to the service processor of the data storage system, or by commands to the host remote mirroring software. If, however, the all links remain down, the primary (R1) volumes will immediately become not ready again until a link is established. Once a link is established and the primary (R1) volumes are made ready again, the data storage system containing the primary (R1) volumes renotifies its local host that the primary (R1) volumes are again ready and brings them online.

The all-links domino mode is particularly useful for a cluster of host processors in an open systems environment that uses the link between the processors for sharing data. For example, the shared data would be written by a local host to a primary (R1) volume, transmitted over the link to a secondary (R2) volume, and read by a remote host having read-only access to the secondary (R2) volume. In this situation, it may be desirable to interrupt the application when there is no longer a link. Setting the volumes to a volume domino mode might be too restrictive in this situation, because the shared data could still be written across the link to the secondary (R2) volume even if the corresponding primary volume (R1) would be unavailable.

(10) Channel Adapter Control Logic for Domino Modes

Figure 11:
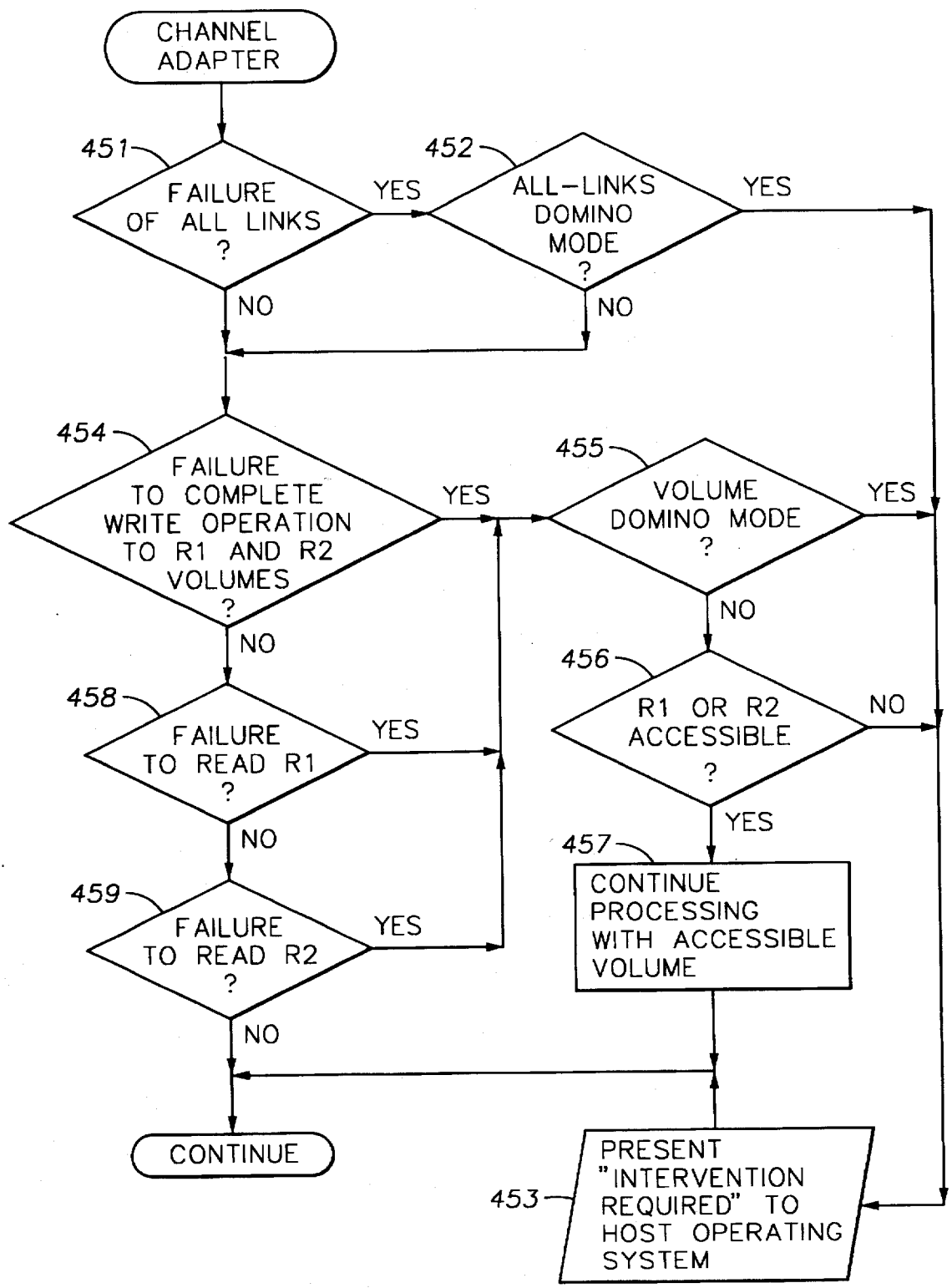
FIG. 11 is a flowchart showing operation of a channel adapter when responding to various failures depending on whether or not an "all-links domino mode" or a "volume domino mode" is enabled.

Turning now to FIG. 11, there is shown a flowchart of channel adapter control logic for implementing the domino modes when remote mirroring is enabled. In a first step 451, execution branches to step 452 when there has been a simultaneous failure of all links, preventing the remote mirroring or access of data. In step 452, execution branches to step 453 if the data storage system containing the channel adapter is in the all-links domino mode. In step 453, the channel adapter presents an "intervention required" signal to the host presently connected to the channel adapter.

The "intervention required" signal is processed by the operating system of the host. For example, the host operating system displays an error message to the system operator, so that the system operator may perform a manual recovery operation using the host remote mirroring software, as further described below. The host operating system may also check whether the channel adapter was servicing an application program at the time of the "intervention required" signal, and if so, then the host operating system checks whether the application program has defined an error handling interrupt routine. If the host operating system finds an error handling interrupt routine for the application, then the host operating system invokes the error handling interrupt routine. The optional error handling interrupt routine may prevent the application from performing further database activity requiring critical database backup, and may save application information useful for a recovery operation.

If step 451 finds that all links have not failed simultaneously, or if step 452 finds that the data storage system is not in the "all-links" domino mode, then execution continues in step 454. In step 454, execution branches to step 455 if there is a failure to complete a write operation to both the primary (R1) and secondary (R2) volumes of a mirrored volume pair. In this situation, it is not possible to complete a write operation to the primary (R1) volume or secondary (R2) volume without maintaining synchronization between these volumes. In step 455, execution branches to step 453 if the data storage system is in the "volume domino mode" for the remotely mirrored volume pair. If the data storage system is not in the "volume domino mode" for the remotely mirrored pair, then execution continues to step 456. In step 456, execution branches to step 453 if neither the primary volume (R1) nor the secondary volume (R2) are accessible, because in this case, the write operation has not been completed to either volume. If one of the primary (R1) or secondary (R2) volumes is accessible, then in step 457 the write operation is completed with the accessible volume.

If step 454 found that there was not a failure to complete a write operation to both the primary (R1) and secondary (R2) volumes, then execution continues to step 458. In step 458, execution branches to step 455 if there was a failure to read a primary (R1) volume. Although a failure to read a primary volume will not in and of itself cause a loss of synchronization between the primary (R1) and secondary (R2) volumes of a remotely mirrored volume pair, such a loss could occur, or become more pronounced, by the time of a following write operation. Therefore, execution branches to step 455 so that if the volume domino mode is not enabled for the primary (R1) volume, then an "intervention required" signal will be presented to the host in step 453 to begin a recovery operation as soon as possible. If, however, the domino mode is not enabled for the primary (R1) volume, and its corresponding secondary (R2) is found to be accessible in step 456, then in step 457 the read operation is completed by reading the secondary (R2) volume.

If step 458 found that there was not a failure to read the primary (R1) volume, then execution continues to step 459. In step 459, execution branches to step 455 if there was a failure to read a secondary (R2) volume. In other words, the secondary (R2) volume was in its read-only state but the read failed, so that the secondary volume would also be unavailable for a write operation during remote mirroring. Again, such a failure to read a the secondary volume will not in and of itself cause a loss of synchronization between the primary (R1) and secondary (R2) volumes of a remotely mirrored volume pair, but such a loss could occur, or become more pronounced, by the time of a following write operation. Therefore, execution branches to step 455 so that if the volume domino mode is not enabled for the primary (R1) volume, then an "intervention required" signal will be presented to the host in step 453 to begin a recovery operation as soon as possible. If, however, the domino mode is not enabled for the secondary (R1) volume, and its corresponding primary (R2) is found to be accessible in step 456, then in step 457 the read operation is completed by reading the primary (R1) volume.

(10) Host Failure

If only the CPU(s) at the site are lost, no data loss occurs in any remote mirroring operational mode for data already in cache at the data storage system. The data storage system containing the primary (R1) volume transfers any pending write operations to the data storage system containing the secondary (R2) volume without interruption.

(11) System-Based Recovery from the Site Failure

When a disaster at a local site renders all equipment non-operational, all link paths between the local data storage system and a remote mirrored data storage system fail. Secondary (R2) volumes cannot be updated and no data can be written to primary (R1) volumes on the data storage system at the local site, although writes can continue to primary (R1) volumes on the data storage system at the remote site. The remote data storage system marks all updated tracks on the primary (R1) volumes so that when the link paths are restored, the two data storage systems automatically resynchronize.

When the data storage system at the local site is ready to be brought back online, recovery can be performed by setting all channel interfaces to online, and powering-up the local data storage system. The local and remote data storage systems begin synchronizing. When the links synchronize, the primary (R1) volumes begin transferring data to the secondary (R2) volumes. The length of time it takes to resynchronize a full volume depends on the level of activity on the links, the level of activity on the data storage systems, the number of updated tracks (i.e., write pendings or invalid tracks) that need to be copied, link distances between data storage systems, and the size of the volume. The primary (R1) volumes must be in the enabled state for resynchronization to occur. The data storage system sends an operator message to its host when a volume has resynchronized.

(12) Application-Based Recovery

System-based recovery from a total failure of a primary (R1) volume might not be successful due to the "rolling disaster" scenario. There are, however, application-based recovery techniques that can adapted for recovery in the "rolling disaster" scenario.

One well-known application-based recovery technique, used extensively in transaction processing systems, is to maintain a log file of all writes ("before" or "after" images) to a data file. To ensure recovery, data is always written to the log file before it is written to the data file. The log file may contain a number of different versions of data written to the same location or track in the dataset. At any given time, however, the data file contains only one version of the data at any given location or track. If the dataset volume were to become inaccessible, then recovery would consist of (1) restoring the most recent image copy of the data, and (2) applying all logs to that data, thus making the data current. If the log file volume were to become inaccessible, then recovery would consist of (1) allocating a new log file, and (2) taking a current copy of the image data.

Figure 12:
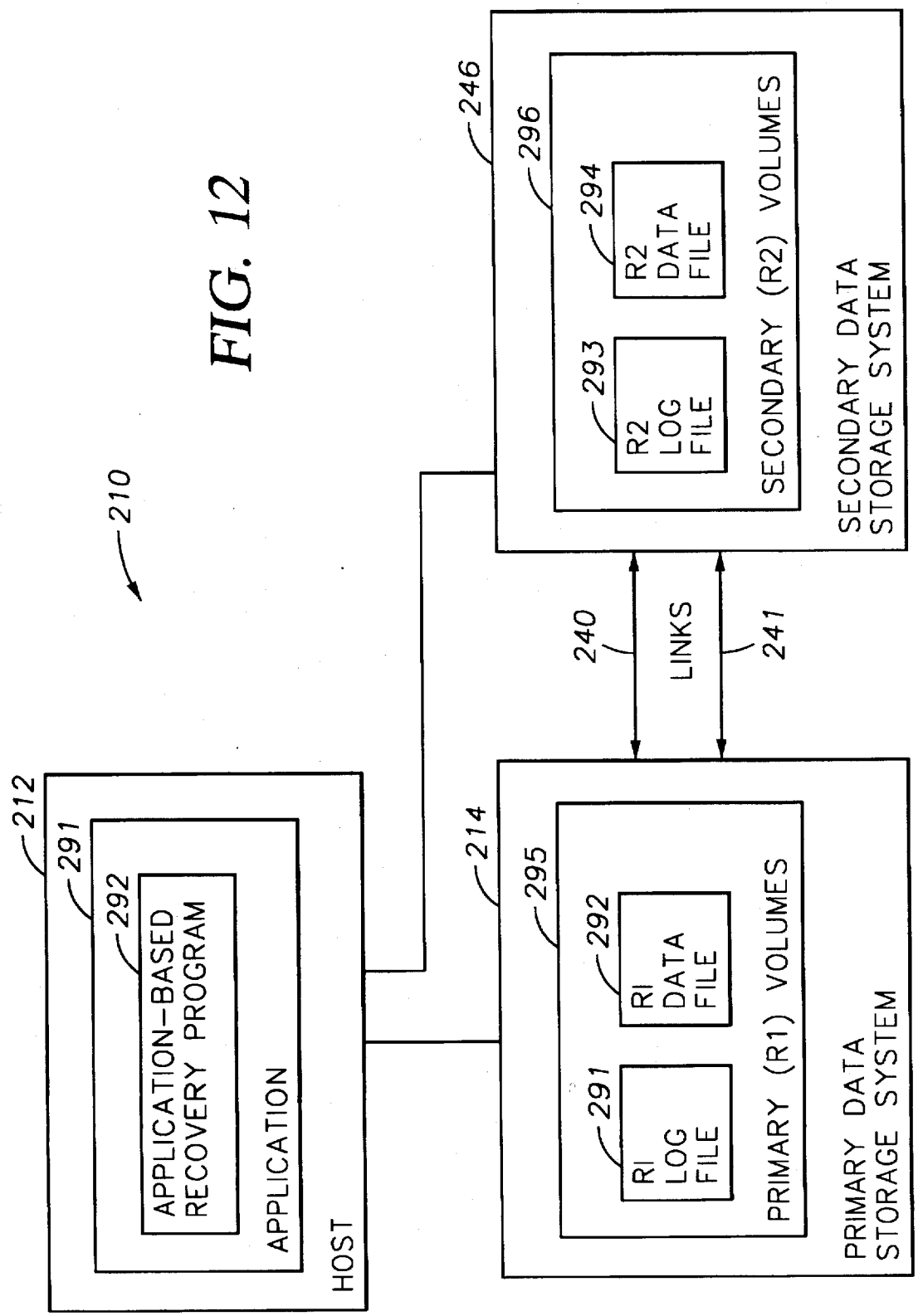
FIG. 12 is a block diagram illustrating the use of an application-based recovery program in a data processing system employing remotely-mirrored data storage systems.

In a preferred implementation, as shown in FIG. 12, the application 291 maintains the log file on a remotely mirrored volume pair 291, 293 and the data file 292, 294 on a remotely mirrored volume pair 295, 296 in the data processing system 210. The degree of synchronization between the primary volumes 295 and secondary volumes 296 is selected to guarantee that new data is written to the secondary (R2) log file 293 before the new data is written to the secondary (R2) data file 294. Therefore, the "rolling disaster" scenario is avoided.

The synchronous or semi-synchronous modes, without adaptive copy, will guarantee that data is written to the secondary (R2) copies of the log file 293 and the data file 294 in the same order that the host writes data to the primary (R1) copies 291, 292. Therefore, use of the synchronous or semi-synchronous modes, without adaptive copy, would guarantee that new data is written to the secondary (R2) copy of the log file 293 before the new data is written to the secondary (R2) copy of the data file. However, a less restrictive method is for the application to synchronize the secondary (R2) log file volume 293 just before each transmission of new log file data from the application to the primary data storage system, and to synchronize the secondary (R2) data file volume just before each transmission of the new data file updates from the application to the primary data storage system 214. This less restrictive method ensures that cache overwrite cannot disrupt the sequencing of the log and data file updates in the FIFO link transmission queue.

Figure 13A:
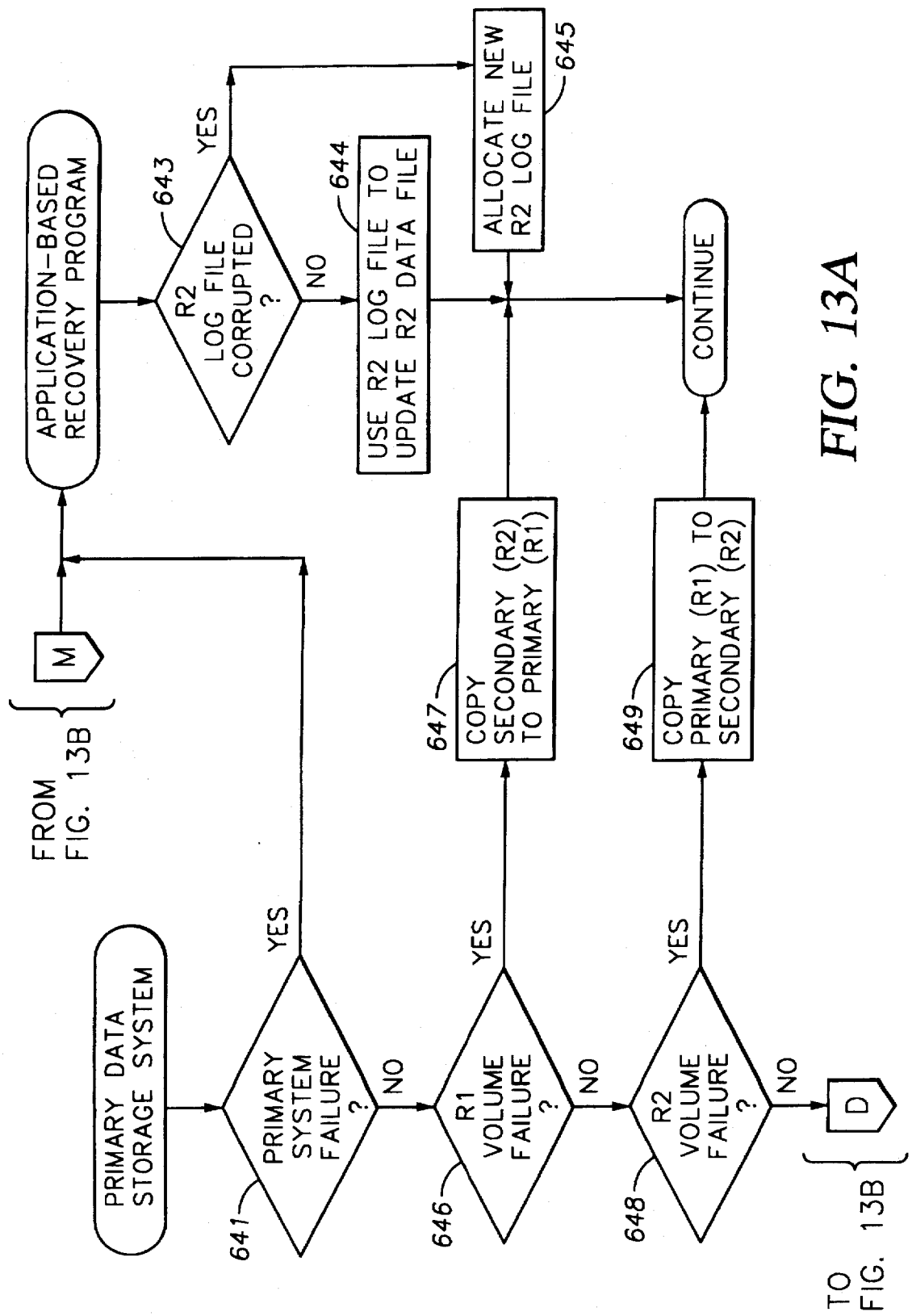
FIGS. 13A and 13B together comprise a flowchart showing the invocation and execution of the application-based recovery program for the data processing system of FIG. 12.
Figure 13B:
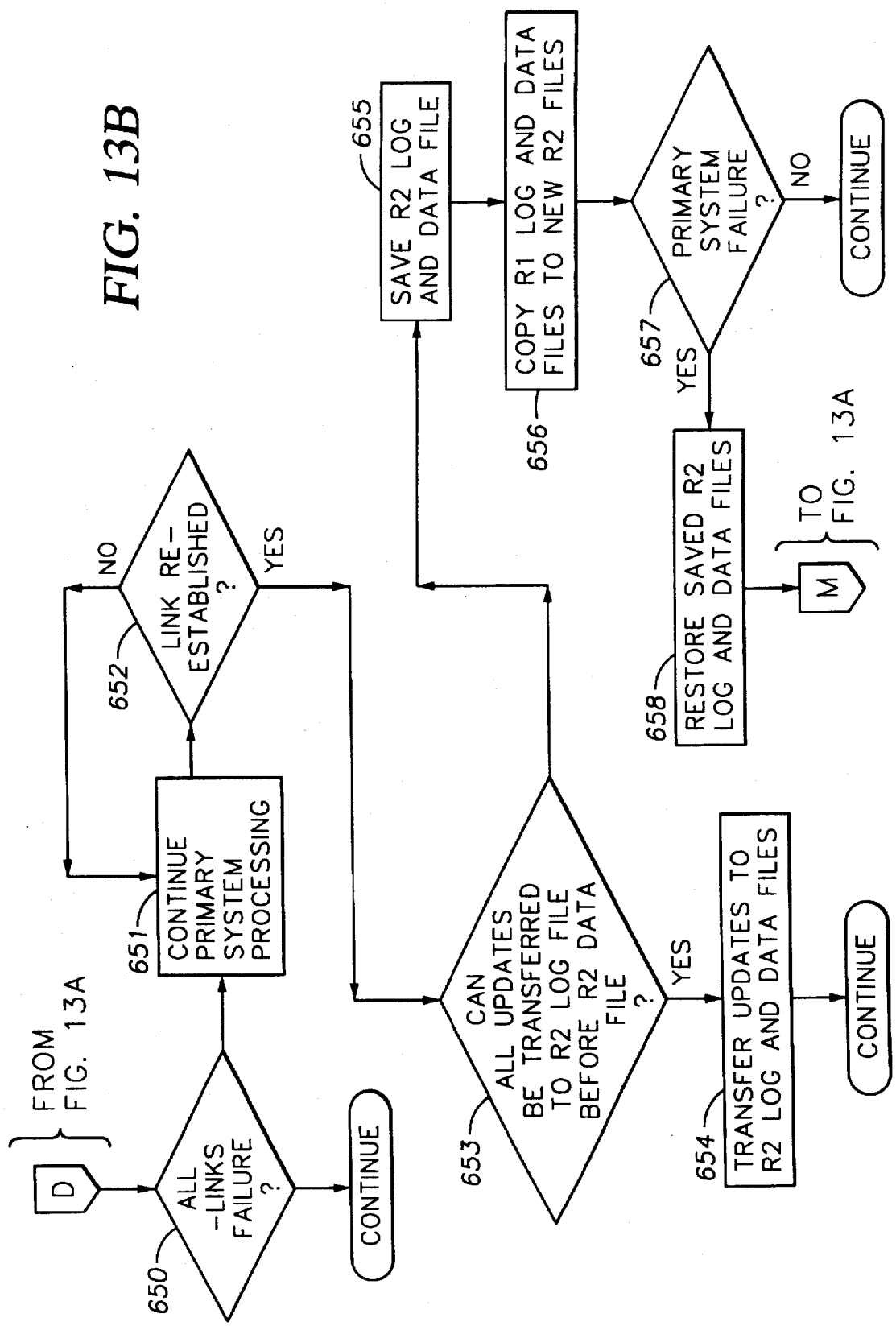

Turning now to, FIGS. 13A and 13B there is shown an example of a recovery procedure for the system of FIG. 12. If there is a primary system failure such as a complete destruction of the primary data storage system 214, then in the first step 641 of FIG. 13A, the host operating system interrupts the application 292, and the application initiates an application-based recovery program to recover from the secondary (R2) copies of the log file 293 and the data file 294. In step 643, the application inspects time stamps, sequence markers, or beginning/end of file markers in the secondary (R2) copies of the files 293, 294 to determine which one of the two files was last written to. The file last written to can be assumed to be corrupted. If the log file 293 were corrupted, then in step 645 it is discarded and a new secondary (R2) log file is allocated, because the secondary (R2) data file 294 is intact. If the log file 293 were not corrupted, then in step 644 the log file 293 is used to recover the data file 294 by applying to the data file the changes recorded in the log file.

If in step 641 the primary data storage system 214 has not failed, then in step 646, execution branches to step 647 if a primary (R1) volume 295 has failed. In this case, the primary data storage system 214 performs automatic recovery in step 647 by copying the secondary (R2) volume 296 to the primary (R1) volume.

If in step 646 a primary (R1) volume 295 has not failed, then in step 646, execution branches to step 649 if the secondary (R2) volume 296 has failed. In this case, the primary data storage system 214 performs automatic recovery in step 649 by copying the primary (R1) volume 295 to the secondary (R2) volume 296, to restore the secondary (R2) volume 296.

If all links are lost between the primary and secondary data storage systems 214, 246, then processing with the primary (R1) file copies can be suspended until a link is re-established. When the link is re-established, the secondary (R2) file copies can be restored by transferring the pending secondary write data over the link. If the entire data storage system containing the primary (R1) copies is destroyed during the transfer, then it is still possible to recover in the fashion described immediately above for recovering from the destruction of the data processing system having the primary (R1) copies. In other words, the secondary copies of the files are inspected, and the file last written is assumed to be corrupted. If the log file were corrupted, then it can be discarded or re-used, because the data file copy is intact. If the log file were not corrupted, then it can be used to recover the data file by applying to the data file the changes recorded in the log file. This recovery technique still works because in the interrupted transfer of the pending secondary write data over the link, the changes to the secondary (R2) copy of the data file are always written to the secondary (R2) copy of the log file before they are written to the secondary (R2) copy of the data file.

If all links are lost between the remotely mirrored data storage systems, as tested in step 650 of FIG. 13B, then processing with the primary (R1) file copies can continue in step 651. To avoid the "rolling disaster" scenario, however, the secondary (R2) file copies should not be restored when the link is reestablished in step 652 by transferring secondary write pendings generated since all of the links were lost as in step 654, unless it can be guaranteed, as tested in step 653, that the changes to the secondary (R2) copy of the data file are always written to the secondary (R2) copy of the log file before they are written to the secondary (R2) copy of the data file. If processing with the primary (R1) file copies has continued for any substantial length of time, then it cannot be guaranteed that all updates can be transferred to the secondary (R2) log file before the secondary (R2) data file. Therefore, in this case, execution branches to step 655. In step 655, the secondary (R2) log and data files 293, 294 are saved by configuring them as local copies. Next, in step 656 new, initially empty secondary (R2) files are configured corresponding to the primary (R1) files, and remote mirroring is enabled to copy the primary (R1) log and data files 291, 292 to the new secondary (R2) files. This is an example of a data migration operation upon an active volume, which can be done as described below. Once the new secondary (R2) files have been sufficiently synchronized with the primary files to guarantee that new data is written to the new secondary (R2) log file before the new data is written to the new secondary (R2) data file, recovery has been completed and normal processing may continue. The old, now local secondary file copies can be discarded. However, as tested in step 657, the data storage system containing the primary files could be destroyed during the migration process before recovery has been completed with the new secondary (R2) files. In this case, in step 658, the new secondary (R2) files are discarded and the old, saved secondary (R2) log and data files are restored to their secondary status, and used by the application-based recovery program in steps 643 to 645. This recovery from the old, saved secondary files, however, will recover the state of processing existing just before the all-links failure.

J. Data Migration of Active Volumes

Data migration may be needed when recovering form an all-links failure after continued processing upon a primary (R1) volume, as described above. Data migration may also occur during the initial installation of a remote data storage system for remote mirroring to an active data storage system. Data migration may also occur when a data center or host processor is moved from a local site to a remote site. In all of these cases, it is desirable to minimize the disruption of data processing activities during the migration of data from an active primary (R1) volume to a secondary (R2) volume. The conventional way of performing a data migration to a remotely mirrored volume is to suspend processing on the primary volume, copy its contents to the remotely mirrored volume, and then resume processing on the primary or secondary volume.

One advantage of performing data processing activities in a remotely mirrored system as shown in FIG. 1 or 4 is that a host central processing unit can easily be moved from a local site to a remote site. Processing can be quickly switched over from the local site to the remote site so long as the primary and secondary volumes are synchronized at the time of the switch.

Figure 14:
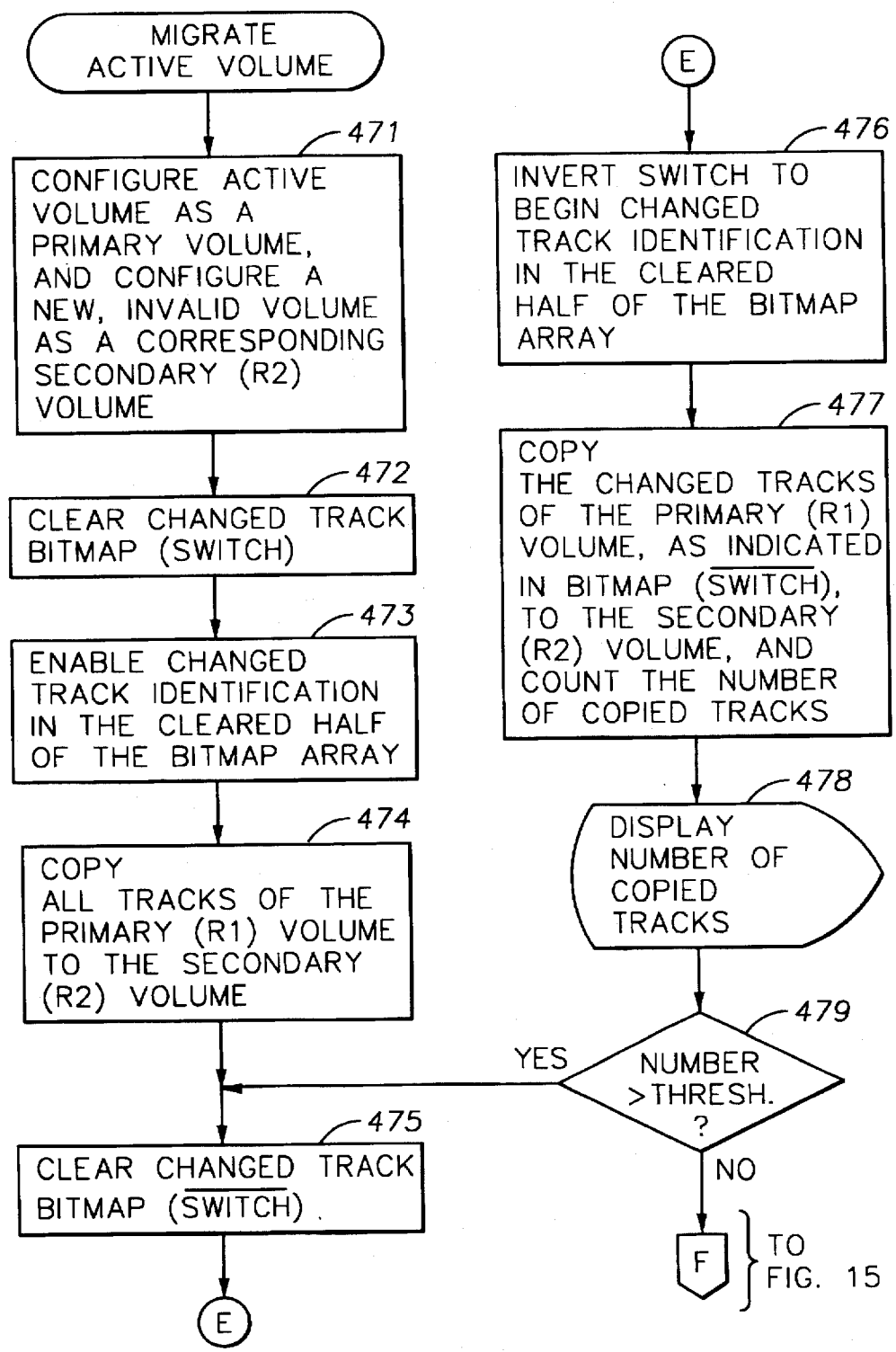
FIG. 14 is a first portion of a flowchart showing an iterative routine for migrating a volume concurrent with host access to the volume.

A data migration can be performed upon an active volume, with minimal disruption of data processing, by following an iterative technique shown in the flowchart of FIG. 14. This flowchart represents steps in an active migration task run on the data storage system containing the primary (R1) volume to be migrated. The active migration task, for example, is activated by a system operator using the host remote mirroring software.

In the first step 471 of FIG. 14, the active volume is configured as a primary (R1) volume, and a new, initially invalid or empty volume is configured as the corresponding secondary (R2) volume to which data from the primary (R1) volume is to be migrated. Next, in step 472, half of a bitmap array BITMAP(SWITCH) is cleared.

The bitmap array is located in the cache memory of the data storage system containing the primary (R1) volume. The bitmap array has two halves, each of which contains a bit for each track in the volume. Each bit is initially cleared, and each bit is initially set when the corresponding track is updated by new data for the track being written into the cache memory. SWITCH is a flag enabling one or the other of the halves of the bitmap array to receive the changed track identifications. In particular, channel adapter microcode for a host servicing task sets a particular bit in the bitmap by using a base address register that is set with either a first pointer value pointing to the first half of the bitmap array, or a second pointer value that points to the second half of the bitmap array. The logical value of the switch flag determines whether the first pointer value or the second pointer value is used in the base address register for addressing either the first half or the second half of the bitmap array. The migration task can, in a single "atomic" operation, switch the pointer value used by the channel adapter host servicing task. Therefore, the host processing need not be suspended to perform the switching operation.

In step 473, the migration task enables the changed track identification feature of the host servicing task of the channel adapter microcode so that indications of tracks being changed are written in the half of the bitmap array that was cleared in step 472. Next, in step 474, the migration task copies all of the tracks of the primary (R1) volume to the secondary (R2) volume. Once this copying is finished, then in step 475, the migration task clears the other half of the bitmap array not presently selected by the switch for recording changed track indications. Next, in step 476, the migration task inverts the switch (i.e., complements its binary state) to begin recording changed track identifications in the portion of the bitmap array that was cleared in step 475. Then, in step 477, the migration task copies the changed tracks of the primary (R1) volume, as indicated by the portion of the bitmap array not cleared in step 475, to the secondary (R2) volume, and the migration task also counts the number of copied tracks. Once all of the indicated changed tracks are copied, execution continues to step 478.

In step 478, the migration task displays to the system operator the total number of copied tracks that were counted in step 477. This number indicates the rate of convergence, so that the operator will have an idea as to when the migration of the active volume will be finished. In step 479 the total number of copied tracks that were counted in step 477 is compared to a threshold. This threshold determines the number of tracks that must be copied while host processing is inhibited. The greater the threshold, however, the more quickly the active volume can be migrated. Therefore, the threshold should be set for about the longest tolerable duration of suspended host access to the data storage system. If step 479 finds that the total number of copied tracks that were counted in step 477 is greater than the threshold, then execution branches back to step 475 to begin another iteration. Otherwise, execution continues to step 480 of FIG. 15.

Figure 15:
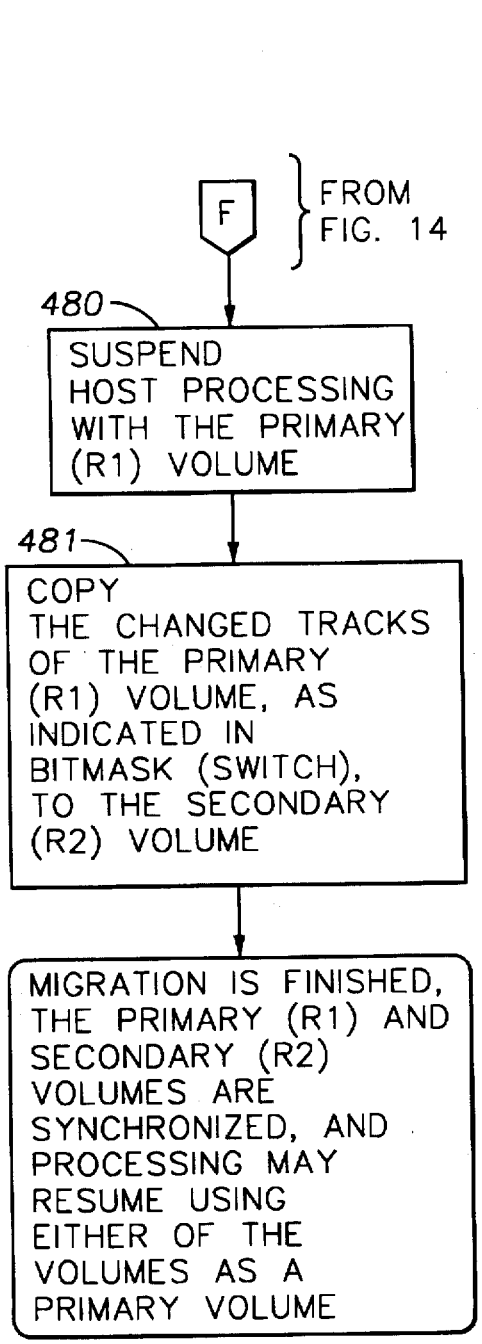
FIG. 15 is a second portion of the flowchart begun in FIG. 14.

In step 480 of FIG. 15, the migration task suspends host processing with the primary (R1) volume. Then, in step 481, the migration task copies the changed tracks of the primary (R1) volume, as indicated in the half of the bitmap that was cleared in step 475, to the secondary (R2) volume. Once this copying is done, the migration task is finished. The primary (R1) and the secondary (R2) volumes are in sync, and they contain the same data. Host processing may then resume by accessing the primary (R1) volume and remotely mirroring data to the secondary volume. Alternatively, before resuming host processing, the linked data storage systems could be reconfigured to reverse the roles of the primary (R1) and the secondary (R2) volumes, so that the host would directly access what was the secondary (R2) volume.

The migration technique of FIGS. 14-15 usually achieves rapid convergence toward synchronization of the primary (R1) and secondary (R2) volumes because during the copying of all of the tracks of the primary (R1) volume in step 474, a majority of the tracks will not have been changed. Since fewer tracks need to be copied in the next step 477, the time for a single iteration successively decreases. In any case, convergence can be guaranteed by increasing the priority of the migration task relative to the host servicing task in order to allocate more data storage system processing time to the migration task than to the host servicing task.

The basic migration technique of FIGS. 14-15 can be adapted to use the remote invalid track bits (124 in FIG. 3) and remote write pending track bits (106 in FIG. 3) in the track directory, instead of the bitmap array described above. In this case, it is desirable to also use similar channel adapter logic for both migration and remote mirroring.

Figure 16:
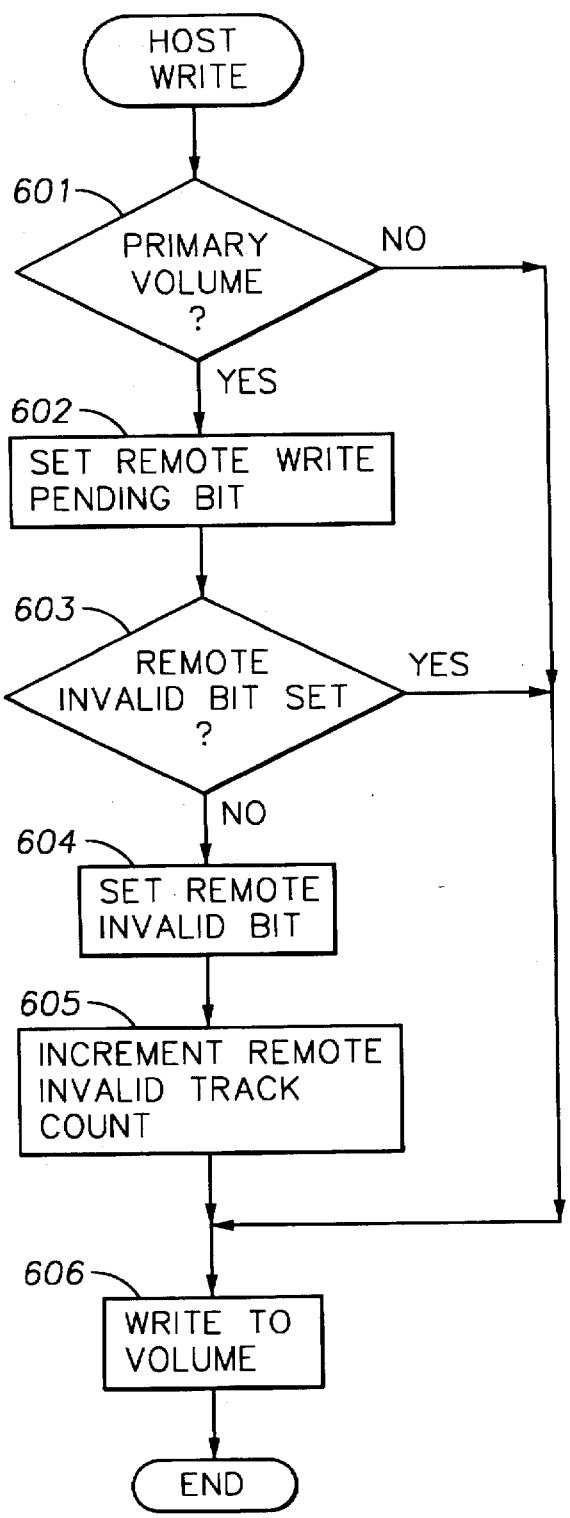
FIG. 16 is a flowchart showing how a channel adapter maintains remote write pending bits, remote invalid bits, and remote invalid track counts in the data processing system of FIG. 4.

Turning now to FIG. 16, there is shown control logic for the channel adapter in managing the remote write pending and remote invalid track bits during the processing of a write operation. If the write is not to a primary volume, as tested in step 601, then execution branches to step 606, and the states of the remote write pending and remote invalid track bits are unaffected. Otherwise, in step 602 the remote write pending bit is set for the track being written to. Then in step 603, execution branches to step 606 if the remote invalid bit for the track is already set. Otherwise, in step 604, the remote invalid bit for the track is set, and in step 605, the remote invalid track count for the volume is incremented. Then, in step 606, the data is written to the track in the volume.

Figure 17:
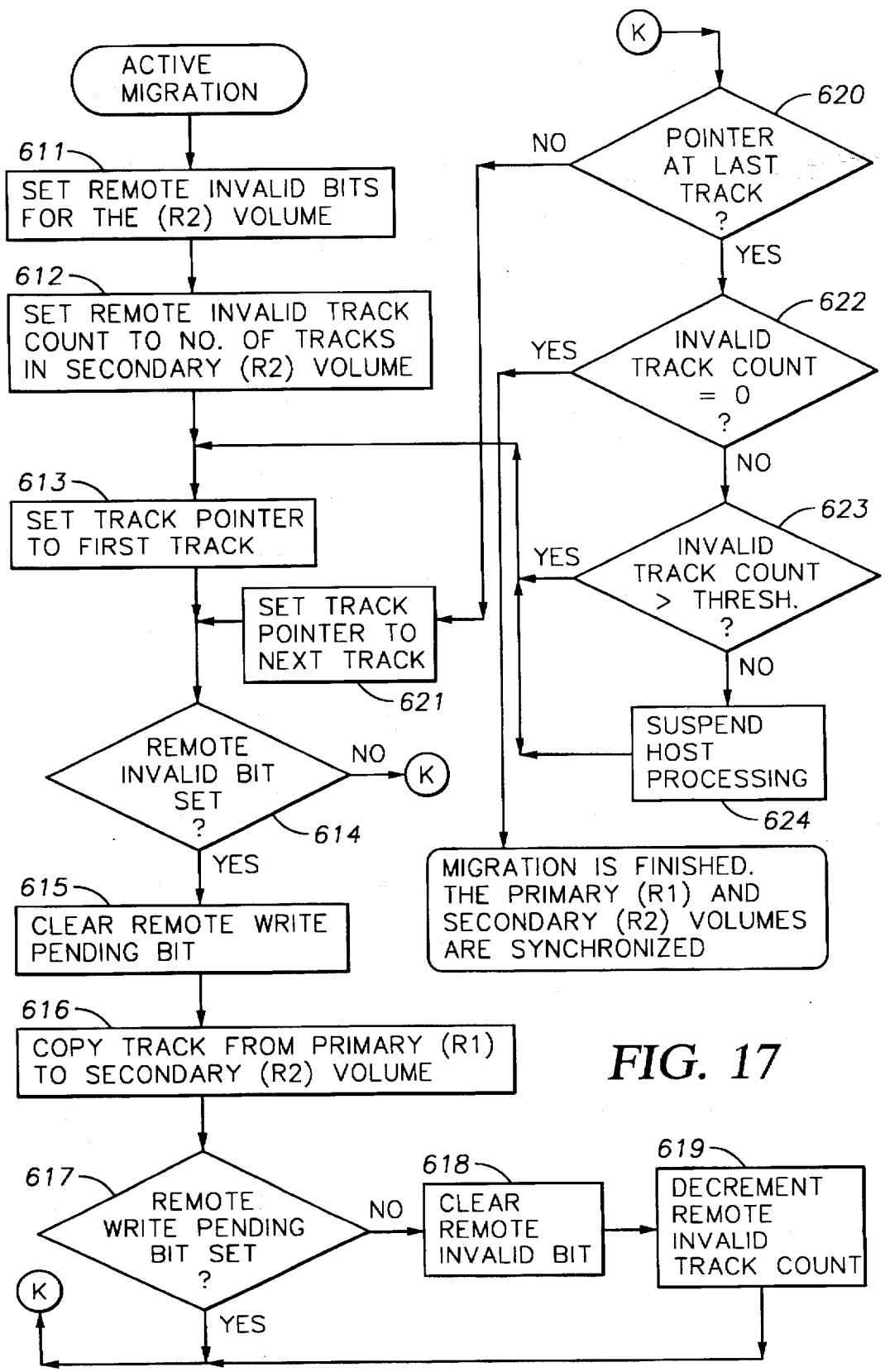
FIG. 17 is a flowchart showing an iterative routine using the remote write pending bits, remote invalid bits, and remote invalid track counts for migrating a volume concurrent with host access to the volume.

Turning now to FIG. 17, there is shown a flowchart of the migration task that uses the remote invalid track bits, the remote write pending bits, and the remote invalid track count maintained by the channel adapter task of FIG. 16. In the first step 611 of FIG. 17, the secondary (R2) volume to receive the migration data from a corresponding primary (R1) volume is invalidated by setting all of the remote invalid track bits for this volume. In step 612, the remote invalid track count for this secondary (R2) volume is set to the number of tracks in the secondary (R2) volume.

To begin an iteration through the tracks of the remotely mirrored volume pair, in step 613 a track pointer is set to a first track in the remotely mirrored volume pair. Then in step 614 execution branches to step 620 if the remote invalid bit is not set for the track indicated by the track pointer. Otherwise, execution continues to step 615. In step 615, the remote write pending bit for the track is cleared. Then in step 616, the track is copied from the primary (R1) volume to the secondary (R2) volume.

It is possible that during step 616, the remote write pending bit might be set by a write to the primary (R2) volume, because host processing may continue during the migration process. Therefore, in step 617, if the remote write pending bit for the track is found to be set, execution continues to step 620, because the copied track has been invalidated. Otherwise, execution branches to step 618 to clear the remote invalid bit for the track, and in step 619 the remote invalid track count for the secondary (R2) volume is decremented. Execution continues to step 620.

In step 620, the track pointer is inspected, and if it does not point to the last track in the remotely mirrored volume pair, then execution continues to step 621 to set the track pointer to the next track in the remotely mirrored volume pair, and execution loops back to step 614. Otherwise, once an iteration is completed over all tracks in the remotely mirrored volume pair, execution branches from step 620 to step 622. In step 622, the remote invalid track count is compared to zero, and if it is zero, the migration is finished because the secondary (R2) volume is synchronized to the primary (R1) volume. Otherwise, execution continues from step 622 to step 623. In step 623, the invalid track count is compared to a threshold selected to be about the largest number of tracks that can be copied while host processing is suspended without causing a serious disruption of host processing. If the threshold is exceeded, then execution loops back to step 613 to begin another iteration. Otherwise, execution continues to step 624 to suspend host processing, and then execution loops back to step 613 for one more iteration, which will result in the invalid track count becoming zero and synchronization being achieved between the primary (R1) and secondary (R2) volumes.

K. Servicing of the FIFO Link Transmission Queue

Figure 18:
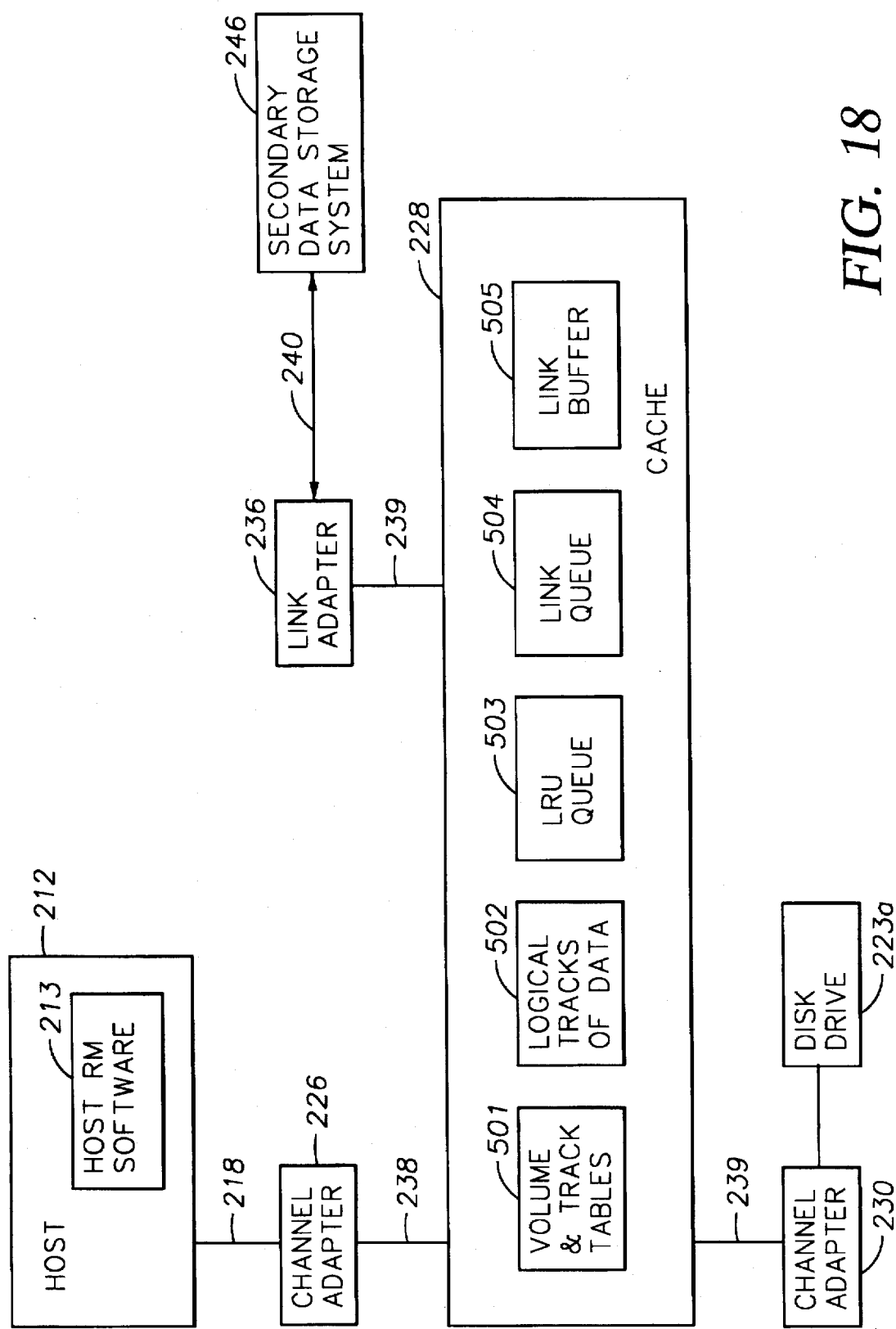
FIG. 18 is a block diagram showing data structures in the cache memory of the data processing system of FIG. 4.

Turning now to FIG. 18, some components in FIG. 4 are shown in order to depict data structures in the cache 228. These data structures include the volume and track tables 501, logical tracks of data 502, a least-recently used (LRU) queue 503, the FIFO link transmission queue 504, and a link buffer 505.

Elements of the volume and track tables 501 have been shown and described above with reference to FIGS. 3 and 4. The volume and track tables serve as an index to the logical tracks of data in the cache and stored on disk. The volume and track tables include information identifying the location of each logical track on disk; whether the track image is currently in the cache and if so where; some demographic data such as dates and time stamps about the logical tracks; whether the track image is synchronized with an internal or remote copies; and whether a particular record on the logical track has been modified and is pending a write to disk or to a remote copy.

Blocks of cache memory are dynamically allocated when needed to store the logical tracks of data 502. The least-recently-used (LRU) queue 503 contains pointers to cache blocks that are available to be allocated. When a cache block is needed, the pointer at the head of the LRU queue 503 identifies the cache block that should be allocated. If the cache block is needed for a read operation, the pointer is placed at the tail of the LRU queue 503. If the cache block is needed for a write operation, the pointer is taken off the LRU queue 503, and is put back on the LRU queue only when a writeback operation to disk has been completed. The pointer is also kept off the LRU queue 503 for remote write pending in the synchronous, semi-synchronous, and adaptive copy—write pending mode in order to retain the remote write pending data in cache.

The FIFO link transmission queue 504 was described above with reference to step 415 of FIG. 8. In the preferred implementation, this link queue 504 is used in connection with the link buffer 505 in order to prepare information for transmitting commands and data over the link 240 from the link adapter 236 to the remote or secondary data storage system 246 in FIG. 18. The commands transmitted over the link 240 include a write command for a remote write to a secondary (R2) volume in the secondary data storage system 246, and a read command for reading data from a secondary volume (R2) in the secondary data storage system. Each command therefore accesses a single volume. The link queue 504 contains a respective entry for each command that is transmitted over the link 240. Each entry is placed in the link queue 504 by a channel adapter involved in a remote read or write operation, and removed from the link queue by a link adapter that transmits the corresponding command over a remote link to the secondary storage system 246.

In practice, the host 212 communicates with the channel adapter 226 by sending chains of channel command words (CCW's). Each chain of channel command words define operations to perform with respect to a single logical volume. The chain defines a single input/output operation. The results of all channel command words of this single input/output operation are to be committed before commitment of the results of any following CCW's. Once the host processor sends the entire chain to the channel adapter, it need not poll for a response; instead, the host typically continues with other operations, and is interrupted when the channel adapter responds with a device end (DE) signal indicating that the results of the last CCW in the chain have been committed.

If the CCW chain consisted of a single write command from the host 212 to the channel adapter 226 in FIG. 18, then the CCW chain would be processed in the following sequence. First, the channel adapter 226 puts the write data in a specified logical track of data 502 in the cache. Then, for an IBM compatible host 212, the channel adapter "disconnects" from the host. (Disconnect is a term used by IBM to describe the protocol followed by an IBM host writing data in CKD or ECKD format.) The channel adapter 226 also recognizes that the specified logical track is in a remotely mirrored volume pair, and therefore the channel adapter inserts an entry into the link queue, pointing to a location in the link buffer 505, and puts into the link buffer pointers to the write data in the cache. Then, the link adapter 236 services the link queue 504 by transferring the write data across the link 240. Finally, when the link adapter 236 receives an acknowledgement of the remote write from the secondary data storage system 246, the link adapter signals the channel adapter 226, and the channel adapter "reconnects" with the host 212 and returns a device end (DE) signal to the host.

In the preferred implementation, the entry in the link queue 504 includes a one-byte password for confirming the validity of the entry, a logical volume number specifying the secondary (R2) volume, a number identifying the channel adapter that created the entry, a pointer to a starting location in the link buffer 505 for additional information for the command to be sent to the secondary storage system containing the specified secondary (R2) volume, and lock information by which a particular channel adapter or link adapter can obtain exclusive access to the entry. The lock information ensures that only a single channel adapter loads the entry, and a single link adapter uses the entry to generate a command sent over a link to the secondary data storage system. The link buffer 505 is used in addition to the queue 504 in order to store efficiently a variable amount of information for producing each command sent over a link to the secondary storage system 246.

In the preferred implementation, each write command sent over a link to the secondary storage system 246 may include write data from multiple channel command words. Moreover, it is very desirable to "bundle" the write data for all write commands in the channel command word chain into a single write command transmitted over a link to the secondary storage system 246. The channel adapter 226 must therefore decode the channel command words to an extent necessary to determine when it receives the last channel command word in the chain. This decoding process is dependent on the syntax of the channel command words. A conventional fixed-block addressing (FBA) syntax, for example, has a "beginning of chain" channel command with the format START BLOCK, COUNT where COUNT is the number of following command words in the chain. The IBM count-key-data (CKD) syntax has a similar DEFINE EXTENT command, which defines a number of following channel command words included in the chain, although this is not the exclusive method used to indicate the extent of the chain in the IBM CKD syntax. Alternatively, the syntax could use an "end of chain" command. One particular IBM ESCON syntax uses a flag in every channel command word to indicate whether or not the word is the last word in its chain.

IBM CKD channel command words have a syntax described, for example, in N. S. Prasad, "IBM Mainframes: Architecture and Design," McGraw-Hill Book Company, New York, N.Y., 1989, Section 3.4, Input/Output Architecture, pp. 58–73, incorporated herein by reference, and "The IBM 3990 Storage Control Reference," No. GA32-0099-04, International Business Machines Corporation, Tucson, Ariz., 1991, pp. 1–304, incorporated herein by reference. In general, the IBM CKD channel commands are in effect program instructions, and IBM Corp. refers to a string of channel command words as a "channel program." On pages 61 to 63, for example, N. S. Prasad, "IBM Mainframes: Architecture and Design," says: "A channel program consists of one or more Channel Command Words (CCWs). Each CCW occupies a double-word location in storage. The CCWs have consecutive addresses. The channel fetches a CCW, decodes it, and executes it. Execution consists of passing the CCW to the control unit and device for performing the required operation. After the required operation is performed, the channel executes the CCW in the next contiguous location, if the last CCW contains a chaining flag. It is possible to branch to a noncontiguous CCW by using a transfer-in-channel command. By using command chaining and the TRANSFER in CHANNEL command it is possible to perform branching and looping within a channel program."

For processing IBM CKD channel command words, the channel adapter decodes and executes the channel command words, and applies the rules set out in the above IBM references to determine when the end of the chain is reached. The channel interface in the IBM host processor also decodes channel command words to find the end of the chain, in order to interrupt the host processor when the channel adapter sends back the device end (DE) for the last CCW in the chain. (See page 60 of N. S. Prasad, "IBM Mainframes: Architecture and Design.")

The preferred format for the information in the link buffer 505 is a string of track and record identifications and indications of where the records are found in the cache 228. The track and record identifications, for example, are in the form of: "track no. p, starting at record q, n records, starting at cache address r; track no. s, starting at record t, m records, starting at cache address u; . . . " In this example, not every record need be specified, because ranges or extents of contiguous records can be specified. Also, with this format, the track and record identifications can be built up and appended into the link buffer 505 as write channel command words are decoded by the channel adapter, and the data for each write channel command word is loaded into cache at the indicated starting addresses.

Each link adapter scans the link queue 504 in an iterative loop, looking for unlocked entries to service, beginning at the head of the queue. The link adapter locks the next entry to service, checks the password to determine if the entry is valid, and if so, gets the buffer pointer from the entry, reads the buffer, and builds a job to be executed for transferring data from cache across the link in a direct memory access (DMA) operation. In particular, the link adapter builds a header, and transmits over the link the header, followed by the data, followed by a cyclic redundancy check (CRC). The header, for example, contains a command code such as a code for read or write access, link and command status flags, the logical volume number of the secondary (R2) volume to access, and the invalid track count for the secondary (R2) volume.

Figure 19:
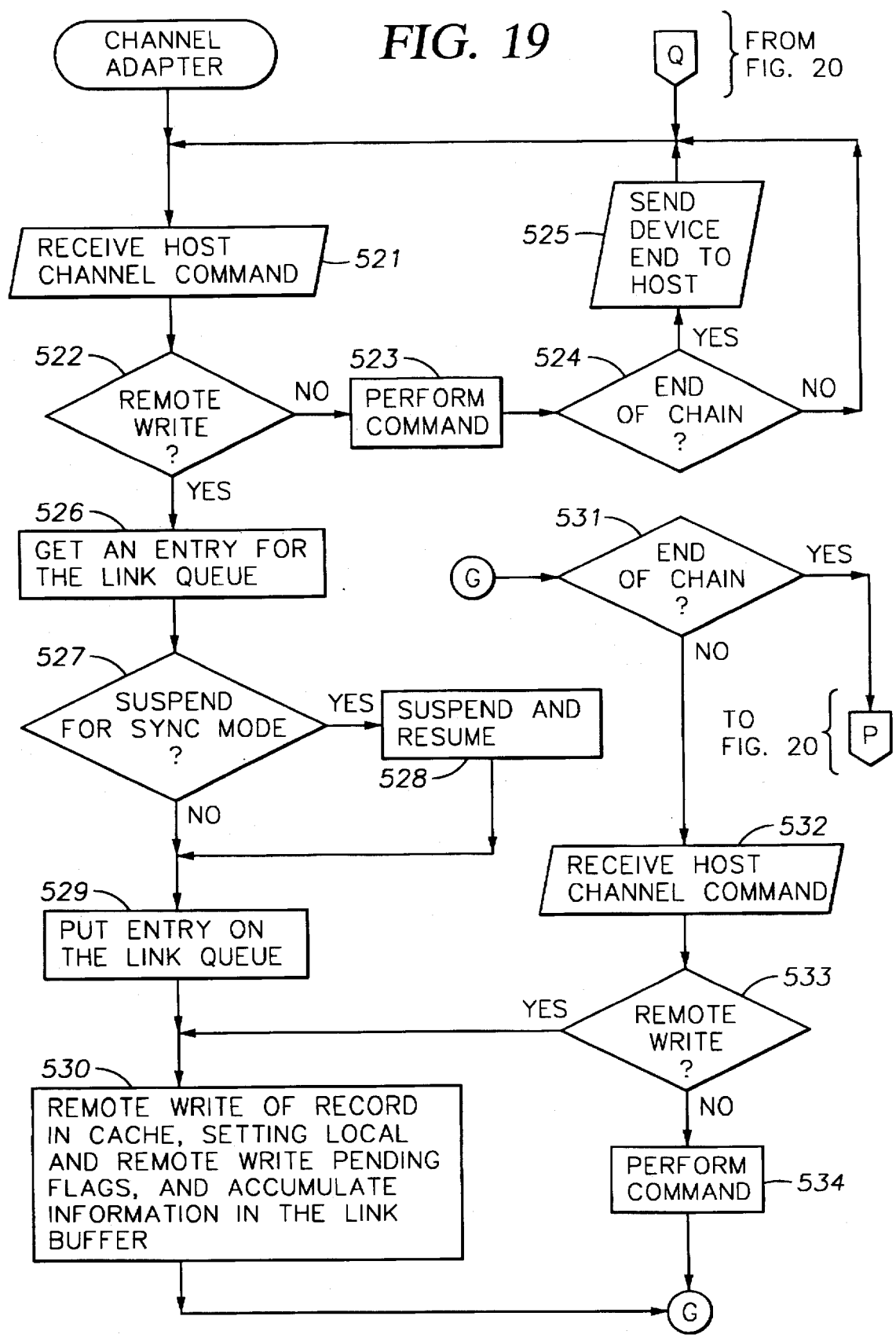
FIG. 19 is a first portion of a flowchart showing how a host processor bundles remote write commands from all of the channel command words (CCW) in a single CCW chain into a single write command transmitted over a link to a remote data storage system.
Figure 20:
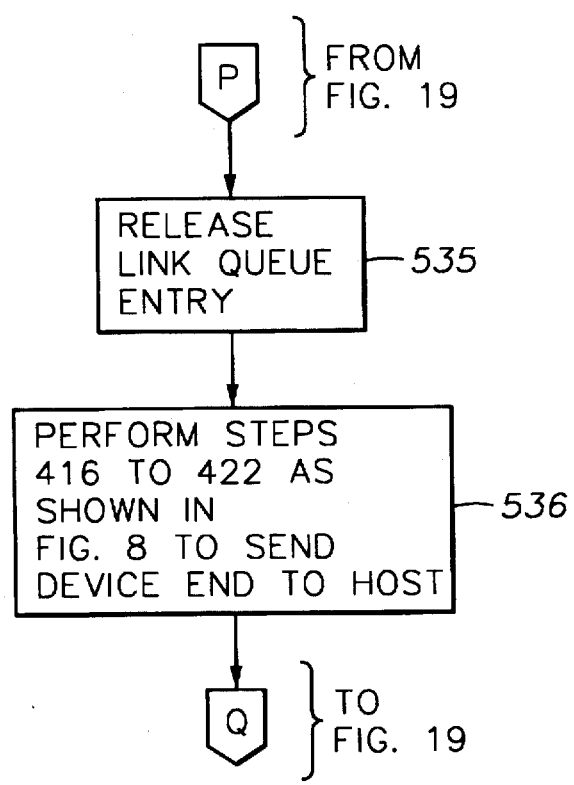
FIG. 20 is a second portion of the flowchart begun in FIG. 19.

Turning now to FIGS. 19 and 20, there is shown a flowchart of the control logic in the channel adapter for bundling the remote write commands included in a channel command word chain. In a first step 521 of FIG. 19, the channel adapter receives a channel command word from the host. Then in step 522, execution branches to step 523 if the channel command word is a write to a secondary (R2) volume in the remote data storage system. In step 533, the channel adapter performs the action specified by the channel command word. Then, in step 524, execution loops back to step 521 if the end of the CCW chain has not been reached. If step 524 finds that the end of the CCW chain is reached, then execution continues to step 525 to send a device end (DE) signal to the host, and execution loops back to step 521.

If step 522 finds the channel command word specifies a remote write, then execution continues to step 526. In step 526, the channel adapter gets an entry for the link queue. This entry is a free block of cache memory. Then in step 527, execution branches to step 528 if the remote write operation must be suspended for a synchronization mode. In the synchronous and semi-synchronous modes, the remote write must be suspended if there is already a pending write to the secondary (R2) volume. In the adaptive copy—pending write or adaptive copy—disk modes, the remote write must be suspended if the "invalid tracks" count for the secondary (R2) volume has reached the skew value. After the channel adapter task has been suspended and resumed to maintain synchronization in step 528, or if step 527 finds that there is no need to suspend the channel adapter task for synchronization, execution continues to step 529.

In step 529, the channel adapter puts the queue entry on the tail of the link queue. Then in step 530, the channel adapter writes one or more records into cache, setting the local and remote write pending flags, as will be further described below with reference to FIG. 22, and accumulates in the link buffer identification and record pointer information for the remote write operation. Next, in step 531, execution continues to step 532 if the end of the CCW chain has not been reached. In step 532, the channel adapter receives the next channel command word. Then, in step 533, execution loops back to step 530 if this next channel command word requires a remote write operation to a remote secondary (R2) volume. If not, execution continues to step 534. In step 534, the channel adapter performs the operation specified by the channel command word, and execution loops back to step 531. Once the end of the chain is found in step 531, execution branches to step 535 of FIG. 20.

In step 535 of FIG. 20, the channel adapter marks the link queue entry valid for processing by a link adapter, and releases its lock on the link queue entry. Execution then continues to step 536. In step 536, steps 416 to 422 of FIG. 8 are performed as described above, to send a device end (DE) signal to the host. For all but the synchronous mode, the device end (DE) signal is sent immediately. For the synchronous mode, the device end (DE) signal is not sent until the remote write has been acknowledged.

Figure 21:
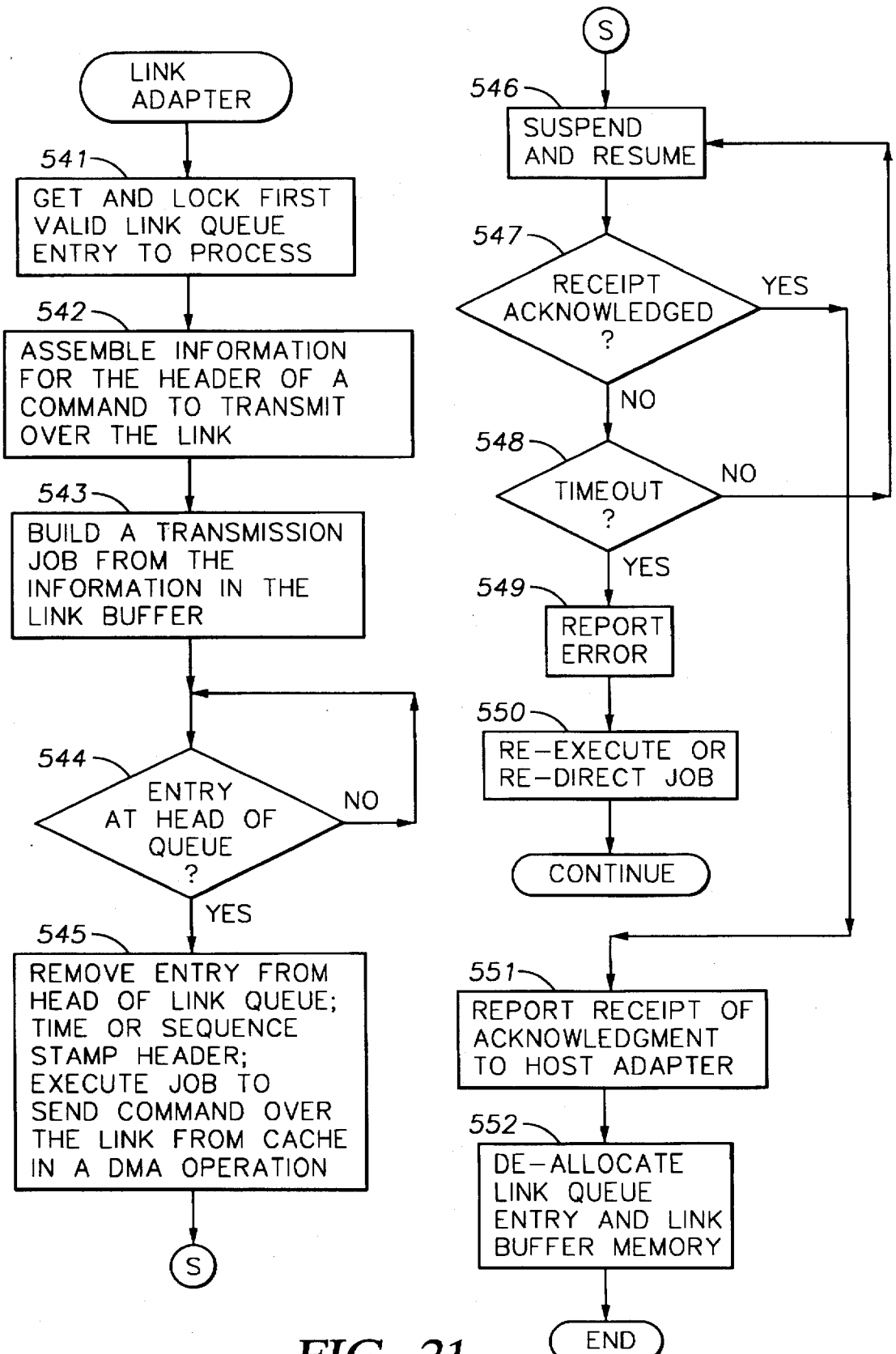
FIG. 21 a flowchart showing the operation of a link adapter in the data processing system of FIG. 4.

Turning now to FIG. 21, there is shown a flowchart of the control logic for the link adapter, corresponding to the flowchart of the channel adapter in FIGS. 19 and 20. In a first step 541, the link adapter starts at the head of the link queue, and scans the entries in the queue in sequence until it finds a valid, unlocked entry to process, and then the link adapter locks the queue entry so that no other link adapter will attempt to process it. In step 542, the link adapter assembles information for the header of a command to transmit over a link of the link adapter. In step 543, the link adapter builds a transmission job from the information in the link buffer.

In step 544, the link adapter checks whether the entry it is processing is at the head of the link queue, and if not, the link adapter waits until the entry reaches the head of the queue. Then in step 545, the link adapter removes the entry from the head of the link queue, marks the status information of the header with a time stamp or sequence number, and executes the job to send the command over the link, including the header followed by data read from the cache in a direct memory access (DMA) operation, and a cyclic redundancy check. The time stamp or sequence number can be used by the remote data storage system to detect link transmission problems and to write to its cache in proper sequence data from commands received from various links and link adapters despite possible delay of some commands due to link failure. In an alternative arrangement, each link queue entry or corresponding link buffer entry could be marked with a time stamp or sequence number at the time the link queue entry is inserted at the tail of the link queue, so that step 544 could be eliminated. Moreover, in the short distance option configuration having a single link, time stamps or sequence numbers would not be needed, because each command could be transmitted over the link, received, and acknowledged before the next command in the link queue would be transmitted.

Next, in step 546, for the long-distance option, the link adapter task for the queue entry is suspended for a time until resumed upon receipt of a corresponding acknowledgement from the remote data storage system. When the link queue entry is suspended, a new task is begun in step 541. In the short distance option, however, it may be preferable for the task to poll for an acknowledgement of receipt, instead of suspending the task. In any case, if a receipt is not acknowledged within a timeout period, as tested in steps 547 and 548, then in step 549 an error is logged or reported to the system operator, and in step 550 the job is re-executed to retransmit the command over the link, or if retransmission is unsuccessful, the job is redirected to an alternative link or alternative link adapter.

Once the link adapter receives an acknowledgement of receipt of the write command from the remote data storage system, execution continues from step 547 to step 551. In step 551, the link adapter reports the receipt of the acknowledgement to the channel adapter which originated the write command. This reporting, for example, is done by the link adapter writing a message in a mailbox region of cache memory preassigned to the channel adapter which originated the command. Alternatively, circuitry could be provided so that the link adapter could directly interrupt the channel adapter.

In step 552, the link adapter de-allocates the cache memory of the link queue and the corresponding memory in the link buffer. The task is then done. In the short distance option, the link adapter could continuously run a single task, in which case execution would loop back from step 552 to step 541.

Figure 22:
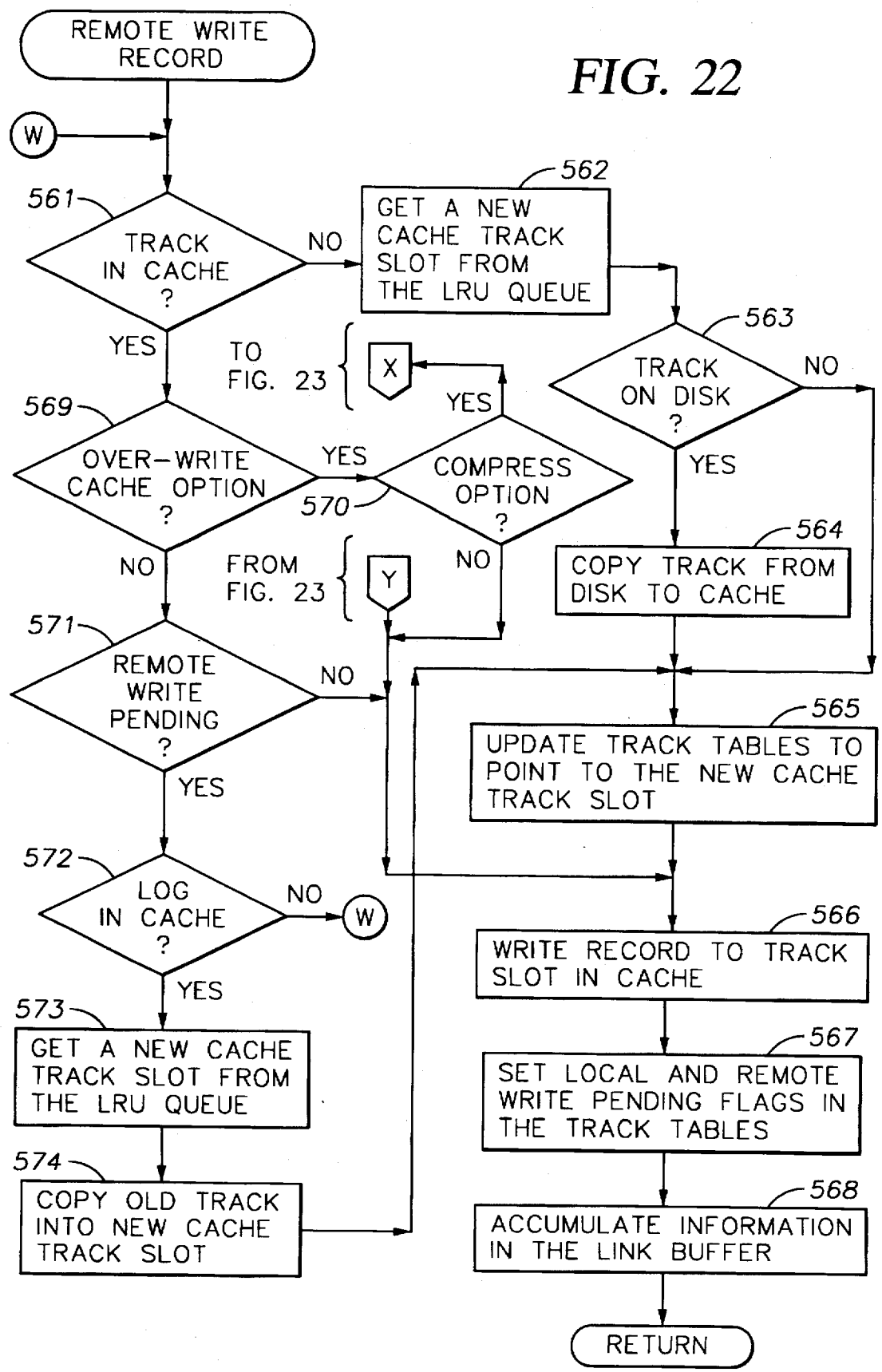
FIG. 22 is a first portion of a flowchart of the operation of a channel adapter when writing a record to a primary (R1) volume located in the same data storage system containing the primary (R1) volume.

Turning now to FIG. 22, there is shown a flowchart of a procedure that could be used in step 530 of FIG. 19 for writing a record to a primary (R1) volume. In the first step 561 of FIG. 22, the channel adapter checks whether the track of the record is in cache. If not, then execution branches to step 562 to fetch a next cache track slot from the LRU queue (503 of FIG. 18). Then in step 563, the channel adapter checks whether the track is on disk. If so, then execution branches to step 564, and the track is copied from disk to the cache slot in cache. If not, execution loops around step 564. Then in step 565, the track tables are updated to indicate that the track now resides in the new cache track slot. Then in step 566, the record is written to the cache track slot. In step 567, the local and remote write pending flags are written in the track tables. For example, each track has such local and remote write pending flags, and also each record has such local and remote write pending flags. Finally, in step 568, a pointer to the record in cache is accumulated in the link buffer.

If the track does reside in cache, then in step 569, execution branches to step 570 if the channel adapter is working in an "overwrite cache option" for the volume. This is the fastest option for remote mirroring of data, but it contributes to the "rolling disaster" problem. In the overwrite cache option, every single update to a record of a primary volume is not necessarily transmitted to the secondary volume. Instead, if the cache contains a remote write pending record that has not yet been transmitted by a link adapter to the data storage system having the secondary volume, then a new version will overwrite this write pending record in cache (in step 566). In the adaptive copy modes, however, the overwrite cache option substantially increases the performance of remote mirroring of data, by reducing the number of remote pending records that are maintained in cache or on disk.

In step 570, execution continues to step 566 if a "compress" option is not enabled for the volume. The compress option is described below with reference to FIG. 23.

If overwrite cache option is not enabled, then execution continues from step 569 to step 569 to check whether there is a remote write pending to the record in cache. If not, execution branches to step 566, since in this case there is no possibility of an overwrite of a remote write pending record not yet transmitted over the link. If there is a remote write pending record, then execution branches to step 572. To avoid writing over the remote write pending record, when step 572 finds that a "log in cache" option is not selected for the volume, then execution branches back to step 561 to stall or suspend the writing of the new record until the cache slot no longer contains the remote write pending record; step 561 will check that the track has not been removed from cache during suspension of the current channel adapter task.

If the "log in cache" option is selected, then execution continues from step 572 to step 573. In step 573, a new cache track slot is obtained from the head of the LRU queue, and in step 574 the existing remote write pending track is copied to the new cache track slot. Therefore, the original track in cache is still available for transmission of the original remote write pending record over the link by a link adapter, and a new cache track slot for the same track is available to receive the new version of the write pending record. Execution continues from step 574 to step 565, so that the track tables are updated to point to the new cache track slot.

The "log in cache" option should be used only if the current loading on the data storage system is very light, because the copying of data from one cache track slot to another will tie up access to the cache. Also, keeping multiple versions of tracks in cache will tie up cache resources, so a count of such old versions of tracks should be kept (incremented when a copy is made, and decremented when the track cache slot is deallocated upon receipt of acknowledgement of a remote write operation), and no more than a certain number of such old versions should be permitted in cache at any given time. The "log in cache" option, however, would permit uninterrupted host access to a primary (R1) volume in the event of an all-links failure for a short period of time. The short period of time could be used to detect the "all links" failure, and to switch the remote links over to some spare disk drives to create a non-volatile log of all remote writes. If a link could be restored before the spare disk drives are overloaded, then the spare disk drives could be used to restore the secondary (R2) volumes without the possibility of corruption due to the "rolling disaster" scenario.

Figure 23:
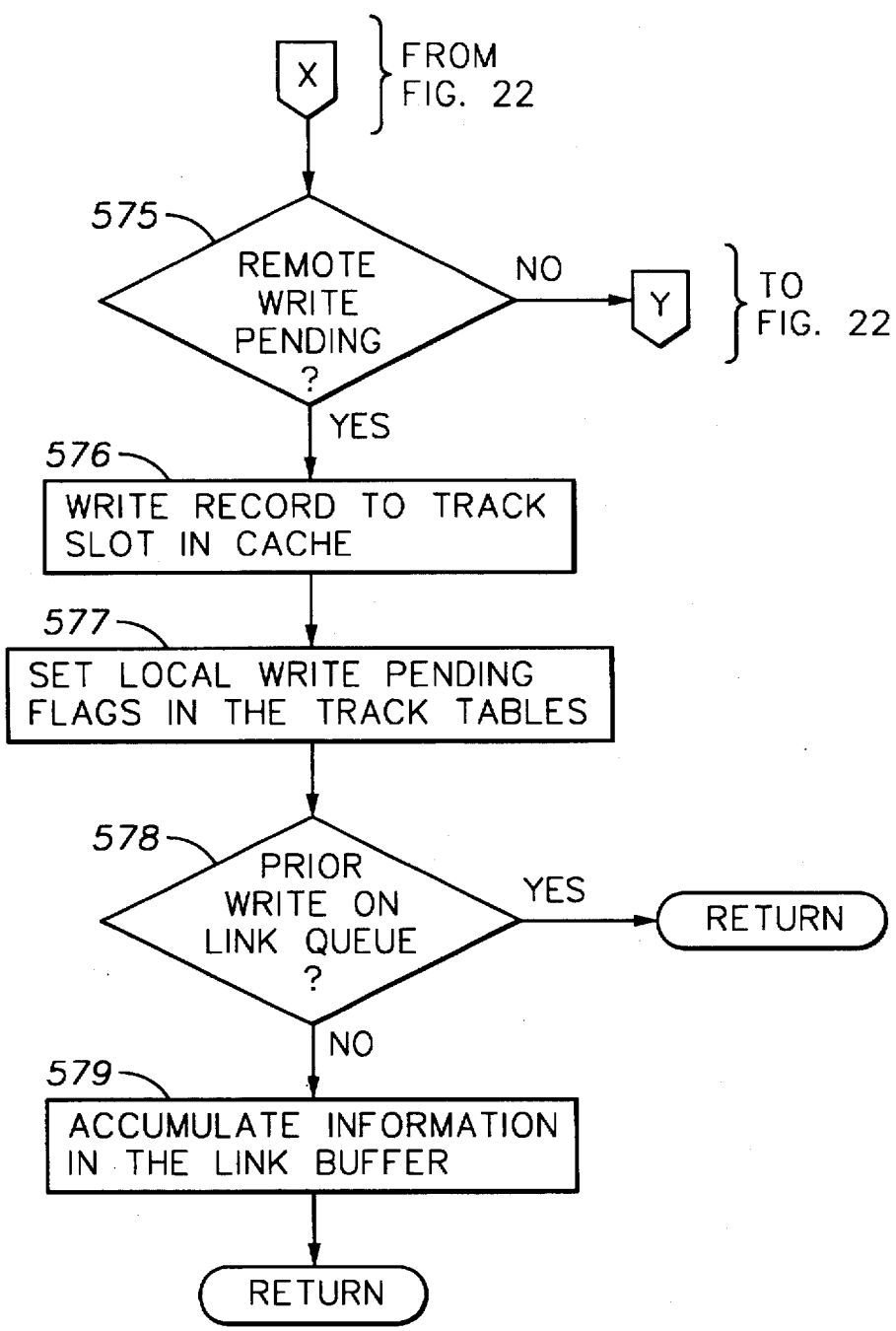
FIG. 23 is a second portion of the flowchart begun in FIG. 22.

If step 570 finds that the compress option is enabled, then execution branches to step 575 of FIG. 23. In step 575 of FIG. 23, execution branches back to step 566 of FIG. 22 if a remote write is not pending. Otherwise, execution continues to step 576 of FIG. 23. In step 576, the new record is written to the track cache slot. In step 577, the local write pending flag is set in the track tables. Then in step 578, the track tables are accessed to determine whether the prior write pending operation is still on the link queue. For the compress option, for example, the track table contains "on-queue" bits in addition to the "write pending" bits; the on-queue bits would be set in step 530 of FIG. 19 (and in step 568 of FIG. 22 and step 579 of FIG. 23 for particular records) and cleared in step 545 of FIG. 21. If the prior write pending operation is still on-queue for the new write data, it is not necessary to accumulate in the link buffer the pointers to the new write data since the prior write pending pointers, still on queue, will cause the new write data to be sent. Therefore, in this case, execution returns from step 578. Otherwise, execution continues from step 578 to step 579. In step 579, the pointers to the new write data are accumulated in the link buffer.

L. Remote Mirroring Error Messages

In a preferred implementation of the remote mirroring facility, the data storage system reports the following environmental error messages at the service processor user interface, and to the host and the customer service center:

Dynamic sparing invoked.
Dual-initiator adapter failed to reset.
Over temperature condition.
Data storage system power system alarm.
Locally mirrored drive (primary (R1) volume) is in a "not ready" state.
Locally mirrored drive (primary (R1) volume) is write disabled.
Remotely mirrored drive (secondary (R2) volume) is in a "not ready" state.
Service processor not responding.
Failed to complete an automatic call to the customer support center.
Power supply failure.
Environment cable missing.
AC line failure or interruption.
High charge state not detected within 2 minutes of power up; or, clock inconsistency found between data storage system and service processor; or, adapter inserted without power-up.
Latched alarms.
Link adapter problem/failure.
Link adapter problem/failure corrected; all links operational M. Remote Mirroring Event Messages In a preferred implementation of the remote mirroring facility, the data storage system reports the following device-level events at the service processor user interface and to the host and to the customer service center:

Secondary (R2) volume resynchronized with primary (R1) volume.
Primary (R1) volume resynchronized with secondary (R2) volume.
Resynchronization process has begun.

N. Remote Mirroring Status Commands

In a preferred implementation of the remote mirroring facility, the service processor and the host remote mirroring software responds to the following commands for requesting remote mirroring status:

(1) Display Configuration Status

This command displays the following status information regarding logical volumes configured for remote mirroring:

Volume number.
Channel number.
Number of cylinders on volume.
Mirrored volume status.
Flags enabled for the volume:
  80—primary (R1) volume
  40—secondary (R2) volume
  20—WR Enable (secondary (R2) volume read/write enabled)
  10—Not Ready (volume "not ready" to host)
  108—semi-synchronous mode of operation
  04—data migration
  02—Sync required
  01—Domino effect (2) Display Write Pending Tracks This command displays the number of write pending tracks between remotely mirrored volume pairs. An invalid track count is displayed for each of the primary (R1) and secondary (R2) volumes. Synchronized pairs display "0" for the invalid track counts for each of the primary (R1) and secondary (R2) volumes.

(3) Display Adaptive Copy Volumes This command displays the primary (R1) volume, the secondary (R2) volume, the adaptive copy mode (write pending or disk), and the skew value set for each remotely mirrored pair having adaptive copy enabled.

O. Remote Mirroring Configuration Commands

In a preferred implementation of the remote mirroring facility, the service processor and the host remote mirroring software respond to the following commands for requesting remote mirroring status:

Set the configuration of primary (R1) volumes and their corresponding secondary (R2) volumes.

Make a specified primary (R1) volume or range of primary volumes or all primary volumes "ready" to the remote host.

Make a specified primary (R1) volume or range of primary volumes or all primary volumes "not ready" to the remote host.

Enable a specified secondary (R2) volume or range of secondary volumes or all secondary volumes for remote host writes.

Enable a specified secondary (R2) volume or range of secondary volumes or all secondary volumes for remote host "read only".

Make a specified secondary (R2) volume or range of secondary volumes or all secondary volumes "not ready" to the remote host.

Enable volume domino mode for a specified primary (R1) volume or range of primary volumes or all primary volumes.

Disable volume domino mode for a specified primary (R1) volume or range of primary volumes or all primary volumes.

Enable link domino mode.

Disable link domino mode.

Set the synchronous mode for a specified primary (R1) volume or range of primary volumes or all primary volumes.

Set the semi-synchronous mode for a specified primary (R1) volume or range of primary volumes or all primary volumes.

Enable adaptive copy—write pending mode and set the skew rate for a specified primary (R1) volume or range of volumes.

Enable adaptive copy—disk mode and set the skew rate for a specified primary (R1) volume or range of volumes.

Disable adaptive copy for a specified primary (R1) volume or range of volumes.

Enable the "sync required" attribute for a specified primary (R1) volume or range of primary volumes or all primary volumes.

Disable the "sync required" attribute for a specified primary (R1) volume or range of primary volumes or all primary volumes.

P. Host Remote Mirroring Software Features

The optional host remote mirroring (RM) software (213 in FIG. 4) enables an operator to monitor and control remote mirroring and data migration of the data storage system by entering commands at a host system console. In particular, the operator can query the status of the drive and link relationships between remotely mirrored data storage systems, query the synchronization status of each mirrored volume pair, modify the synchronization modes for each mirrored volume pair, and issue commands to suspend or resume the mirroring activity for each mirrored volume pair or an entire data storage system. The host remote mirroring software commands may be integrated into automated operations or host applications, giving the user a robust and elegant implementation of remote mirroring with a great deal of flexibility and control.

For all command examples below, the "#" character is used for a "command prefix" parameter. When executing the command examples, substitute the particular command prefix recognized by the host operating system.

(1) Sync Direction

The host remote mirroring software permits an operator or host application program to initiate, inhibit, suspend, or resume remote mirroring in any specified direction between two data storage systems configured for remote mirroring. (See, for example, the actions that can be performed by the #SC VOL command described below.) When the host remote mirroring software is loaded and initialized, parameter statements may be included to restrict this "sync" direction that is allowed for the remote mirroring configuration, and to initialize the sync direction.

(a) Synch Direction Allowed

The parameter statement SYNCH_DIRECTION_ALLOWED, is optional and sets valid values for current synch direction that can be specified in the SYNCH_DIRECTION_INIT initialization parameter and in the #SC GLOBAL,SYNCH_DIRECTION command. The parameter values for this statement may be one of the following:

R1>R2 which will only allow the synch direction to be set to primary (R1) to secondary (R2) or NONE;

R1<R2 which will only allow the synch direction to be set to secondary (R2) to primary (R1) or NONE;

R1< >R2 which will allow the synch direction to be set to any valid setting; or

NONE which will only allow the synch direction to be set to NONE.

If this parameter is not specified, SYNCH_DIRECTION_ALLOWED defaults to R1>R2. When NONE is specified for SYNCH_DIRECTION_ALLOWED, the #SC VOL command parameters VALIDATE and INVALIDATE will not function. The format of this parameter statement is as follows:

SYNCH_DIRECTION_ALLOWED=R1>R2¦R1<R2¦R1< >R2¦NONE

For example: SYNCH_DIRECTION_ALLOWED= R1>R2

(b) Synch Direction Init

The parameter statement SYNCH_DIRECTION_INIT, is optional and sets the synchronization direction at the time the host remote mirroring software is started. The current SYNCH_DIRECTION may be changed using the #SC GLOBAL,SYNCH_DIRECTION command. The parameter values for this statement may be R1>R2 which specifies that VALIDATE is allowed only on secondary (R2) volumes and INVALIDATE is allowed only on primary (R1) volumes, or R1<R2 which specifies that VALIDATE is allowed only on primary (R1) volumes and INVALIDATE is allowed only on secondary (R2) volumes, or NONE. If this parameter is not specified, SYNCH_DIRECTION_INIT defaults to NONE. The format of this parameter statement is as follows:

SYNCH_DIRECTION_INIT=R1>R2¦R1<R2¦NONE

For example: SYNCH_DIRECTION_INIT=R1<R2 This parameter must not conflict with SYNCH_DIRECTION_ALLOWED and is therefore subject to all constraints set by SYNCH_DIRECTION_ALLOWED. This parameter may be changed with the #SC GLOBAL,SYNCH_DIRECTION command.

(2) Host Remote Mirroring Software Status Commands

These commands allow an operator to view various aspects of remote mirroring status.

HELP

The HELP command displays all available host remote mirroring software commands.
SQ ADC The SQ ADC command displays the adaptive copy skew values for the specified volumes(s).

Format: #SQ ADC, cuu, count|ALL

Parameters:
cuu Specifies the host device number for the volume
count Specifies the number of devices for which to display adaptive copy information. This value can be set from 1 to 256 (decimal) or ALL. If this parameter is not specified, count defaults to 1.

Comments: Only the source (R1) volumes in adaptive copy mode (disk or write pending) are displayed.

EXAMPLE: #SQ ADC,F00,5

This example displays the following fields:
1. host device number.
2. First device address (hex) on the host channel.
3. Control unit device number in hex.
4. Remotely mirrored device number in hex.
5. Adaptive Copy mode in effect. Valid values are Adaptive Copy—Write Pending mode (AW), or Adaptive Copy—Disk mode (AD).
6. Current skew value—for Adaptive Copy—Write Pending mode, it is the number of writes pending for the target (R2) volume. For the Adaptive Copy—Disk mode, it is the number of tracks marked as out-of-sync between the source (R1) and the target (R2) volume.
7. Adaptive copy maximum skew value for device(s). Range=1 to 999,999 (decimal).

SQ CNFG

The SQ CNFG command displays the status of the data storage system. It lists the serial number of the data storage system, the amount of cache memory installed, the controller emulation type, the microcode level, the data storage system IDs and their associated number of devices, and the adapter type and layout.

Format: #SQ CNFG, cuu

Parameters: cuu specifies the host device number.

Comments: Issue this command to determine the location of the link adapters in the data storage system for the remote mirroring operations.

EXAMPLE: #SQ CNFG,500

This example causes the following fields to be displayed:
1. data storage system serial number.
2. Cache size in megabytes.
3. Controller emulation type.
4. Microcode level.
5. Data storage system ID(s) with associated number of devices.
6. Microcode patch level and date.
7. Maximum number of tracks to allow to be out of synchronization.
8. (through 23) Data storage system adapter types. Valid values are: DA=Disk Adapter, CA=Parallel Channel Adapter, EA=Serial Channel Adapter, SA=Fast-Wide SCSI Channel Adapter, LA=link adapter.

SQ GLOBAL

The SQ GLOBAL command displays the settings for the various global parameters including the current host remote mirroring software version, the current and allowed synch directions, the status of message processing and the size of a message table, and setting for an OPERATOR_VERIFY initialization parameter.

Format: #SQ GLOBAL

EXAMPLE: #SQ GLOBAL

The example displays the following fields:
1. The host remote mirroring software version.
2. The current synchronization direction. Valid values are NONE, R1>R2, and R1<R2.
3. The status of message processing. Valid values are Yes, "nnn" or No. The value "nnn" is the number of messages that can be held in the message table.
4. The setting for operator verification. Valid values are ALL, NONE, or CRITICAL.
5. The allowable synchronization directions as specified in the initialization parameters. Valid values are NONE, R1>R2, R1<R2, or R1< >R2.

SQ LINK

The SQ LINK command displays the port connection and online/offline status of individual link adapters. It also displays the average input/output's per second during a short interval, and the total input/output's since the last data storage system initial microcode load.

Format: #SQ LINK, cuu

Parameters: cuu Specifies the host device number.

EXAMPLE: #SQ LINK,600

This example displays the following fields:
1. host device number.
2. Adapter number of the link adapter in hex.
3. Link adapter type.
4. Number of ports.
5. Port connection status (Y=link path established; N=no link path established). This field corresponds left to right as to the ports on the board. The ports on the board are top to bottom.
6. Link status. Valid values are ONLINE or OFFLINE.
7. Short interval duration during which the average number of start input/output commands are calculated. This timer resets approximately every 10 minutes or when a data storage system initial microcode load occurs or utility reset command is issued.
8. Average input/output's per second over the short time interval.
9. Time since last data storage system initial microcode load or last utility reset command issued from the service processor.
10. Total start input/output commands since last data storage system initial microcode load or last utility reset command.

SQ MSG

The SQ MSG command displays any remote mirroring error or informational messages presented to the host console if the message processing startup option was selected. These messages can be generated by any data storage system in the remote mirroring configuration.

Format: #SQ MSG, count|ALL

Parameters: count Specifies the number of messages to display. This value can be set from 1 to the size of the message log (as specified in a MESSAGE_

PROCESSING initialization parameter) or ALL. If this parameter is not specified, count defaults to 1.

Comments: This command, when issued with the ALL parameter, displays all messages currently held in the message log. The newest messages will appear at the top of the display and the oldest messages at the bottom of the display.

EXAMPLE: #SQ MSG,ALL

This example displays the following fields:
1. Date of error condition.
2. Time of error condition.
3. Reporting device address.
4. Device experiencing error (data storage system device number).
5. Device volser of device reporting the error.
6. Control unit system ID.
7. Data storage system message. Valid remote mirroring messages include: DYNAMIC SPARING INVOKED, TARG VOLUME RESYNC W/PRIMARY, PRIMARY VOLUME RESYNC W/SECONDARY, R1 VOL NOT READY STATE, R1 VOL WRITE DISABLED, R2 VOLUME IN NOT RDY STATE, ADAPTER LINK PROBLEM, RESYNC PROCESS HAS BEGUN, ADAPTER LINK OPERATIONAL. Valid migration messages are similar except substitute "DATA MIGRATION COMP ON VOL" for "PRIMARY VOLUME RESYNC W/SECONDARY".

SQ SSID

The SQ SSID command displays the data storage system IDs known to the host operating system and the number of devices associated with them during the remote mirroring initialization.

Format: #SQ SSID, count|ALL

Parameters: count Specifies the number of data storage system IDs to display. This value can be set from 1 to 64 (decimal) or ALL. If this parameter is not specified, count defaults to 1.

Comments: Setting the parameter value to ALL displays all data storage system IDs found with devices online to the host.

EXAMPLE: #SQ SSID,ALL

This example displays the following fields:
1. System ID.
2. Number of devices (in hex) that have been known to be online for this storage system ID.
3. Flags.
   x'80' 1 . . . . . . . EMC Corp. SYMMETRIX data storage system
   x'40' . 1 . . . . . . EMC Corp. data storage system 5xxx Series
   x'20' . . 1 . . . . . 3990 controller emulation
   x'10' . . . 1 . . . . DEV number is valid. Treat this field as a bit mask. More than one of these bits may be on at a given time. For example, a value of "F0" indicates that the controller is a EMC SYMMETRIX data storage system, 5xxx Series, in 3990 mode, and that the device numbers are valid. An IBM Corp. model 3990 data storage system would have a x'20' flag.
4. First cuu found for this data storage system ID.
5. First device address (hex) on the host channel.
6. First data storage system device number.
7. Last cuu found for this data storage system ID.
8. Last device address (hex) on the host channel.
9. Last data storage system device number.

SQ VOL

The SQ VOL command displays the status of individual remote mirroring volumes including online, offline, synchronization state, write protection state, remote mirroring mode of operation, etc.

Format: #SQ VOL, cuu, count|ALL|INV_TRKS

Parameters:
cuu Specifies the host device number
count Specifies the number of devices to display. This value can be set from 1 to 256 (decimal), or ALL, or INV_TRKS. If this parameter is not specified, count defaults to 1.

Comments: Only remote mirroring volumes display INV_TRK values. The count parameter can display either a range of remote mirroring devices, or the status of ALL remote mirroring devices on a specified control unit, or only those remote mirroring devices with an invalid tracks count.

EXAMPLE: #SQ VOL,600,8

This example displays the following fields:
1. Host device number. Field 1 displays "????" for devices not online during startup or put online after the last SC GLOBAL,SSID_REFRESH command.
2. First device address (hex) on the host channel. Field 2 displays "??" for devices not online during startup or put online after the last SC GLOBAL,SSID_REFRESH command.
3. Data storage system device number in hex.
4. Remotely mirrored logical volume number in hex.
5. Device volser. If the device was online at system initialization or during a SC GLOBAL,SSID_REFRESH, the volser is from a system configuration control block (UCB); otherwise, it is the volser assigned to the device when the data storage system was installed.
6. Total number of cylinders on volume.
7. Host device status. Valid values are:
   NOSCHIB=no sub-channel for device,
   HOT-IO=device is in hot input/output status,
   PDA-PRV=pending offline, allocated, mounted private,
   PDA-PUB,=pending offline, allocated, mounted public,
   PDA-STG=pending offline, allocated, mounted storage,
   OFFLINE=device offline to the host,
   ON-PRV=online, mounted private,
   ON-PUB=online, mounted public,
   ON-STG=online, mounted storage,
   ONA-PRV=online allocated, mounted private,
   ONA-PUB=online allocated, mounted public,
   ONA-STG=online allocated, mounted storage,
   N/A=the system configuration control block (UCB) was not available.
8. Number of open DCBs.
9. Control Unit status. Format is xxx-yy-z. Valid values are: xxx=R/W (read/write mode), xxx=R/O (read only mode), xxx=N/R (not ready mode), xxx=RNR (RDF devices globally not ready), xxx=TNR (secondary (R2) not ready; this status indicates that communication between the remote mirroring pair is currently inactive due to either the link is offline, the link path is physically unavailable or the remote mirroring pair is RDF-Suspended. Use the #SQ LINK command to determine whether the links are online or offline, and the physical connection status of the links), yy=SY (Synchronous mode), yy=SS (Semi-Synchronous mode), yy=AW (Adaptive Copy—Write Pending mode), yy=AD (device is configured for Adaptive Copy—Disk mode), z=I (a secondary (R2) volume to go not ready if the primary (R1) volume (its mirrored device) has invalid tracks on secondary (R2) volume and a state of change has been requested on the secondary (R2) volume), z=D (primary (R1) volume to go not ready if secondary (R2) volume is not ready—Domino mode).

10. Mirroring status. Valid values are:
R1=Remote mirror primary (R1) volume,
R2=Remote mirror secondary (R2) volume,
ML=Local mirror volume,
RS=Raid-S volume,
(blank)=unprotected device.

11. Primary (R1) volume invalid track count.
12. Secondary (R2) volume invalid track count.
13. Primary (R1)/secondary (R2) volume synchronization percentage.

(3) Host Remote Mirroring Software Configuration Commands

STOP

The STOP command terminates the host remote mirroring software.

SC CNFG

The SC CNFG command sets the number of invalid tracks allowed for the Adaptive Copy—Disk mode function.

Format: #SC CNFG, cuu, value
Parameters:
cuu Specifies the host device number.
value Specifies the maximum allowable tracks (1 to 999,999 decimal) out of synchronization for a specified volume.

EXAMPLE: #SC CNFG,E00,250

This example sets the maximum allowable invalid tracks for the volume having device number E00 to 250.

SC GLOBAL

The SC GLOBAL command, when used with the SSID_REFRESH parameter, causes the host remote mirroring software to "refresh" its internal control blocks with information regarding any data storage systems, volumes, and volsers that have been brought online since the host remote mirroring software was started or the last refresh command was issued.

Format: #SC GLOBAL, SSID_REFRESH or #SC GLOBAL, SYNCH_DIRECTION, R1>R2¦R1<R2¦NONE Parameters: SSID_REFRESH Refreshes host remote mirroring software internal control blocks with the latest information on data storage system IDs, devices, and volsers.

SYNCH_DIRECTION Sets current synchronization direction. Valid values are subject to restrictions set by the SYNCH_DIRECTION_ALLOWED initialization parameter.

Comments: Devices that have been taken offline are not deleted from host remote mirroring software internal control blocks during the refresh processing. This allows the host remote mirroring software to maintain the host device number to data storage system device number mapping to simplify the entry of #SC VOL commands.

SC LINK

The SC LINK command modifies the status of a link adapter.

Format: #SC LINK, cuu, dir#, state
Parameters:
cuu Specifies the host device number
dir# Specifies the link adapter number. Valid values are 01–10 (hex) or ALL.
state Specifies the states of the specified link adapter(s). Valid values are OFFLINE and ONLINE.

Comments: The adapter number specified must be a link adapter. If necessary, issue the #SQ CNFG command to determine the link adapter numbers. When ALL is specified as the dir# parameter value, the requested state of change will be applied to all link adapters.

SC MSG

The SC MSG command, when used with the RESET parameter, clears the message log.

Format: #SC MSG,RESET

Parameters: RESET Clears the message log of all entries.

SC VOL

The SC VOL command modifies the status of remote mirroring volumes. This configuration command provides the ability to set the remote mirroring operational mode. All #SC VOL commands require the operator to confirm the action specified, unless this has been disabled by the OPERATOR_VERIFY sysparm. This confirmation is necessary as some actions may result in loss of data if performed incorrectly. For example, only one volume in a remotely mirrored pair may be read/write-enabled when the devices are remote mirror suspended. The requirement for confirmation may be bypassed based on the value specified for the OPERATOR_VERIFY initialization parameter.

Format: #SC VOL, cuu, action, dev#, value
Parameters:
cuu Specifies the host device number.
action See the table of possible actions below.
dev# Specifies the data storage system device number. Valid values are 00 to FF (hex) and ALL. Used with the ADCOPY_DISK option.
value This value represents the maximum skew value for the device(s) in adaptive copy mode.

Comments: If a data storage system device number is specified, it must be a valid device type (R1 or R2) for that action. If ALL is specified for the dev# parameter, the host device number may be any device type, but the action will be performed only on the valid device types. If no dev# parameter is specified, then the host remote mirroring software will attempt to use the cuu to determine the data storage system device number on which to perform the action.

Table of Possible Actions:

| Action | (R1 = primary volume, R2 = secondary volume) Valid Volume Type | Description |
|---|---|---|
| R/W | R2 | Make secondary (R2) device(s) read and write enabled. This allows a Secondary (R2) to be written to from the channel. Please note that |

Table of Possible Actions:

(R1 = primary volume, R2 = secondary volume)

| Action Valid | Volume Type | Description |
|---|---|---|
| | | if you write to the secondary (R2) device, you should perform testing and recovery procedures. |
| R/O | R2 | Make secondary (R2) device(s) read-only. When a secondary (R2) volume is in this status, any attempt to issue a write from the channel produces an input/output error. |
| RDY | R2 | Make secondary (R2) device(s) ready to the host. |
| NRDT | R2 | Make secondary device(s) not ready. In this state, the secondary (R2) Volume responds "intervention required" to the host for all read and write operations to that volume. This is the default state for a secondary (R2) volume. |
| SYNC | R1 | Set primary (R1) device to the synchronous mode. This is a remote mirroring mode of operation that ensures 100% synchronized mirroring between the two data storage systems. |
| SEMI-SYNC | R1 | Set primary (R1) device to the semi-synchronous mode. This is an remote mirroring mode of operation that provides an asynchronous mode of operation. |
| DOMINO | R1 | Enable volume domino mode for primary (R1) device. This ensures that the data on the primary (R1) and secondary (R2) volumes are fully synchronized at all times in the event of a failure. |
| NDOMINO | R1 | Disable volume domino mode for primary (R1) device. During this default operating condition, a primary (R1) volume continues processing input/outputs with its host even when an remote mirroring volume or link failure occurs. These failures cause loss of primary (R1) and secondary (R2) synchronization. When the failure is corrected, the devices begin synchronizing. |
| RDF-RDY | R2/R1 | Set volume ready to the host for remote mirroring operation. This action is valid for both primary (R1) and secondary (R2) volumes. |
| RDF-NRDY | R2/R1 | Set volume not ready to the host for remote mirroring operation. This action is valid for both primary (R1) and secondary (R2) volumes. |
| ADCOPY-WP | R1 | Enable adaptive copy - write pending function for primary (R1) device. When this attribute is enable, data storage system acknowledges all writes to primary (R1) volumes as if they were local volumes. |
| NADCOPY | R1 | Disable Adaptive Copy Function for primary (R1) device. Please note that when switching from adaptive copy - disk mode to adaptive copy - write mode or from adaptive copy - write mode to adaptive copy - disk mode, this command must first be used before setting the new adaptive copy mode. Please note that when this command is issued to remove a device from adaptive copy mode, the state change will not take place until the volumes are synchronized. |
| ADCOPY-DISK | R1 | Place the specified device(s) in adaptive copy disk mode. |
| ADC-MAX | R1 | Set the adaptive copy maximum skew value for the device(s). Example: #SC VOL,F00,ADC-MAX,,80. The maximum skew value may be specified in the range of 1–999999. This command may only be entered when the device is in one of the supported adaptive copy modes. Setting the skew value too high in Adaptive Copy - Write Pending mode could result in excessive cache use adversely affecting data storage system performance. |
| RDF-SUSP | R1 | Suspend remote mirroring operation on specified device. If the device is already suspended, this action is ignored. |
| RDF-RSUM | R1 | Resume remote mirroring operation on specified device. This action is only valid if the device was previously suspended via a successful RDF-SUSP action or INVALIDATE action. |
| VALIDATE | R1/R2 | Make all tracks for a primary (R1) volume valid on a secondary (R2) volume. When SYNCH_DIRECTION=R1>R2 this action code makes all tracks from a primary (R1) volume valid on secondary (R2) volumes. When SYNCH_DIRECTION=R1<R2 this action code makes a primary (R1) volume not ready and prepares it to be re-synched from the secondary (R2) volume using RDF-RSUM. It makes all tracks for a secondary (R2) volume valid on the primary (R1) volume. |
| INVALIDATE | R1 | Make all tracks invalid for a secondary (R2) volume on a primary (R1) volume. When resynchronization begins, all primary (R1) volume tracks are copied to the secondary (R2) volume. |

(4) Data Migration Query Commands

SQ VOL_MGR

The SQ VOL_MGR command displays the status of individual data migration volumes. It also displays the host system level information for each device if it was online during system startup.

Format: #SQ VOL_MGR, cuu, count¦ALL¦NOT_COMPLETE

Parameters:
  cuu Specifies the host device number
  count Specifies the number of devices to display. Possible values are 1 to 256 (decimal), ALL, or NOT_COMPLETE.

Comments: The count parameters can display the migration status of all data storage system volumes accessible through that control unit (ALL), a specific number of data storage system devices, or only those data storage system devices that have not completed migration (NOT_COMPLETE).

EXAMPLE: #SQ VOL_MGR,600,3

This example displays the following fields:

1. Host device number. Field 1 displays "????" for devices not online during startup or put online after the last SC GLOBAL,SSID_REFRESH command.
2. First device address (hex) on the host channel. Field 2 displays "??" for devices not online during startup or put online after the last SC GLOBAL,SSID_REFRESH command.
3. Control unit device number in hex.
4. Migration device number in hex.
5. Device volser. If the device was online at system initialization or during a SC GLOBAL,SSID_REFRESH, the volser is from the UCB; otherwise, it is the volser assigned to the device when the data storage system was installed.
6. Data Migration device status. Valid values are:
   READY=data storage system device is ready to host;
   NRDY=data storage system device is not ready to host;
   NR-MIG=data storage system device is not ready for migration.
7. Original data storage system invalid track count.
8. Data storage system volume invalid track count.
9. Remaining tracks to migrate.
10. Total tracks on volume.
11. Percentage of tracks migrated to data storage system device.
12. Migration rate. Possible values are:
    MAX=maximum migration rate;
    FST=fast migration rate;
    MED=medium migration rate;
    SLO=slow migration rate;
    DEF=default migration rate (maximum).
13. Device data migration enabled indicator (Y/N).

(5) Data Migration Configuration Commands

SC CNFG_MGR

The SC CNFG_MGR command modifies the global data migration rate in effect for all data migration volumes.

Format: #SC CNFG_MGR, cuu, value

Parameters:
cuu Specifies the host device number.
value Rate at which data storage system attempts to transfer data from the original DASD unit. Valid values are FAST, MEDIUM, or SLOW.

SC VOL_MGR

The SC VOL_MGR command modifies the status of a data migration volume. This configuration command provides the ability to establish/stop idle time data migration for the specified volume(s) or all migration volumes and specify the data migration rate for specified or all data migration volumes. All #SC VOL_MGR commands require the operator to confirm the action you have specified, unless this has been disabled by the OPERATOR_VERIFY sysparm. This confirmation is necessary as some actions may result in loss of data if performed incorrectly. The requirement for confirmation may be bypassed based on the value specified on the OPERATOR_VERIFY initialization parameter.

Format: #SC VOL_MGR, cuu, action, dev#, rate

Parameters:
cuu Specifies the host device number.
action See the table of possible actions below.
dev# Specifies the data storage system device number. Valid values are 00 to FF (hex) and ALL.
rate Speed at which migration occurs. Valid values are MAXIMUM, FAST, MEDIUM, and SLOW.

Comments: If ALL is specified for the dev# parameter value, then all data migration devices on that controller are affected by this command action. If no dev# parameter is specified, then the host remote mirroring software will attempt to use the cuu parameter to determine the data storage system device number on which to perform the action. The rate parameter is only specified when DM_RATE is the action.

Table of Possible #SC VOL_MGR Actions:

| Action | Description |
| --- | --- |
| DM_COPY_START | Enable data migration copy process for the specified device(s) during idle time. |
| DM_COPY_STOP | Stop data migration copy process for the specified device(s) during idle time; only migrate data during normal input/output operations. |
| DM_RATE | Set data migration rate to value specified by the rate parameter. |

(6) Remote Mirroring Recovery Procedures Using Host RM Software

Following are specific examples of using the host remote mirroring (RM) software to perform data recovery procedures. "ccu" refers to the host device number, and "dev#" refers to the data storage system logical volume number.

(a) Recovering Using a Remote Host

In the event of a disaster at a local site that renders all equipment (local CPU and data storage system) non-operational, perform the following sequence of steps when using the remote data storage system to recover.

Write-enable all secondary (R2) volumes to the host at the remote site by performing the following two steps:

1. Set all R2 volumes to a "ready" state to the remote host by typing the following command:

SC VOL,cuu,RDY,ALL

2. Write enable all volumes on the remote data storage system with a remote mirror designation (R2) by typing the following command:

SC vol,cuu,R/W,ALL

All volumes at the remote data storage system are now available for input/output operations with the host at that site. Before read/write operations can be resumed with the data storage system at the local site, however, all secondary (R2) volumes at the remote data storage system must be set to read-only, not-ready to the host at the remote site, and the resynchronization process established. (Failure to make the secondary (R2) volumes read-only prior to bringing the local data storage system online can result in data corruption and invalid tracks in both the primary (R1) and secondary (R2) volumes.) When the host and data storage system at the local site are ready to be brought back online, perform the following steps:

At the remote site, perform the following four steps:

1. Stop input/output operations with the remote data storage system and vary devices offline from the remote host.
2. Make all secondary (R2) volumes on the remote data storage system read-only and not ready to the remote host (as per the original configuration) by typing the following commands:

SC VOL,cuu,R/O,ALL and

SC VOL,cuu,NRDY,ALL

3. Enable all disk adapters on the remote data storage system.
4. Enable the link adapters on the remote data storage system.

At the site of the original disaster (local host and data storage system) perform the following seven steps:

1. Disable the adapters (channel adapters and RLDs) on the local data storage system.
2. Reconnect the link cables from the location they were previously disconnected.
3. IPL the host system.
4. Power up the local data storage system.
5. Enable all disk adapters and link adapters. The two data storage systems begin synchronizing. When the links synchronize, the remote data storage system begins copying its data to the local data storage system.
6. Enable the channel adapters.
7. Have the user vary devices online to the local host and resume operations with the local data storage system.

The operator can view the status of the resynchronization process by issuing: #SQ VOL,cuu,INV_TRKS (b) Testing Recovery Procedures In a normal remote mirroring device relationship, the primary (R1) device may be synchronized with its secondary (R2) device or it may contain updated tracks which the link adapter has not yet sent to the secondary (R2) device (semi-synchronous or adaptive copy state). In addition, in a normal operating environment, the secondary (R2) volume is in a read-only mode. The operator can test recovery procedures by write-enabling the secondary (R2) volumes. To write-enable a secondary (R2) volume, the operator must first suspend remote mirroring operations between the primary (R1) and secondary (R2) volumes, make the devices ready, and then write-enable the secondary (R2) volumes.

(i) Suspending Remote Mirroring Operations

To suspend remote mirroring operations for a single pair, enter the following command at the host with access to the primary (R1) volume: #SC VOL,cuu,RDF-SUSP,dev#. To suspend remote mirroring operations for all remotely mirrored pairs, enter the following command at the host with access to the primary (R1) volume: #SC VOL,cuu,RDF-SUSP,ALL.

(ii) Making Volumes Ready

To make a secondary (R2) volume ready, enter the following command at the host with access to the secondary (R2) volume: #SC VOL,cuu,RDY,dev#. To make all secondary (R2) volumes ready, enter the following command at the host with access to the secondary (R2) volume: #SC VOL,cuu,RDY,ALL.

(iii) Write-Enabling Secondary (R2) Volumes

To write-enable the secondary (R2) volume, enter the following command at the host with access to the secondary (R2) volume: #SC VOL,cuu,R/W,dev#. To write-enable all secondary (R2) volumes, enter the following command at the host with access to the secondary (R2) volume: #SC VOL,cuu,R/W,ALL. Any primary (R1) volume configured with the domino effect option will go RNR (volumes not ready for remote mirroring operation) when remote mirroring operations are suspended. To clear this not ready condition, the operator must disable the domino effect option on those "not ready" volumes, and then enable those devices for remote mirroring operation using the RDF-RDY action with the #SC VOL command.

(iv) To Resume Remote Mirroring Operations

There are several ways to resume remote mirroring operations. The method used will depend on the state of the remotely mirrored pair. This section describes the various methods. (WARNING! Any deviation from the procedures described in this section may result in data corruption! Consult the table of primary (R1)/secondary (R2) volume status below for the appropriate procedure to follow.)

Use the #SQ VOL command to determine the invalid track count of the primary (R1) and secondary (R2) volumes.

Table of Primary (R1)/Secondary (R2) Volume Status

| Primary (R1) Volume | Secondary (R2) Volume | Procedure |
|---|---|---|
| no invalid tracks | no invalid tracks | see Procedure 1 |
| invalid tracks | no invalid tracks | see Procedure 1 |
| no invalid tracks | invalid tracks | see Procedure 2 |
| invalid tracks | invalid tracks | see Procedure 3 |

Procedure 1: No Invalid Tracks or Invalid Tracks on Primary (R1) Volume Only. Follow this procedure to resume remote mirroring operations when there are no invalid tracks on the secondary (R2) volume.

1. Make the secondary (R2) volume(s) on the data storage system read-only by typing the following command at the host with access to the secondary (R2) volume(s): #SC VOL,cuu,R/O[,dev#¦,ALL].
2. Make the secondary (R2) volume(s) on the data storage system not ready by typing the following command at the host with access to the secondary (R2) volume(s): #SC VOL,cuu,NRDY[,dev#¦,ALL].
3. Resume remote mirroring operations by typing the following command at the host with access to the primary (R1) volume(s): #SC VOL,cuu,RDF-RSUM, ALL Procedure 2: Invalid Tracks on Secondary (R2) Volume Only. Follow this procedure to resume remote mirroring operations when there are no invalid tracks on the primary (R1) volume and invalid tracks on the secondary (R2) volume. This procedure copies the information on the primary (R1) volume to the secondary (R2) volume.

A. To Discard All Updates to the secondary (R2) Volume:

1. Verify that the current synchronization direction is set from primary to secondary (R1→R2) by typing the following command: #SQ GLOBAL. Issue the following command if it is necessary to change the current synchronization direction #SC GLOBAL,SYNCH_DIRECTION,R1>R2.
2. Make the secondary (R2) volume(s) on the data storage system read-only by typing the following command at the host with access to the secondary (R2) volume(s): #SC VOL,cuu,R/O[,dev#¦,ALL]
3. Make the secondary (R2) volume(s) on the data storage system not ready by typing the following command at the host with access to the secondary (R2) volume(s): #SC VOL,cuu,NRDY[,dev#¦,ALL].
4. Determine which secondary (R2) volumes have a non-zero R1 INV_TRKS value by typing: #SQ VOL, cuu,INV_TRKS.
5. For all secondary (R2) volumes with non-zero R1 INV_TRKS values: From the host with access to the secondary (R2) volume:
    a. Validate all invalid tracks for the primary (R1) volume(s) on the secondary (R2) volume by typing:

SC VOL,cuu,VALIDATE[,dev#¦,ALL] ('dev#'= secondary (R2) volume with an R1 INV__TRKS value greater than 0).
  b. Repeat step a for each secondary (R2) volume with a non-zero R1 INV__TRKS value for a primary (R1) volume. If ALL is the specified parameter then step b is not necessary.
6. Verify all secondary (R2) volumes have an R1 INV__TRKS value equal to 0 by typing : #SQ VOL,cuu, INV__TRKS.
7. For all primary (R1) volumes whose secondary (R2) volume (R2) was write-enabled and had an R1 INV__TRK value greater than 0 (prior to step 2 above): From the host with access to the primary (R1) volume:
  a. Invalidate all valid tracks for the secondary (R2) volume on the primary (R1) volume by typing:
SC VOL,cuu,INVALIDATE[,dev#¦,ALL] ('dev#'= primary (R1) volume whose secondary (R2) volume had an R1 INV__TRKS value greater than 0). The host remote mirroring software will monitor the process of invalidating all secondary tracks until complete. This may take up to two minutes on a heavily loaded controller. The host remote mirroring software will not perform any new remote mirroring commands during this process.
8. Resume remote mirroring operation from the host with access to the primary (R1) volumes by typing the following command: #SC VOL,cuu,RDF-RSUM,ALL. Those primary (R1) and secondary (R2) volumes with invalid tracks will begin to synchronize. To view the synchronization process on any device, display that device using the SQ VOL command.

B. To Retain Updates on the Secondary (R2) Volume:
This procedure copies the information on the secondary (R2) volume to the primary (R1) volume.
1. Verify that the synchronization direction is set from secondary to primary (R1<R2) by typing the following command: #SQ GLOBAL. Issue the following command if it is necessary to change the current synchronization direction: #SC GLOBAL,SYNCH__ DIRECTION,R1<R2.
2. Make the secondary (R2) volume(s) on the data storage system read-only by typing the following command at the host with access to the secondary (R2) volume(s): #SC VOL,cuu,R/O[,dev#¦,ALL]
3. Vary the R1 device offline to the host: V cuu,OFFLINE.
4. Make the primary (R1) device unavailable to the host: #SC VOL,cuu,RDF-NRDY.
5. Determine which secondary (R2) volumes have a non-zero R1 INV__TRKS value by typing: #SQ VOL, cuu,INV__TRKS.
6. For all secondary (R2) volumes with non-zero R1 INV__TRKS values: From the host with access to the primary (R1) volume:
  a. Set R2 invalid tracks to zero and prepare the primary (R1) volume for synchronization by typing: #SC VOL,cuu,VALIDATE[,dev#¦,ALL] ('dev#'=primary (R1) volume whose secondary (R2) volume has an R1 INV__TRKS value greater than 0).
  b. Repeat step a for each primary (R1) volume with a non-zero R2 INV__TRKS value for a secondary (R2) volume. If ALL is the specified parameter then step b is not necessary.
7. Resume remote mirroring operation from the host with access to the primary (R1) volumes by typing the following command: #SC VOL,cuu,RDF-RSUM[, dev#¦,ALL]. Those primary (R1) and secondary (R2) volumes with invalid tracks will begin to synchronize. To view the synchronization process on any device, display that device using the # SQ VOL command from the host with access to the primary (R1) volume(s).
8. Make the R1 device available to the host: #SC VOL, cuu,RDF-RDY.
9. Vary the R1 device online to the host: V cuu,online.

Procedure 3: Invalid Tracks on both Primary (R1) and Secondary (R2) Volumes. Follow this procedure to resume remote mirroring operations when there are invalid tracks on both the primary (R1) volume and the secondary (R2) volume. To retain primary (R1) volume updates and discard secondary (R2) volume updates, follow procedure 2A above. To retain secondary (R2) volume updates and discard primary (R1) volume updates, follow procedure 2B above.

Modifications and substitutions by one of ordinary skill in the art are considered to be within the scope of the present invention, which is not to be limited except by the claims which follow.

What is claimed is:

1. A system for automatically providing remote copy data storage, said system comprising:
   a host computer;
   a first data storage system including at least a first data storage system controller and at least one data storage device, said first data storage system being coupled to said host computer for storing data to be accessed by at least said host computer;
   a second data storage system including at least a second data storage system controller and at least one data storage device, said second data storage system being remotely coupled to said first data storage system for copying of said data to said second data storage system controller; and
   said first data storage system controller coordinating and controlling the copying of said data to said second data storage system controller wherein said first data storage system maintains an index, said index including at least a first indicator providing an indication of whether a predetermined data element stored on said first data storage system is valid, a second indicator providing an indication of whether said predetermined data element stored on said second data storage system is valid, a third indicator providing an indication of whether a write is pending to said predetermined data element stored on said first data storage system, and at least a fourth indicator providing an indication of whether a write is pending to said predetermined data element stored in said second data storage system.

2. The system of claim 1 wherein said first indicator provides an indication of whether data stored in a predetermined data element storage location on said first data storage system is valid, said second indicator provides an indication of whether corresponding data stored in a corresponding data element storage location in said second data storage system is valid, said third indicator provides an indication of whether a write is pending to said predetermined data element storage location on said first data storage system, and said fourth indicator provides an indication of whether a write is pending to said corresponding data element storage location in said second data storage system.

3. The system as claimed in claim 1, wherein said first data storage system contains a cache memory and a disk data storage device, said third indicator provides an indication of whether a write is pending from said cache memory to said disk data storage device, and said fourth indicator provides an indication of whether a write is pending from said first data storage system to said second data storage system.

4. The system as claimed in claim 3, wherein said first data storage system maintains a count of a number of data storage locations which are invalid on said second data storage system, and said first data storage system transmits to said second data storage system said count of said number of data storage locations which are invalid on said second data storage system.

5. A method of operating a data storage system for automatically providing remote data copying to remote data storage, said data storage system having primary data storage for storing a primary copy of data, and a data storage controller for controlling storage of data in said primary data storage and transmission of data over a link from said data storage system to said remote data storage to store a secondary copy of the data in said remote data storage, said method comprising:

said data storage controller maintaining an index, said index including at least a first indicator providing an indication of whether a format command is pending for a data storage device in said primary data storage, a second indicator providing an indication of whether a format command is pending for a data storage device in said remote data storage for storing a secondary copy of data stored in the data storage device in said primary data storage, a third indicator for providing an indication of whether an invalid track exists for the data storage device in said primary data storage, and a fourth indicator for providing an indication of whether an invalid track exists for the data storage device in the remote data storage for storing the secondary copy of data stored in the data storage device in the primary data storage.

6. A data storage system for providing remote data copying to remote data storage, said data storage system comprising:

primary data storage for storing a primary copy of data; and a data storage controller for controlling storage of data in said primary data storage and transmission of data over a link from said data storage system to said remote data storage to store a secondary copy of the data in said remote data storage;

wherein said data storage system maintains an index, said index including at least a first indicator providing an indication of whether a predetermined data element stored on said data storage system is valid, a second indicator providing an indication of whether said predetermined data element stored in said remote data storage is valid, a third indicator providing an indication of whether a write is pending to said predetermined data element stored on said data storage system, and at least a fourth indicator providing an indication of whether a write is pending to said predetermined data element stored in said remote data storage.

7. The data storage system of claim 6 wherein said first indicator provides an indication of whether data stored in a predetermined data element storage location on said data storage system is valid, said second indicator provides an indication of whether corresponding data stored in a corresponding data element storage location in said remote data storage is valid, said third indicator provides an indication of whether a write is pending to said predetermined data element storage location on said data storage system, and said fourth indicator provides an indication of a write is pending to said corresponding data element storage location in said remote data storage.

8. The data storage system as claimed in claim 6, wherein said data storage system contains a cache memory and a disk data storage device, said third indicator provides an indication of whether a write is pending from said cache memory to said disk data storage device, and said fourth indicator provides an indication of whether a write is pending from said data storage system to said remote data storage.

9. The system as claimed in claim 6, wherein said data storage system maintains a count of a number of data storage locations which are invalid in said remote data storage, and said data storage system transmits to said remote data storage said count of said number of data storage locations which are invalid in said remote data storage.

10. A method of operating a data storage system for providing remote data copying to remote data storage, said data storage system having primary data storage for storing a primary copy of data, and a data storage controller for controlling storage of data in said primary data storage and transmission of data over a link from said data storage system to said remote data storage to store a secondary copy of the data in said remote data storage, said method comprising:

maintaining, in storage of said data storage system, a first indicator providing an indication of whether a predetermined data element stored on said data storage system is valid;

maintaining, in said data storage system, a second indicator providing an indication of whether said predetermined data element stored in said remote data storage is valid;

maintaining, in said data storage system, a third indicator providing an indication of whether a write is pending to said predetermined data element stored on said data storage system; and maintaining, in said data storage system, a fourth indicator providing an indication of whether a write is pending to said predetermined data element stored in said remote data storage.

11. The method as claimed in claim 10, wherein said first indicator provides an indication of whether data stored in a predetermined data element storage location on said data storage system is valid, said second indicator provides an indication of whether corresponding data stored in a corresponding data element storage location in said remote data storage is valid, said third indicator provides an indication of whether a write is pending to said predetermined data element storage location on said data storage system, and said fourth indicator provides an indication of whether a write is pending to said corresponding data element storage location in said remote data storage.

12. The method as claimed in claim 10, wherein said data storage system contains a cache memory and a disk data storage device, said third indicator provides an indication of whether a write is pending from said cache memory to said disk data storage device, and said fourth indicator provides an indication of whether a write is pending from said data storage system to said remote data storage.

13. The method as claimed in claim 10, which further includes maintaining in said data storage system a count of a number of data storage locations which are invalid in said remote data storage, and transmitting from said data storage system to said remote data storage said count of said number of data storage locations which are invalid in said remote data storage.

14. A program storage device readable by a data storage system, said program storage device encoding a program for execution by the data storage system for providing remote data copying from the data storage system to remote data storage, wherein the program is executable by the data storage system for maintaining an index, said index including at least a first indicator providing an indication of whether a predetermined data element is valid in storage of the data storage system, a second indicator providing an indication of whether said predetermined data element is valid in said remote data storage, a third indicator providing an indication of whether a write of said predetermined data element is pending to storage of the data storage system, and at least a fourth indicator providing an indication of whether a write of said predetermined data element is pending to said remote data storage.

15. The program storage device as claimed in claim 14, wherein said first indicator provides an indication of whether data stored in a predetermined data element storage location in said data storage system is valid, said second indicator provides an indication of whether corresponding data stored in a corresponding data element storage location in said remote data storage is valid, said third indicator provides an indication of whether a write is pending to said predetermined data element storage location in said data storage system, and said fourth indicator provides an indication of whether a write is pending to said predetermined data element storage location in said remote data storage.

16. The program storage device as claimed in claim 14, wherein said data storage system contains a cache memory and a disk data storage device, said third indicator provides an indication of whether a write is pending from said cache memory to said disk data storage device, and said fourth indicator provides an indication of whether a write is pending from said data storage system to said remote data storage.

17. The program storage device as claimed in claim 14, wherein the program is executable by the data storage system for maintaining a count of a number of data storage locations which are invalid in said remote data storage, and for transmitting from said data storage system to said remote data storage said count of said number of data storage locations which are invalid in said remote data storage.

18. A system for automatically providing remote copy storage of data from a host computer, said system comprising:

a first data storage system for coupling to the host computer for storing data from the host computer; and a second data storage system remotely coupled to the first data storage system for receiving a copy of the data from the first data storage system;

wherein the first data storage system is adapted to operate in an asynchronous mode wherein data is copied from the first data storage system to the second data storage system asynchronously from the time when the first data storage system returns an i/o completion signal for the data to the host computer, and the first data storage system maintains, in the first data storage system, an index of information about the data as stored in the first data storage system and about the copy of the data as stored in the second data storage system, the index identifying data stored in the first data storage system and not yet copied to the second data storage system, the index including additional information about the copy of the data stored in the second data storage system so that the additional information is accessible by the first data storage system without retrieval from the second data storage system in order to reduce time for recovery from a failure to access the data stored in the first data storage system.

19. The system as claimed in claim 18, wherein the index includes a first indicator of whether a write to a predetermined data element is pending to the second data storage system in order to identify the data stored in the first data storage system and not yet copied to the second data storage system, and the additional information about the copy of the data stored in the second data storage system includes a second indicator of whether the predetermined data element is valid in the second data storage system.

20. The system as claimed in claim 18, wherein the additional information identifies data storage device locations for which a format command is pending and for which an invalid track exists.

21. The system as claimed in claim 18, wherein the additional information identifies data storage device locations for which a format command is pending, data storage device locations for which an invalid track exists, data storage device locations for which a device is pending, and data storage device locations which have been write disabled.

22. The system as claimed in claim 18, wherein the index in the first data storage system is substantially similar to an index maintained in the second data storage system by the second data storage system.

23. The system as claimed in claim 18, wherein the first data storage system and the second data storage system are coupled by a high speed communication link for transmission of the copy of the data from the first data storage system to the second data storage system.

24. The system as claimed in claim 18, wherein the second data storage system is adapted for coupling to a second host computer for storing in the second data storage system data from the second host computer, and the second data storage system is coupled to the first data storage system for transmission of a copy of the data from the second host computer for storage in the first data storage system.

25. The system as claimed in claim 18, wherein the first data storage system has semiconductor memory, and the first data storage system maintains the index in the semiconductor memory.

26. The system as claimed in claim 18, wherein the index is a hierarchical structure including a table of flag bits.

27. A system for automatically providing remote copy data storage, said system comprising:

a host computer;

a first data storage system coupled to the host computer for storing data from the host computer; and a second data storage system remotely coupled to the first data storage system for receiving a copy of the data from the first data storage system;

wherein the first data storage system is adapted to operate in an asynchronous mode wherein data is copied from the first data storage system to the second data storage system asynchronously from the time when the first data storage system returns an i/o completion signal for the data to the host computer, and the first data storage system maintains, in the first data storage system, an index of information about the data as stored in the first data storage system and about the copy of the data as stored in the second data storage system, the index identifying data stored in the first data storage system and not yet copied to the second data storage system, the index including additional information about the copy of the data stored in the second data storage system so that the additional information is accessible by the first data storage system without retrieval from the second data storage system in order to reduce time for recovery from a failure to access the data stored in the first data storage system.

28. The system as claimed in claim 27, wherein the index includes a first indicator of whether a write to a predetermined data element is pending to the second data storage system in order to identify the data stored in the first data storage system and not yet copied to the second data storage system, and the additional information about the copy of the data stored in the second data storage system includes a second indicator of whether the predetermined data element is valid in the second data storage system.

29. The system as claimed in claim 27, wherein the additional information identifies data storage device locations for which a format command is pending and for which an invalid track exists, and wherein the index in the first data storage system is substantially similar to an index maintained in the second data storage system by the second data storage system.

30. The system as claimed in claim 27, wherein the additional information identifies data storage device locations for which a format command is pending, data storage device locations for which an invalid track exists, data storage device locations for which a device is pending, and data storage device locations which have been write disabled, and wherein the index in the first data storage system is substantially similar to an index maintained in the second data storage system by the second data storage system.

31. The system as claimed in claim 27, wherein the first data storage system and the second data storage system are coupled by a high speed communication link for transmission of the copy of the data from the first data storage system to the second data storage system, the host computer is coupled to the first data storage system by a first direct data signal path, and the host computer is coupled to the second data storage system by a second direct data signal path.

32. A data storage system for automatically providing remote data copying to remote data storage, said data storage system comprising:

primary data storage for storing a primary copy of data; and a data storage controller for controlling storage of data in said primary data storage and transmission of data over a link from said data storage system to said remote data storage to store a secondary copy of the data in said remote data storage;

wherein said data storage controller maintains an index, said index including at least a first indicator providing an indication of whether a format command is pending for a data storage device in said primary data storage, a second indicator providing an indication of whether a format command is pending for a data storage device in said remote data storage for storing a secondary copy of data stored in the data storage device in said primary data storage, a third indicator for providing an indication of whether an invalid track exists for the data storage device in said primary data storage, and a fourth indicator for providing an indication of whether an invalid track exists for the data storage device in the remote data storage for storing the secondary copy of data stored in the data storage device in said primary data storage.

33. A method of operating a system for automatically providing remote copy storage of data from a host computer, the system having a first data storage system coupled to the host computer for storing the data from the host computer, and a second data storage system remotely coupled to the first data storage system for receiving a copy of the data from the first data storage system, said method comprising the steps of:

operating the first data storage system in an asynchronous mode wherein data is copied from the first data storage system to the second data storage system asynchronously from the time when the first data storage system returns an i/o completion signal for the data to the host computer, and the first data storage system maintains, in the first data storage system, an index of information about the data as stored in the first data storage system and about the copy of the data as stored in the second data storage system, the index identifying data stored in the first data storage system and not yet copied to the second data storage system, the index including additional information about the copy of the data stored in the second data storage system; and in response to a failure to access the data stored in the first data storage system, the first data storage system accessing the additional information stored in the index in the first data storage system in order to reduce time for recovery from the failure.

34. The method as claimed in claim 33, wherein the index includes a first indicator of whether a write to a predetermined data element is pending to the second data storage system in order to identify the data stored in the first data storage system and not yet copied to the second data storage system, and the additional information about the copy of the data stored in the second data storage system includes a second indicator of whether the predetermined data element is valid in the second data storage system.

35. The method as claimed in claim 33, wherein the additional information identifies data storage device locations for which a format command is pending and for which an invalid track exists.

36. The method as claimed in claim 33, wherein the additional information identifies data storage device locations for which a format command is pending, data storage device locations for which an invalid track exists, data storage device locations for which a device is pending, and data storage device locations which have been write disabled.

37. The method as claimed in claim 33, wherein the index in the first data storage system is substantially similar to an index maintained in the second data storage system by the second data storage system.

38. The method as claimed in claim 33, wherein the index is a hierarchical structure including a table of flag bits.

* * * * *